United States Patent
Zhang et al.

(10) Patent No.: US 11,315,170 B2
(45) Date of Patent: *Apr. 26, 2022

(54) METHODS AND SYSTEMS FOR ORDER PROCESSING

(71) Applicant: BEIJING DIDI INFINITY TECHNOLOGY AND DEVELOPMENT CO., LTD., Beijing (CN)

(72) Inventors: Lingyu Zhang, Beijing (CN); Mingcong Sun, Beijing (CN); Wei Cui, Beijing (CN); Kaijie Qin, Beijing (CN); Tao Hu, Beijing (CN); Zhilin Hu, Beijing (CN); Haiyang Lu, Beijing (CN); Xiangxin Bao, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 25 days.

This patent is subject to a terminal disclaimer.

(21) Appl. No.: 16/869,447

(22) Filed: May 7, 2020

(65) Prior Publication Data

US 2020/0265502 A1 Aug. 20, 2020

Related U.S. Application Data

(63) Continuation of application No. 15/547,528, filed as application No. PCT/CN2016/072837 on Jan. 29, 2016, now Pat. No. 10,657,581.

(30) Foreign Application Priority Data

Feb. 2, 2015 (CN) .......................... 201510053500.6
Feb. 6, 2015 (CN) .......................... 201510065334.1

(Continued)

(51) Int. Cl.
G06Q 30/06 (2012.01)
G06Q 10/02 (2012.01)
(Continued)

(52) U.S. Cl.
CPC ......... G06Q 30/0635 (2013.01); G06Q 10/02 (2013.01); G06Q 10/08 (2013.01); G06Q 50/30 (2013.01)

(58) Field of Classification Search
CPC .... G06Q 30/0635; G06Q 10/08; G06Q 10/02; G06Q 50/30
(Continued)

(56) References Cited

U.S. PATENT DOCUMENTS 7,249,061 B1   7/2007  Suzuki
8,055,527 B1 * 11/2011  Gil ..................... G06Q 10/0631
                                                       705/7.23

(Continued)

FOREIGN PATENT DOCUMENTS

CN   101834903 A   9/2010
CN   102324181 A   1/2012
(Continued)

OTHER PUBLICATIONS

English Translation CN103218769A cited in the IDS filed Jun. 2, 2020. CN103218769A published in Year 2013 [Jul. 24, 2013].*
(Continued)

*Primary Examiner* — Yogesh C Garg
(74) *Attorney, Agent, or Firm* — Metis IP LLC

(57) ABSTRACT

The present disclosure discloses an order allocation method. The method may include: receiving orders and extracting order information; extracting service provider information and obtaining features of service providers; determining whether the order information matches the features of the service providers, or determining whether the features of the
(Continued)

service providers satisfy a preset condition to generate a determination result; ranking the service providers based on the determination result; generating orders to be allocated; and allocating the orders to be allocated to the service providers based on the ranking. The present disclosure also discloses an order allocation system that can perform the method above.

20 Claims, 19 Drawing Sheets

(30) Foreign Application Priority Data

| Feb. 12, 2015 | (CN) | 201510075815.0 |
|---|---|---|
| Mar. 31, 2015 | (CN) | 201510149155.6 |
| Apr. 13, 2015 | (CN) | 201510174117.6 |
| Apr. 28, 2015 | (CN) | 201510207953.X |
| Sep. 29, 2015 | (CN) | 201510633919.9 |
| Jan. 19, 2016 | (CN) | 201610035351.5 |

(51) Int. Cl.
   *G06Q 10/08* (2012.01)
   *G06Q 50/30* (2012.01)

(58) Field of Classification Search
   USPC .................................................. 705/26.81
   See application file for complete search history.

(56) References Cited

U.S. PATENT DOCUMENTS

| 10,559,038 | B1* | 2/2020 | Chen .................. B60R 16/0234 |
|---|---|---|---|
| 2003/0128135 | A1* | 7/2003 | Poltorak .............. G08G 1/0965 340/906 |
| 2006/0253426 | A1* | 11/2006 | Bilotti .................. G06F 16/972 |
| 2011/0046988 | A1 | 2/2011 | Gosney |
| 2011/0225269 | A1* | 9/2011 | Yap ........................ G06Q 10/06 709/219 |
| 2012/0147189 | A1* | 6/2012 | Zhang ................ G06K 9/00791 348/149 |
| 2012/0150854 | A1* | 6/2012 | Song .................... G06F 16/9558 707/728 |
| 2012/0191531 | A1* | 7/2012 | You .................... G06Q 30/0243 705/14.42 |
| 2012/0323642 | A1 | 12/2012 | Camp et al. |
| 2013/0046772 | A1 | 2/2013 | Gu et al. |
| 2013/0096827 | A1 | 4/2013 | McCall et al. |
| 2013/0159028 | A1 | 6/2013 | Lerenc et al. |
| 2013/0198022 | A1 | 8/2013 | Zhang |
| 2014/0129290 | A1 | 5/2014 | Sullivan et al. |
| 2014/0343957 | A1 | 11/2014 | Dejori |
| 2015/0278892 | A1 | 10/2015 | Roy |
| 2015/0379427 | A1* | 12/2015 | Dirac .................... G06N 20/00 706/12 |
| 2017/0228683 | A1 | 8/2017 | Hu et al. |
| 2018/0129999 | A1 | 5/2018 | Zhang et al. |

FOREIGN PATENT DOCUMENTS

| CN | 102737501 | | 10/2012 |
|---|---|---|---|
| CN | 102867410 | A | 1/2013 |
| CN | 103150698 | A | 6/2013 |
| CN | 103177572 | A | 6/2013 |
| CN | 103218769 | A | 7/2013 |
| CN | 103744966 | A | 4/2014 |
| CN | 103903147 | A | 7/2014 |
| CN | 104598978 | A | 5/2015 |
| CN | 104599168 | A | 5/2015 |
| CN | 104639646 | A | 5/2015 |
| CN | 104715285 | A | 6/2015 |
| CN | 104867016 | A | 8/2015 |
| CN | 105005816 | A | 10/2015 |
| CN | 105160021 | A | 12/2015 |
| JP | 2014194710 | A | 10/2014 |
| KR | 20090132813 | A | 12/2009 |
| WO | 2008088387 | A2 | 7/2008 |

OTHER PUBLICATIONS

Search Report in Singapore Application No. 11201706269Q dated Jul. 2, 2018, 2 pages.
Written Opinion in Singapore Application No. 11201706269Q dated Jul. 2, 2018, 6 pages.
First Office Action in Chinese Application No. 201510075815.0 dated Aug. 30, 2017, 8 pages.
Alex Rodrigue et al., Clustering by fast search and find of density peaks, Science, 344(6191): 1492-1496, 2014.
Zhao Tong, Research on server selection strategy based on user time response, Wan-fang database, 2002, 35 pages.
International Search Report for PCT/CN2016/072837 dated Apr. 27, 2016, 3 pages.

* cited by examiner

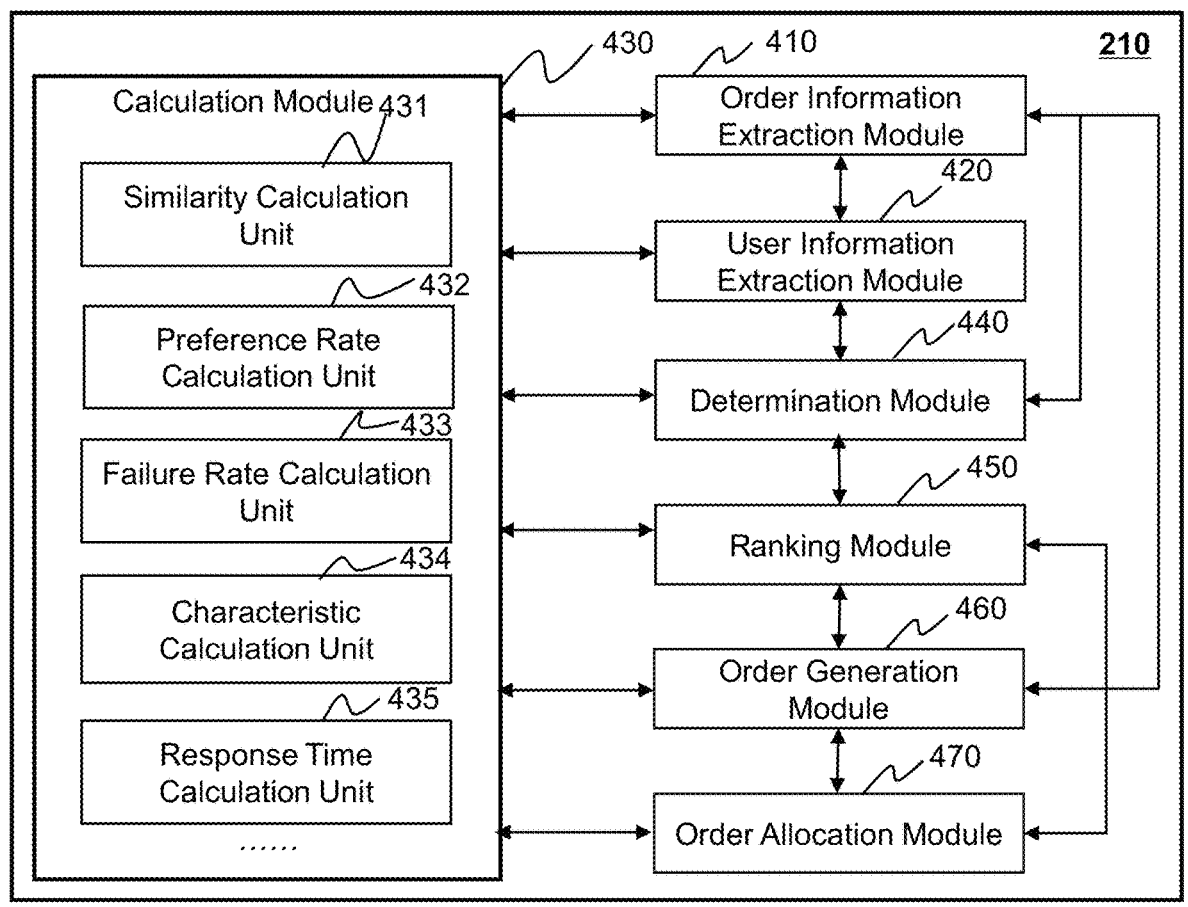
FIG. 4-A

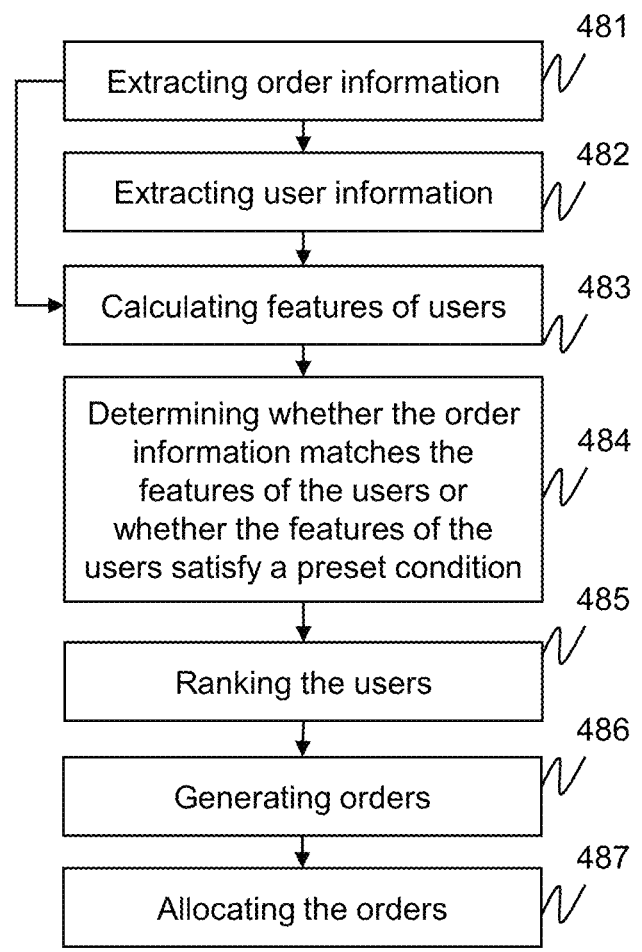
FIG. 4-B

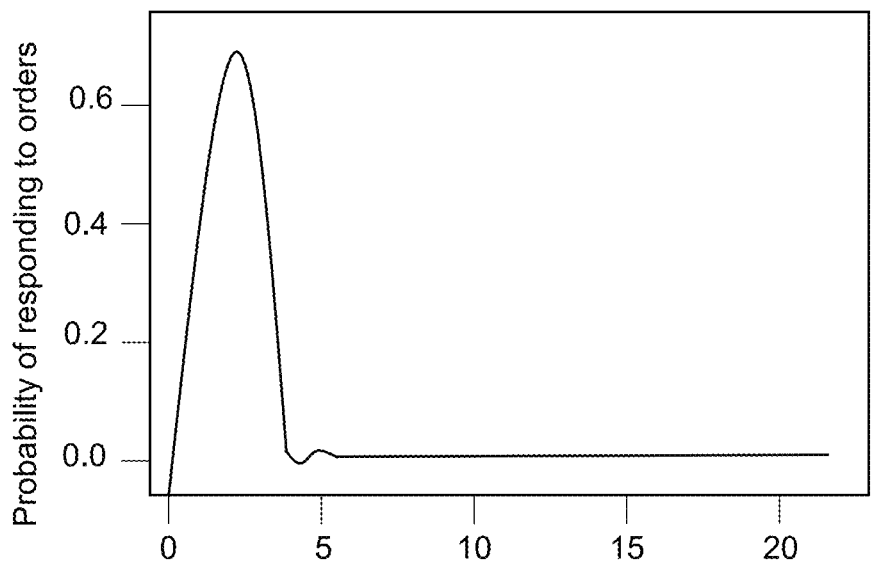
FIG. 17-A
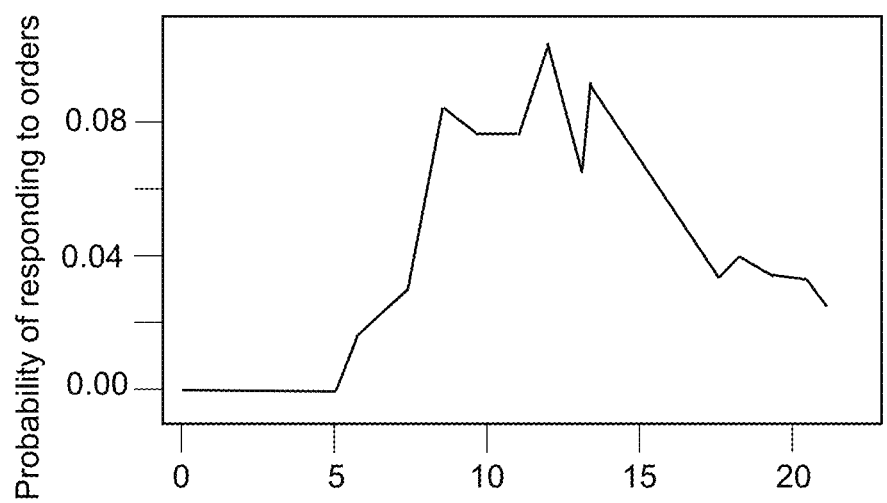
FIG. 17-B

METHODS AND SYSTEMS FOR ORDER PROCESSING

CROSS-REFERENCE TO RELATED APPLICATIONS

The application is a continuation of U.S. application Ser. No. 15/547,528, which is a U.S. national stage under 35 U.S.C. § 371 of International Application No. PCT/CN2016/072837, filed on Jan. 29, 2016, designating the United States of America, which claims priority to Chinese Patent Application No. CN201510053500.6, filed Feb. 2, 2015, Chinese Patent Application No. CN201510065334.1, filed Feb. 6, 2015, Chinese Patent Application No. CN201510075815.0, filed Feb. 12, 2015, Chinese Patent Application No. CN201510149155.6, filed Mar. 31, 2015, Chinese Patent Application No. CN201510174117.6, filed Apr. 13, 2015, Chinese Patent Application No. CN201510207953.X, filed Apr. 28, 2015, Chinese Patent Application No. CN201510633919.9, filed Sep. 29, 2015, and Chinese Patent Application No. CN201610035351.5, filed Jan. 19, 2016, the entire contents of each of which are hereby incorporated by reference.

TECHNICAL FIELD

The present disclosure relates to methods and systems for order processing, and in particular, to methods and systems for order processing applying mobile internet techniques and data processing techniques.

BACKGROUND

Currently, the application of on-demand services is becoming more and more popular. Taking a transportation service as an example, an on-demand service system may allocate an order to drivers and may selectively send the order to one of the drivers who responded to the order. In order to increase response rates and completion rates of the drivers, it is necessary to match the order information with habits or preferences of the drivers quickly and push preferential orders to the drivers accurately and flexibly.

SUMMARY

According to an aspect of the present disclosure, an order processing method is provided. The processing method may include: receiving orders and extracting order information; extracting service provider information and obtaining features of service providers; determining whether the order information matches the features of the service providers, or determining whether the features of the service providers satisfy a preset condition to generate a determination result; ranking the service providers based on the determination result; generating orders to be allocated; and allocating the orders to be allocated to the service providers based on the ranking.

According to another aspect of the present disclosure, a system is provided. The system may include: a computer-readable memory medium configured for storing an executable module and a processor configured to perform the executable module. The executable module may include: an order extraction module configured to receive orders and to extract order information; a service provider information extraction module configured to extract service provider information and to obtain features of service providers; a determination module configured to determine whether the order information matches the features of the service providers, or determine whether the features of the service providers satisfy a preset condition to generate a determination result; a ranking module configured to rank the service providers based on the determination result; an order generation module configured to generate orders to be allocated; an order allocation module configured to allocate the orders to be allocated to the service providers based on the ranking.

According to another aspect of the present disclosure, a computer-readable memory medium is provided. The computer-readable memory medium is configured for storing an executable module and storing information. When the information is read by the computer, the information may cause the computer to perform an order processing method. The order processing method may include: receiving orders and extracting order information; extracting service provider information and obtaining features of service providers; determining whether the order information matches the features of the service providers, or determining whether the features of the service providers satisfy a preset condition to generate a determination result; ranking the service providers based on the determination result; generating orders to be allocated; and allocating the orders to be allocated to the service providers based on the ranking.

According to one embodiment of the present disclosure, the order information may include a time, a time interval, a location, and region.

According to one embodiment of the present disclosure, the features of the service providers may include an order similarity, a preference rate, a failure rate, characteristics of responding to orders, and a response time.

According to one embodiment of the present disclosure, the order similarity may include a cosine similarity between a historical order and a current order, the historical order may include a confirmed order and a cancelled order.

According to one embodiment of the present disclosure, the preference rate may include a preferential region and preferential time interval.

According to one embodiment of the present disclosure, the order processing method and system may further include: obtaining the preference rate from the service provider or obtaining the preference rate by a calculation.

According to one embodiment of the present disclosure, the calculating the preferential region may include: performing a cluster analysis on longitude-latitude coordinates of destinations of historical orders based on a density peak cluster algorithm.

According to one embodiment of the present disclosure, the order processing method and system may further include: obtaining a longitude-latitude coordinate point corresponding to a destination of the order to be allocated; calculating a distance Az between the longitude-latitude coordinate point of the destination of the order to be allocated and a center of a preferential destination region of the service provider; calculating a preference rate L of the service provider for the destination of the order to be allocated based on the distance Az and a covering radius d of the preferential destination region of the service provider, wherein: $L=\Sigma 1/(1+e^{A_z-d})$.

According to one embodiment of the present disclosure, the obtaining the failure rate may include calculating the failure rate by an equation as follows:

$$T_x = \Sigma_{i=0}^{k} C_n^{k} * p^{k} * (1-p)^{n-k}$$

wherein $T_x$ represents the failure rate, k represents a number of orders that the service provider x has failed to complete among n orders allocated to the service provider, $C_n^k$ represents a number of combinations of selecting k from n, p represents an average failure rate.

According to one embodiment of the present disclosure, the order processing method and system may further include: determining candidate requests from the service providers based on the response times; and selecting one request for processing from the candidate requests.

According to one embodiment of the present disclosure, the order processing method and system may further include: determining a geographic region and determining an order group and a service provider group based on the geographic region; analyzing the order group and the service provider group to determine a completion rate, a success rate for responding to orders, and a receiving-responding rate for orders; calculating a weighted sum of the completion rate, the success rate for responding to orders, and the receiving-responding rate for orders; and determining a mode for allocating orders based on the weighted sum.

BRIEF DESCRIPTION OF THE DRAWINGS

The drawings described herein are provided for further understanding of the present disclosure and form a part of the present disclosure, the exemplary embodiments and the descriptions of the present disclosure are used for explaining the present disclosure, and not intended to limit the scope of the present disclosure. In the drawings, like reference numerals represent similar structures.

FIG. 4-A is a schematic diagram illustrating a processing module according to some embodiments of the present disclosure;

FIG. 4-B is an exemplary flowchart of a process performed by the processing module according to some embodiments of the present disclosure;

FIG. 17-A and FIG. 17-B are schematic diagrams illustrating characteristics of responding to orders of two different users according to some embodiments of the present disclosure;

DETAILED DESCRIPTION

Figure 1:
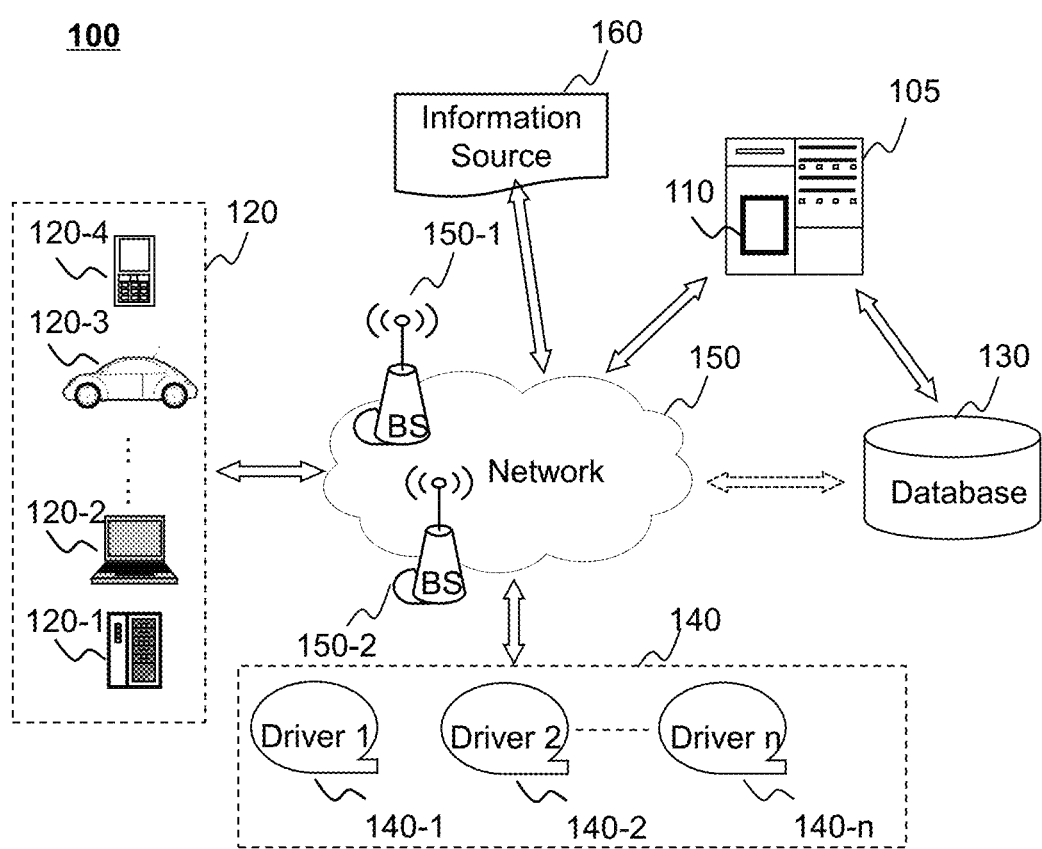
FIG. 1 is a schematic diagram illustrating an exemplary network environment including an order processing engine according to some embodiments of the present disclosure.

In order to provide a thorough understanding of the technical solutions related to the embodiments of the present disclosure, drawings of the relevant embodiments are briefly described below. Obviously, drawings described below are only some illustrations or embodiments of the present disclosure. A person of ordinary skill in the art, without further creative effort, may apply the present teachings to other scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or process.

As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated elements and steps, but do not preclude the presence or addition of one or more other elements and steps thereof.

According to some embodiments of the present disclosure, some modules of the system may be cited variously, however, any amount of different modules may be used and operated in a client terminal and/or a server. These modules are only used for illustration purposes, and different modules may be used in different aspects of the system and method.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Embodiments of the present disclosure may be applied to different transportation systems including but not limited to land, ocean, aerospace, or the like, or any combination thereof. For example, the present disclosure may be a transportation system applying management and/or allocation including a taxi, a private car, a hitch, a bus, a train, a bullet train, a high speed rail, a subway, a vessel, an aircraft, a spaceship, a hot-air balloon, a driverless vehicle, a receiving/delivering express delivery, etc. Application scenarios of different embodiments in the present disclosure may include but not limited to a web page, a plug-in of a browser, a client terminal, a custom system, an internal analysis system, an artificial intelligence robot, or the like, or a combination thereof. It should understood that application scenarios of the system and method disclosed herein are only some examples or embodiments, and it should be apparent to those skilled in the art that these drawings may be applied to other application scenarios, for example, other similar systems in which a user can receive orders.

In the present disclosure, the terms "passenger," "client," "requester," "service requester," and "customer" are used interchangeably to refer to an individual, an entity or a tool that may request or order a service. Also, the terms "driver," "provider," "service provider," and "supplier" in the present disclosure are used interchangeably to refer to an individual, an entity, or a tool that may provide a service or facilitate the providing of the service. The term "user" in the present disclosure may refer to an individual, an entity, or a tool that may request a service, order a service, provide a service, or facilitate the providing of the service.

FIG. 1 is a schematic diagram illustrating a network environment 100 according to some embodiments of the present disclosure. The network environment 100 may include one or more on-demand service systems 105, one or more passenger terminals 120, one or more databases 130, one or more driver terminals 140, one or more networks 150, and one or more information sources 160. In some embodiments, the on-demand service systems 105 may include an order processing engine 110. In someone embodiments, the order processing engine 110 may be used in a system which may analyze and process collected information to generate an analytical result. The order processing engine 110 may be a server (e.g. a cloud server) or a server group. The server group may be centralized, for example, a data center. The server group may be distributed, for example, a distributed system. The order processing engine 110 may be local or remote. In some embodiments, the order processing engine 110 may access and store information of users 120/140, information in the information source 160, and information in the database 130 via the network 150, and also may access information in the information source 160 and the database 130 directly.

The passenger terminal 120 and the driver terminal 140 may be collectively referred to as a user, which may be an individual, a tool, or an entity, for example, a service order requester or a service provider. A passenger may be a service requester. In the present disclosure, the terms "passenger," "passenger terminal," and "passenger device" may be used interchangeably. The passenger may include a user of the passenger terminal 120. In some embodiments, the user may be someone other than the passenger. For example, a user A of the passenger terminal 120 may request an on-demand service for a passenger B or receive an on-demand service or other information or instructions sent by the on-demand service system using the passenger terminal 120. For brevity, the user of the passenger terminal 120 may be referred to as passenger in the present disclosure. A driver may be a service provider. In the present disclosure, the terms "driver," "driver terminal" and "driver device" may be used interchangeably. The driver may include a user of the driver terminal 140. In some embodiments, the user may be someone other than the driver. For example, a user C of the driver terminal 140 may receive an on-demand service or other information or instructions sent by the on-demand service system 105 for a driver D using the driver terminal 140. For brevity, the user of the driver terminal 140 may be referred to as driver in the present disclosure. In some embodiments in which a user is specified as a tool, the passenger terminal 120 may include but not limited to a desktop computer 120-1, a laptop computer 120-2, a built-in device in a motor vehicle 120-3, a mobile device 120-4, or the like, or a combination thereof. Further, the built-in device in a motor vehicle 120-3 may be a carputer; the mobile device 120-4 may be a smartphone, a personal digital assistance (PDA), a tablet computer, a handheld game player, an intelligent glass, a smartwatch, a wearable device, a virtual display device or a display enhanced device (e.g., Google Glass, Oculus Rift, Hololens and Gear VR), or the like, or a combination thereof. The driver terminal 140 may also include one or more similar devices.

In some embodiments, the database 130 may include a device which can provide a storage function. The database 130 may be used mainly to store collected data from the passenger terminal 120 and/or the driver terminal 140 and any data generated during a process performed by the order processing engine 110. The database 130 may be local or remote. The database 130 may include but not limited to hierarchical database, network database, relational database, or the like, or a combination thereof. The database 130 may digitize information and store the information by a storage device using electric, magnetic, or optical methods. The database 130 may be used to store various information, for example, program, data, etc. The database 130 may be a device for storing information using electric method, for example, various memories, random access memory (RAM), read-only memory (ROM), etc. The random access memory may include but not limited to decatron, selectron, delay line memory, Williams tube, dynamic random access memory (DRAM), static random access memory (SRAM), thyristor random access memory (T-RAM), random zero capacitor memory (Z-RAM), or the like, or a combination thereof. The read-only memory may include but not limited to magnetic bubble memory, magnetic button line memory, thin film memory, magnetic paled wire memory, magnetic core memory, magnetic drum memory, CD-ROM, hard disk, tape, early non-volatile memory (NVRAM), phase change memory, magnetic resistance random access memory, ferroelectric random access memory, nonvolatile SRAM, flash memory, electronic erasable programmable read-only memory, erasable programmable read-only memory, programmable read-only memory, mask ROM, floating gate connected random access memory, nano storage random access memory, circuit memory, variable resistive memory, programmable metallization cell, or the like, or a combination thereof. The database 130 may be a device for storing information using magnetic energy method, for example, hard disk, soft disk, tape, magnetic core storage, magnetic bubble memory, U flash disk, or the like, or a combination thereof. The database 130 may be a device for storing information using optical method, for example, a compact disc (CD), a digital video disc (DVD), etc. The database 130 may be a device for storing information using magnetic optical method, for example, magnetic disc. A storage manner of the database 130 may be random access memory, serial access storage, Read Only Memory, or the like, or a combination thereof. The database 130 may be a non-permanent memory or a permanent memory. The storage devices mentioned above are only provided for examples, the storage devices that may be used in the system may be not limited to the scope.

The database 130 may be connected with or communicate with the network 150, and may also be connected with or communicate with the on-demand service system 105 or a part thereof (e.g., the order processing engine 110) directly, or both. In some embodiments, the database 130 may be set in the background of the on-demand service system 105. In some embodiments, the database 130 may be independent and connected with the network 150 directly. When the database 130 is connected with or communicates with the network 150, the user 120/140 may access information in the database 130 via the network 150. Access permissions of the parties for the database 130 may be limited. For example, the on-demand service system 105 or a part thereof (e.g., the order processing engine 110) may have the highest access permission, and may read or modify public information or personal information in the database 130; the passenger terminal 120 or the driver terminal 140 may be permitted to read a part of public information or personal information in the database 130 when a certain condition is satisfied. For example, according to one or more experiences of a user (a passenger or a driver) using the on-demand service system 105, the on-demand service system 105 may update/modify public information or personal information related to the user in the database 130. As another example, when a driver receives a service order from a passenger, the driver may view a part of information of the passenger in the database 130; however, the driver can't modify information related to the passenger by himself, and can only report to the on-demand service system 105, and the on-demand service system 105 may subsequently determine whether to modify information of the passenger in the database 130. As a further example, when a passenger receives a request for providing service from a driver, the passenger may view a part of information of the driver in the database 130 (e.g., information of user rating, driving experience information); however, the passenger can't modify information related to the diver by himself, and can only report to the on-demand service system 105, and the on-demand service system 105 may subsequently determine whether to modify information of the driver in the database 130.

The database 130 may include a device which can provide a storage function. The database 130 may be used mainly to store collected data from the user 120/140 and/or the information resource 160, and any data generated during a process performed by the order processing engine 110. The database 130 or other storage devices in the system may be any medium with read/write functions. The database 130 or other storage devices may be internal or external. Connections among the database 130 and other storage devices may be wired or wireless. The connection or communication among the database 130 and other modules of the system may be wired or wireless. The network 150 may provide channels for information exchange.

The network 150 may be a single network or a combination of a variety of networks. The network 150 may include but not limited to a local area network (LAN), a wide area network (WAN), a public network, a private network, a wireless LAN, a virtual network, an urban metropolitan area network, a public switch telephone network, or the like, or a combination thereof. The network 150 may include various network access points, for example, wired or wireless access points, base station or network switch points, by which data source may be connected with the network 150 and the information may be transmitted via the network.

The information source 160 may be a source which can supply other information for the system. The information source 160 may be used to supply information associated with services, for example, weather condition, traffic information, law information, news information, life information, life guide information, etc. The information source 160 may be a separate central server, a combination of multiple servers connected through the network, or multiple personal devices. When the information source is existed in the form of multiple personal devices, these devices may enable a cloud server to combine with other connected multiple personal devises to form an information source, through a user-generated contents method, for example, uploading text, audio, video, picture to the cloud server. The information source 160 may be connected or communicate with the network 150, or may be directly connected or communicate with the on-demand service system 105 or a part thereof (e.g., the order processing engine 110), or both. When the information source 160 is connected or communicates with the network 150, the user 120/140 may access the information in the information source 160 via the network 150. The connections and communications among the information source 160 and other modules of the system may be wired or wireless.

Take the transportation service as an example, the information source 160 may be a system including map information and city service information, for example, a municipal transportation service system, a real-time traffic broadcast system, a weather broadcast system, a news network, etc. The information source 160 may be a physical information source, for example, common devices used for measuring a speed, a sensing device, a device of internet of things, particularly such as a built-in vehicle speed meter, a built-in diagnostic device, a radar speed indicator on the road, a temperature sensor, a humidity sensor, etc. The information source 160 may be a source for obtaining news, messages, real-time road information, for example, a network information source, including but not limited to an internet newsgroup based on Usenet, a server in the Internet, a weather information server, a traffic status information server, etc. Particularly, for a meal delivery service, the information source 160 may be a system storing information of multiple food and beverage service providers in a specific region, a municipal transportation service system including map information and city service information, a real-time traffic broadcast system, a weather broadcast system, a news network, etc. The above examples are not intended to limit the scope of the information source, and not intended to limit the scope in the illustrated examples herein. The present disclosure may be applied to any service, and any device or network that may provide information related to corresponding service may be designated as the information source.

In some embodiments, for a location-based service system, communication among different a part of the system may be implemented through orders. The object of the order may be any product. In some embodiments, the product may be a tangible product or an immaterial product. For a tangible product, it may be an object with any shape or size, for example, food, medicine, commodity, chemical product, electrical appliance, clothing, car, house, luxury, or the like, or a combination thereof. For an immaterial product, it may include but not limited to service product, financial product, knowledge product, Internet product, or the like, or a combination thereof. For an Internet product, it may be any product that satisfies the user's requirements for information, entertainment, communication, or business. There are many classification methods for Internet product, taking the host platform as example, the Internet product may include but not limited to individual host product, Web product, mobile internet product, commercial host platform product, embedded product, or the like, or a combination thereof. The mobile internet product may be a software, a program, or a system used in mobile terminals. The mobile terminal may include but not limited to a laptop computer, a tablet computer, a mobile phone, a personal digital assistant (PDA), a smart watch, a point of sale (POS) device, an onboard computer, a television, or the like, or a combination thereof. For example, the product may be any software used on the computer or the mobile phone. The software may relate to socializing, shopping, traveling, entertainment, learning, investment, etc. The traveling software may be a trip software, a traffic tool booking software, a map software, etc. The traffic tool booking software may be used to appoint a car (e.g., a taxis, a bus), a train, a subway, a ship (e.g., a steamer), a flying machine (e.g., an aircraft, a space shuttle, a rocket), a hot air balloon, or the like, or a combination thereof.

It should be noted that the description above about the service system is provided for illustration purposes, and not intended to limit the present disclosure within the scope of the disclosed embodiments. For persons having ordinary skills in the art, after understanding the principle of the system, without departing the principle, may make any combination of the modules, or construct a sub-system connected with other modules, or may modify or change the forms and details of the application field in which the above method and system is applied. The database 130 may be a cloud platform with a data storage function including a public cloud, a private cloud, a community cloud, a hybrid cloud, etc. These modifications are still within the scope of the present disclosure.

Figure 2:
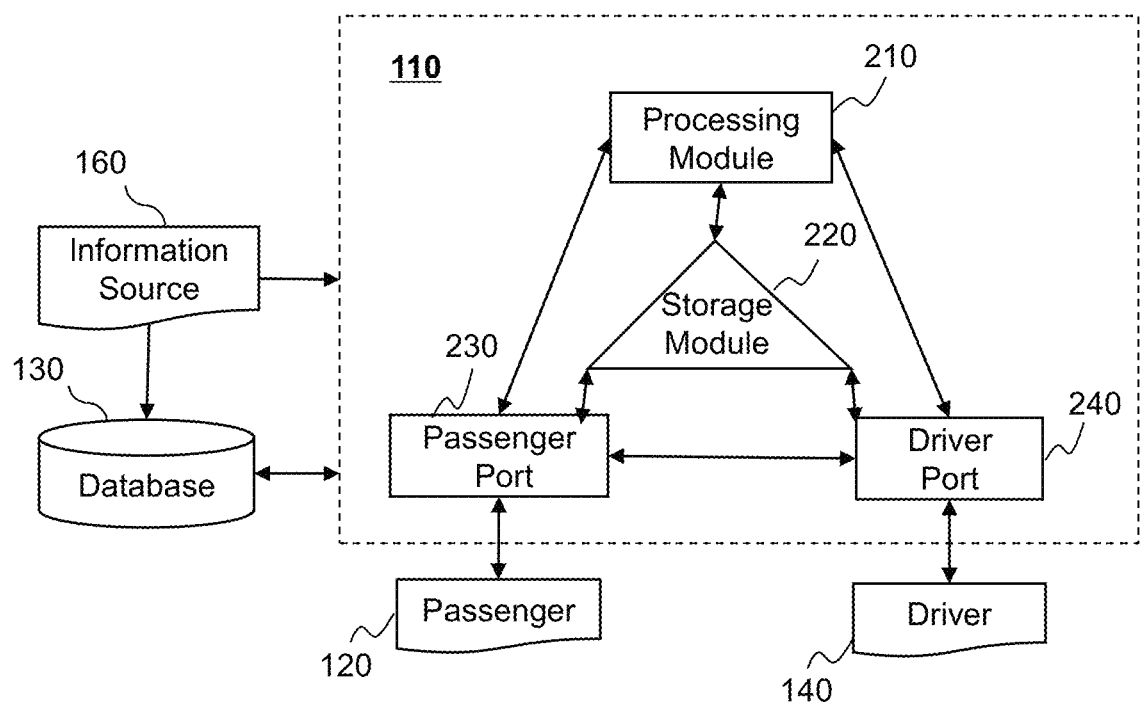
FIG. 2 is a schematic diagram illustrating an order processing engine according to some embodiments of the present disclosure.

FIG. 2 is an exemplary system diagram illustrating a process for order processing according to some embodiments of the present disclosure. In order to describe conveniently, the order processing engine 110 in the on-demand service systems 105 may be described as an example of the system for order processing. The order processing engine 110 may include one or more processing modules 210, one or more storage modules 220, one or more passenger ports 230, and one or more driver ports 240. The order processing engine 110 may be centralized or allocated. One or more modules of the order processing engine 110 may be local or remote. In some embodiments, the order processing engine 110 may be a Web server, a file server, a database server, an FTP server, an application server, a proxy server, a mail server, or the like, or a combination thereof.

In some embodiments, the passenger port 230 and the driver port 240 may receive information transmitted by the passenger terminal 120 or the driver terminal 140 respectively. In some embodiments, the passenger port 230 and the driver port 240 may read information from the database 130 and the information resource 160. The information may include but not limited to service request information, service receiving information, habit/preference information of a user, location information, or the like, or a combination thereof. The service request information may be order request information of a user (e.g., a request for a taxi hailing from a passenger, a request for responding to an order from a driver), other request information of the user (e.g., a request for obtaining an order density in a specific region from the driver), etc. The service receiving information may be information that the user confirms an order, information that the user rejects an order, information that the user confirms an order successfully, information that the user fails to confirm an order, etc. The habit/preference information of the user may be a preference of a passenger for drivers, acceptable waiting time of a passenger, a preference of a driver for passengers who may agree to share a vehicle with other passengers, a preference of a passenger for a vehicle type, a preference of a driver for a start location, a preference of a driver for a destination, a preference of a driver for a start time, etc. The format of the information may include but not limited to text, audio, video, picture, or the like, or a combination thereof. The input mode of the information may be handwriting input, gesture input, image input, voice input, video input, electromagnetic wave input, or other like, or a combination thereof. The received information may be stored in the database 130, in the storage module 220, or may be calculated and processed by the processing module 210.

In some embodiments, location information of the user may be performed by a positioning system. For example, a current location, a start location, a movement state, a movement speed may be obtained by one or more positioning techniques. The positioning technique may include but not limited to a global positioning system (GPS) technique, a global navigation satellite system (GLONASS) technique, a BeiDou navigation system technique, a Galileo positioning system (Galileo) technique, a quasi zenith satellite system (QAZZ) technique, a base station positioning technique, a Wi-Fi positioning technique, various location and speed detection system integrated in the vehicle, etc.

In some embodiments, the passenger port 210 and the driver port 230 may be used to output information analyzed and processed by the processing module 210. The information may be optimized positioning information, original order information, processed order information, original user information, processed user information, etc. The format of the information may include but not limited to text, audio, video, picture, or the like, or a combination thereof. The output information may be transmitted to the passenger 120 and/or the driver 140, or may not be transmitted. The output information that is not transmitted may be stored in the database 130, the storage module 220, or the processing module 210.

In some embodiments, the processing module 210 may be used to process related information. The processing module 210 may obtain information from the passenger port 230, the driver port 240, the database 130, the information source 160, etc. The processing module 210 may transmit the processed information to the passenger port 230 and/or the driver port 240, or store the processed information in the processing module 210. The processing may include but not limited to storage, classification, screening, conversion, calculation, retrieval, prediction, training, or the like, or a combination thereof. In some embodiments, the processing module 210 may include but not limited to a central processing unit (CPU), an application specific integrated circuit (ASIC), an application specific instruction set processor (ASIP), a physics processing unit (PPU), a digital processing processor (DSP), a field-programmable gate array (FPGA), a programmable logic device (PLD), a processor, a microprocessor, a controller, a microcontroller, or the like, or a combination thereof.

It should be noted that the processing module 210 may actually exist in the system, or may be implemented through a cloud computing platform. The cloud computing platform may include but not limited to a storage cloud platform which is mainly used for storing data, a computing cloud platform which is mainly used for processing data, or an integrated cloud platform which is used for both storing data and processing data. The platform used by the system may be a public cloud, a private cloud, a community cloud, a hybrid cloud, etc. For example, according to actual demands, a part of the order information and/or non-order information received by the system may be calculated and/or stored via the cloud platform. Other order information and/or non-order information may be calculated and/or stored via a local processing module and/or a system database.

It should be understood that the system illustrated in FIG. 2 may be implemented via various ways. For example, in some embodiments, the system may be implemented through hardware, software, or a combination of the both. The hardware component may be implemented by a dedicated logic; the software component may be stored in the storage which may be executed by a suitable instruction execution system, for example, a microprocessor or a dedicated design hardware. Those skilled in the art can understand that the method and system above may be implemented by executable instructions of a computer and/or control codes in a processor, for example, the code supplied in a carrier medium such as a disk, a CD, a DVD-ROM, a programmable storage such as a read-only memory (firmware), or a data carrier such as an optical signal carrier or an electric signal carrier. The system and the module in the present disclosure may be implemented not only by a hardware circuit in a programmable hardware device in a ultra large scale integrated circuit, a gate array chip, a semiconductor such a logic chip or a transistor, a field programmable gate array, or a programmable logic device, but also by a software performed by various processors, and further also by a combination of the hardware and the software above (e.g., firmware).

It should be noted that the description above about the order processing engine 110 and the on-demand service system is provided for illustration purposes, and not intended to limit the present disclosure within the scope of the disclosed embodiments. For persons having ordinary skills in the art, after understanding the principle of the system, without departing the principle, may make any modification or variation to the forms and details of the application field in which the method and system may be applied. For example, in some embodiments, the order processing engine 110 may also include a storage module. The storage module may be integrated in the system, or may be an external device of the system. After understanding the principle of the system, without departing the principle, those skilled in the art may make any combination of the modules, or construct a sub-system connected with other modules. For example, in some embodiments, the passenger port 230, the processing module 210, the driver port 240, and the storage module 220 may be different modules in a system, or may be a single module that can implement functions of the two or more modules above. For example, the passenger port 230 and the driver port 240 may be a single module which can implement functions of both input and output, or an input module and an output module for the passenger. For example, the processing module 210 and storage module 220 may be two modules respectively, or may be a single module which can implement functions of both processing and storage. For example, the modules may share a single storage module, or the modules may include their storage modules respectively. These modifications are still within the scope of the present disclosure.

Figure 3:
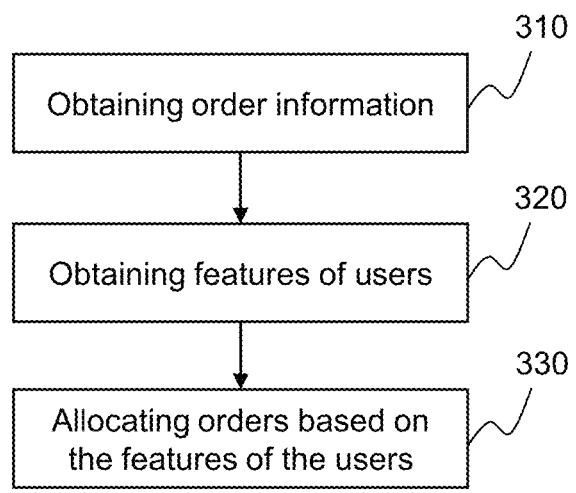
FIG. 3 is an exemplary flowchart for order processing according to some embodiments of the present disclosure.

FIG. 3 is an exemplary flowchart for allocating orders according to some embodiments of the present disclosure. In some embodiments, the process for allocating orders may be performed by the on-demand service system 105 or parts thereof (e.g., the order processing engine 110). As illustrated in FIG. 3, order information may be obtained from users 120/140 (see details in FIG. 1) in step 310. In some embodiments, information may also obtained from the database 130 and/or the information resource 160 (see details in FIG. 1). The format of the information may include but not limited to text, audio, video, picture, or the like, or a combination thereof. Taking taxi service order as an example, the order information may include but not limited to order information itself, user information, other information, etc. The order information itself may include but not limited to a time point when the order is sent, an order number, a start location, a destination, a start time, an arrival time, an acceptable waiting time, a number of passengers, whether agrees to share a vehicle with other passengers, a selected vehicle model, with luggage or not, a mileage, a price, an increasing price by consumer, a price adjustment by service provider, a price adjustment by the system, a status of using red packet, a payment mode (e.g., a cash payment, a credit card payment, an online payment, a remittance payment), order completion status, order selection status by the service provider, order sending status by the consumer, or the like, or any combination thereof. The user information may refer to information related to the user 120/140. The user information may include but not limited to name, nickname, gender, nationality, age, contact information (phone number, microphone number, social network account (e.g., WeChat number, QQ number, LinkedIn account), or the like, or any way through which a person can be contacted), occupation, grade evaluation, time used, driving experience, vehicle age, vehicle type, vehicle status, vehicle license plate number, driving license number, authentication status, habit/preference of the user, ability of extra services (e.g., extra characteristics including a size of the vehicle trunk, a panoramic sunroof), or the like, or a combination thereof. The other information may refer to information which is not controlled by the consumer or the service provider, or temporary/emergency information. For example, the other information may include but not limited to weather status, environment, road (e.g., blocked road because of safety or road works), traffic, or the like, or a combination.

In some embodiments, a part of the order information may be real time order information, appointment order information, or historical order information. The real time order information may be current order information. The real time order information may include a start time, a start location, etc. The appointment order information may be information of orders which may be appointed by passengers that starts at a specific time or during a specific time interval. The time interval may be seconds, minutes, hours, or a time interval defined based on user preference; the time interval may be a specific time, for example, working day, rest day, holiday, peak period, non-peak period, etc. Similarly, the appointment order information also may include a start time, a start location, a destination, etc. It should be noted that in some embodiments, if a time difference between the start time of the appointment order and the current time is relatively small (e.g. 1 minute), the appointment order may be determined as a real time order. The historical order information may include relevant information of the past, for example, a number of requested orders, a number of received orders, a number of completed orders, a rate for responding to orders, a success rate for responding to orders, a failure rate, a completion rate, a habit/preference of the user, or the like, or a combination thereof.

In step 320, features of users may be obtained. The features of the users may include but not limited to name, nickname, gender, nationality, age, contact information (phone number, microphone number, social network account (e.g., WeChat number, QQ number, LinkedIn account, etc.), or the like, or any way through which a person can be contacted), occupation, grade evaluation, time used, driving experience, vehicle age, vehicle type, vehicle status, vehicle license plate number, driving license number, authentication status, habit/preference of the user, ability of extra services (e.g., extra characteristics including a size of the vehicle trunk, a panoramic sunroof), or the like, or a combination thereof. The habit/preference may refer to a preference of the passenger for the start time, the start location, the destination, a preference of the passenger for drivers, an acceptable waiting time, a preference of the passenger for other passengers who may agree to share a vehicle with others, a preference of the passenger for vehicle type, a preference of the driver for the start location, the destination, the start time, a preference of the driver for a driving route, a working time of the diver, a speed of responding to orders of driver, a response time of the driver, characteristics of responding to orders of the driver, a failure rate of the driver, a number of orders responded to by the driver, a number of orders successfully responded to by the driver, a number of completed orders, a success rate for responding to orders, a completion rate, etc. The features of the users may be directly obtained by user input, or may be obtained by a specific data processing method. The data processing method may include but not limited to storage, classification, screening, conversion, calculation, retrieval, prediction, training, or the like, or a combination thereof.

In order to describe conveniently, the prediction model and the machine learning used in some embodiments for processing information are illustrated hereinafter. In some embodiments, the prediction model may be qualitative or quantitative. The qualitative prediction module may be based on a time series forecasting method or a causal analysis method. The time series forecasting method may further include an average smoothing, a trend extrapolation, a seasonal forecast method, a Markov time series prediction method, or the like, or a combination thereof. The causal analysis method may further include a regression method, a multiple regression method, or input-output method. In some embodiments, the prediction model may include but not limited to a weighted average model, an average trend forecasting model, an exponential smoothing model, an average speed of development model, a linear regression model, a high and low point model, or the like, or the a combination thereof. In some other embodiments, formulas, algorithms and/or models used for processing information may be optimized continually through the machine learning.

According to the difference among the learning methods, the machine learning method may include a supervised learning, an unsupervised learning, a semi supervised learning, a reinforcement learning; according to the difference among the algorithms, the machine learning algorithm may include a regression algorithm learning, a learning based on examples, a learning based on regularization, a decision tree learning, a Bayes learning, a clustering algorithm, a learning of association rule, a neural network learning, a deep learning, a dimension reduction algorithm, etc. Specifically, the regression algorithm method may include Ordinary Least Square, Logistic Regression, Stepwise Regression, Multivariate Adaptive Regression Splines, or Locally Estimated Scatterplot Smoothing; the learning method based on examples may include k-Nearest Neighbor, Learning Vector Quantization, Self-Organizing Map, etc.; the learning method based on regularization may include RIDge Regression, Least Absolute Shrinkage, Selection Operator (LASS), or Elastic Net; the decision tree learning method may include Classification And Regression Tree, Iterative Dichotomiser 3 (ID3), C4.5, Chi-squared Automatic Interaction Detection (CHAID), Decision Stump, Random Forest, multivariate adaptive regression splines (MARS), Gradient Boosting Machine (GBM), etc.; the Bayes learning method may include naive bias algorithm, Averaged One-Dependence Estimators, Bayesian Belief Network (BBN), etc.; the algorithm based on kernel may include Support Vector Machine, Radial Basis Function, Linear Discriminate Analysis, etc.; the clustering algorithm may include k-Means algorithm, Expectation Maximization algorithm, etc.; the learning module of association rule may include Apriori algorithm, Eclat algorithm, etc.; the neural network learning may include Perceptron Neural Network, Back Propagation, Hopfield network, Self-Organizing Map (SOM), Learning Vector Quantization, etc.; the deep learning module may include Restricted Boltzmann Machine, Deep Belief Networks (DBN), Convolutional Network, Stacked Auto-encoders, etc.; the dimension reduction algorithm module may include Principle Component Analysis, Partial Least Square Regression, Sammon Mapping, Multi-Dimensional Scaling, Projection Pursuit, etc.

In step 330, the orders may be allocated based on the features of the users. In some embodiments, the order processing engine 110 may transmit information, for example, the order information, to one or more driver terminals 140, one or more passenger terminals 120, one or more third party platforms, etc. Contents of the order information may include but not limited to order information itself, user information, other information, etc. The order information itself may include but not limited to a time point when the order is sent, an order number, a start location, a destination, a start time, an arrival time, an acceptable waiting time, a number of passengers, whether agrees to share a vehicle with other passengers, a selected vehicle model, with luggage or not, a mileage, a price, an increasing price by consumer, a price adjustment by service provider, a price adjustment by the system, a status of using red packet, a payment mode (e.g., a cash payment, a credit card payment, an online payment, a remittance payment), order completion status, order selection status by the service provider, order sending status by the consumer, or the like, or any combination thereof. The user information may refer to information related to the user 120/140. The user information may include but not limited to name, nickname, gender, nationality, age, contact information (phone number, microphone number, social network account (e.g., WeChat number, QQ number, LinkedIn account), or the like, or any way through which a person can be contacted), occupation, grade evaluation, time used, driving experience, vehicle age, vehicle type, vehicle status, vehicle license plate number, driving license number, authentication status, habit/preference of the user, ability of extra services (e.g., extra characteristics including a size of the vehicle trunk, a panoramic sunroof), or the like, or a combination thereof. The other information refer to information which is not controlled by the consumer or the service provider, or temporary/emergency information. For example, the other information may include but not limited to weather status, environment, road (e.g., blocked road because of safety or road works), traffic, or the like, or a combination. The transmitted information may be original order information or processed order information, or a combination of both. The format of the transmitted information may include but not limited to text, audio, video, picture, or the like, or a combination thereof.

It should be noted that the description above about order processing process is provided for illustration purposes, and not intended to limit the present disclosure within the scope of the disclosed embodiments. For persons having ordinary skills in the art, after understanding the principle of the present disclosure, without departing the principle, may make any modification to the process. For example, some steps may be added or deleted. For example, the order information may be pre-processed after step 310. During the pre-processing, distortion data may be removed through data cleaning, data integration, data transformation, and/or data reduction. In some embodiments, methods for removing distortion data may include but not limited to a discrimination method, an elimination method, an average method, a smoothing method, a proportion method, a moving average method, an exponential smoothing method, a difference method, or the like, or a combination thereof. As another example, a data storage step may be added to the order processing process. These modifications are still within the scope of the present disclosure.

FIG. 4-A is a schematic diagram illustrating a processing module 210 in the order processing engine 110 according to some embodiments of the present disclosure. The processing module 210 may include an order information extraction module 410, a user information extraction module 420, a calculation module 430, a determination module 440, a ranking module 450, an order generation module 460, and an order allocation module 470. Except the modules above, the processing module 210 may include one or more other modules or units. The above modules 410-470 may communicate with each other, and the connections among the modules may be wired or wireless. FIG. 4-A provides an exemplary connection among the modules, but it doesn't mean that the connection among the modules is limited within the scope.

The order information extraction module 410 may be used to extract direct or indirect information related to the order. The order may include a real time order, an appointment order, or a historical order. For example, the order information may include a time point when the order is sent, an order number, a start location, a destination, a start time, an arrival time, an acceptable waiting time, a number of passengers, whether agrees to share a vehicle with other passengers, a selected vehicle model, with luggage or not, a mileage, a price, an increasing price by consumer, a price adjustment by service provider, a price adjustment by the system, a status of using red packet, a payment mode (e.g., a cash payment, a credit card payment, an online payment, a remittance payment), order completion status, order selection status by the service provider, order sending status by the consumer, or the like, or any combination thereof. Except the description above, the order information may include other information related to the order, for example, passenger information (e.g. gender, nickname, contact information), other information which is not controlled by the consumer or the service provider, or temporary/emergency information. For example, the other information may include but not limited to weather status, environment, road (e.g., blocked road because of safety or road works), traffic, or the like, or a combination. The order information may be extracted in real time or non-real time. The extracted information may be stored in the order information extraction module 410, the storage module 220, or any storage device integrated in the system or independent of the system described in the present disclosure.

In some embodiments, the order information extraction module 410 may also include one or more subunits, for example, a time information extraction unit (not shown), a location information extraction unit (not shown), an analysis unit (not shown), a processing unit (not shown), etc. The time information extraction unit may be used to extract time information related to the order (e.g. the time point when the order is sent, the appointment start time, the appointment start time interval). The location information extraction unit may be used to extract location information related to the order (e.g., the start location, the destination, a region where the start location is located in, traffic status around the start location, traffic status around the destination). The analysis unit may be used to analyze the time information or location information related to the order, for example, transform the location information from text description to location coordinate. The text description may refer to place name, house number, building name, or the like, or a combination thereof. The location coordinate may refer to coordinate information of a specific location, for example, longitude-latitude coordinate. The processing unit may be used to process one or more kinds of information related to the order extracted by the order information extraction module 410. The processing method may include but not limited to calculation, identification, validation, determination, selection, etc.

The user information extraction module 420 may be used to extract direct or indirect information related to the user, and identify, arrange, and classify the information. The user may include the passenger or the driver. Taking the driver as an example, the user information may include historical confirmed orders, historical canceled orders, historical time points when receiving orders, historical time intervals when receiving orders, historical locations where orders were received, historical regions where orders were received, historical time points or time intervals when logging in the system, historical locations or regions where the user logs in in the system, historical failure orders, etc. The user information may be extracted in real time or not. The extracted user information may be stored in the user information extraction module 420, the storage module 220, or any storage device integrated in the system or independent of the system disclosed in the present disclosure. The extracted order information and user information may be transmitted to the calculation module 430 in real time or not for further calculation or analysis, or to the determination module 440 or the ranking module 450 in real time or not for further determination or ranking. In some embodiments, the order information extraction module 410 and the user information extraction module 420 may be integrated into an independent module that may implement the functions of extracting the order information and user information.

In some embodiments, the user information extraction module 420 may also include one or more subunits, for example, an information receiving unit (not shown), an information analysis unit (not shown), and an information transmission unit (not shown), etc. The information receiving unit may be used to receive or read user information, particularly for example, information transmitted by the driver may include current location information determined by a positioning technology, a driving speed, a status of current service provided by the driver (carrying passengers, waiting for passengers, empty), a selection, a confirmation, or a cancellation of the driver for a service request, or the like, or a combination thereof. The information above may be natural language text information, binary information, audio information (including voice input by the driver), image information (still picture or video), multimedia information of other types, or the like, or a combination thereof. The information analysis unit may be used to arrange or classify the information above, for example, transform the information into readable or storable format. The information transmission unit may be used to receive or transmit information and may include one or more wired or wireless transceivers.

The calculation module 430 may be used to calculate a future of a user. The feature of the user may include a similarities between historical orders and current orders, a preference rate, a failure rate, characteristics of responding to orders, response time, etc. The calculation module 430 may include a similarity calculation unit 431, a preference rate calculation unit 432, a failure rate calculation unit 433, a characteristic calculation unit 434, a response time calculation unit 435, or one or more other calculation units for calculating features of the user. One or more storage units (not shown) used for storing the calculated features of the user may be integrated in the calculation module 430. The calculated feature of the user may be transmitted to the determination module 440 or the raking module 450 for further analysis and processing. The calculation method may include but not limited to a minimum-maximum normalization, a Z-score normalization, a decimal scaling normalization, a linear function, a logarithmic function, an inverse cotangent function method, a norm method, a history iterative threshold method, a modeling method, a least square method, a fire element method, a reduction method, a substitution method, an image method, a comparative method, a reduction method, a vector method, an inductive method, a reduction to absurdity, an exhaustive method, an allocation method, a method of undetermined coefficients, a method of substitution, a split method, a fill method, a factorization method, a parallel moving method, a function approximation method, an interpolation method, a curve fitting legitimate, an integral method, a differential method, or the like, or a combination thereof. The information referred to during the calculation process may be obtained from the order information extraction module 410 and the user information extraction module 420, or may be obtained from the database 130 and/or the information resource 160.

The determination module 440 may be used to determine whether the order information matches the features of the users, or whether the features of the users satisfy one or more preset conditions. In some embodiments, both the order information and the features of the users may be taken into consideration during the determination process, for example, time information may be extracted from the order information (e.g., the start time) and time thresholds related to the features of the users may be set, then whether the order information matches the features of the users may be determined based on differences between the time information in the order information and the time thresholds. In some embodiments, only the features of the users may be taken into consideration during the determination process, for example, one or more preset conditions related to the users may be set. Particularly for example, failure rate threshold may be set, and whether the features of the users satisfy the preset condition may be determined based on differences between the failure rates of the users and the failure rate threshold. In some embodiments, the preset condition may be system default, or may be dynamically adjusted under different situations. For example, the preset condition may be adjusted according to time, location, traffic status, passenger request, etc. In some embodiments, the preset condition may be dynamically adjusted based on an adjustment rule. For example, the adjustment rule may be defining a fixed adjustment parameter at a fixed time point of a day, or the adjustment parameter may be changed at a certain time interval (e.g., per hour). The preset condition may relate to the order, the feature of the user, or both.

The ranking module 450 may be used to rank the users. The ranking process may be based on the matching degrees between the order information and the features of the users, or the difference degrees between the features of the users and the preset condition. The ranking module 450 may be integrated in the determination module 440 or in any other module. In some embodiments, the ranking module 450 may be used to score the users, assign different priorities to different users based on the scores, and rank the users based on the priorities. In some embodiments, when ranking the users, other than the matching degrees between the order information and the features of the users or the difference degrees between the features of the users and the preset condition, the preferences of the users may be taken into consideration. For example, a driver may set a parameter related to passenger star level in his/her personal account (e.g., prefer to receive orders from a five-star passenger). In some embodiments, when ranking the users, the preferences of the passengers may be taken into consideration. Similarly, a passenger may set a personal preference parameter, when the system rank the drivers, a driver whose relevancy is relatively high with the personal preference parameter may be assigned a high priority.

The order generation module 460 may be used to integrate the order information to generate orders to be allocated. Characteristics of an order to be allocated may include a location where the order is sent, a distance between the location where the order is sent and the diver, a destination of the order, a region where the destination is located in, traffic status around the location where the order is sent, a dynamic price adjustment of the order, a number of passengers, with luggage or not, whether the passenger agrees to share a vehicle with others, etc. In some embodiments, the order generation module 460 may be used to perform a format transformation, a content modification, or a content adjustment on the received order information. The format transformation, content modification, or the content adjustment may be performed based on settings of the users, for example, settings of the drivers. The format transformation, the content modification, or the content adjustment may be performed based on system default of the on-demand service system 105 or the order processing engine 110. The format of the generated orders to be allocated may include text, audio, video, picture, etc.

The order allocation module 470 may be used to allocate the orders to be allocated to the users. In some embodiments, the order allocation module 470 may be integrated in the driver port 240. The order allocation module 470 may read the ranking result, the features of the users, the user information, or the determination result in real time or not from other modules. In some embodiments, the order allocation module 470 may read the features of the users obtained by the calculation module 430, and allocate the orders based on the features of the users directly. In some embodiments, the order allocation module 470 may allocate the orders based on the ranking result generated by the ranking module 450. In some embodiments, the order allocation module 470 and the order generation module 460 may be integrated into an independent module that may implement the functions of generating orders and allocating orders. In some embodiments, the order allocation module 470 may transmit information related to the orders, including but not limited to information regarding accepting orders (e.g. orders may be accepted by drivers already), real time information regarding increasing the price (e.g. the dynamic price adjustment during peak hours), etc. In some embodiments, the order allocation module 470 may be integrated into the passenger port 230.

In some embodiments, one or more storage modules (not shown) may be integrated in the processing module 210. The storage module (not shown) may be used to store various information and intermediate information extracted, calculated, and/or generated by other modules. In some embodiments, the sub-modules 410-470 in the processing module 210 may include their storage units (not shown) used to store information or intermediate data respectively.

In some embodiments, the calculation or process performed by the sub-modules 410-470 in the processing module 210 may be a calculation based on a logical operation, for example, an AND/OR operation; or may be a calculation based on a numerical computation. The sub-modules 410-470 in the processing module 210 may include one or more processors. The processor may be any universal processor, for example, a programmed programmable logic device (PLD), a special integrated circuit (ASIC), a microprocessor, a system on chip (SoC), or a digital signal processor (DSP), etc. Two or more of the sub-modules 410-470 may be integrated into a hardware device, or two or more hardware devices independently with each other. It should be understood that the sub-modules 410-470 in the processing module 210 may be implemented via various methods. For example, in some embodiments, the system may be implemented by hardware, software, or a combination of hardware and software, not only by a hardware circuit in a programmable hardware device in a ultra large scale integrated circuit, a gate array chip, a semiconductor such a transistor, or a field programmable gate array, a programmable logic device, but also by a software performed by various processors, and further also by a combination of the hardware and the software above (e.g., firmware).

FIG. 4-B is an exemplary flowchart for order processing performed by the processing module 210 according to some embodiments of the present disclosure. In step 481, the order information may be extracted. The order information extraction module 410 may extract the order information. The order may be a real time order, an appointment order, or a historical order. The order may be transmitted to the processing module 210 from the passenger port 230, or be read from the storage module 220 in real time or not. The order information may include but not limited to a time point when the order is sent, an order number, a start location, a destination, a start time, an arrival time, an acceptable waiting time, a number of passengers, whether agrees to share a vehicle with other passengers, a selected vehicle model, with luggage or not, a mileage, a price, an increasing price by consumer, a price adjustment by service provider, a price adjustment by the system, a status of using red packet, a payment mode (e.g., a cash payment, a credit card payment, an online payment, a remittance payment), order completion status, order selection status by the service provider, order sending status by the consumer, or the like, or any combination thereof. The extracted order information may be stored in the order information extraction module 410, the processing module 210, or any storage device integrated in or independent of the system described anywhere in the present disclosure.

In step 482, the user information may be extracted. The user information extraction module 420 may extract the user information. The user may be a service provider (e.g. the driver) or a service requester (e.g. the passenger). The user information may include but not limited to name, nickname, gender, nationality, age, contact information (phone number, microphone number, social network account (e.g., WeChat number, QQ number, LinkedIn account), or the like, or any way through which a person can be contacted), occupation, grade evaluation, time used, driving experience, vehicle age, vehicle type, vehicle status, vehicle license plate number, driving license number, authentication status, habit/preference of the user, ability of extra services (e.g., extra characteristics including a size of the vehicle trunk, a panoramic sunroof), or the like, or a combination thereof. When the information above and various kinds of other historical information are used in other processing, the historical information during different time intervals may have the same or different effects. For example, the historical information during the time interval that is close to the current order may have the same effect to the processing result compared with that is far from the current order. As another example, the historical information during the time interval that is close to the current order may have more effect to the processing result, while the historical information during the time interval that is far from the current order may have less or no effect to the processing result.

In step 483, the features of the users may be obtained by a calculation. The calculation module 430 may calculate the features of the uses based on the extracted user information. As illustrated in FIG. 4-A, the features of the users may include the similarities between the historical orders and the current orders, the preference rate of the user, the failure rate of the user, the characteristic of responding to orders, the response time of the user, etc. In some embodiments, when calculating the features of the users, the order information may be read.

In step 484, the order information and the features of the users may be determined. The process of the determination may be performed by the determination module 440. In some embodiments, the order information and the features of the users may be both taken into consideration during the process of the determination, for example, time information may be extracted from the order information (e.g., the start time), time thresholds related to the features of the users may be set, then whether the order information matches the features of the users may be determined based on differences between the time information in the order information and the time thresholds. In some embodiment, only the feature of the user may be taken into consideration during the determination process. In the embodiment, one or more steps (not shown) in which a preset condition may be set may be added, a preset condition related to the features of the users may be set in the steps, for example but not limited to a failure rate threshold, a curve of characteristics of responding to orders, a response time threshold, a preference rate threshold, a similarity threshold, etc. The steps (not shown) in which a preset condition may be set may be unnecessary, the preset condition may also be system default, or input by the user. Particularly for example, a failure rate threshold may be set, and the system may determine whether the features of the users satisfy the preset condition by comparing a difference between the failure rates of the users and the failure rate threshold. In step 484, after the order information and the features of the users are determined, a determination result may be generated. The determination result may be transmitted to the ranking module 450 in real time or not.

In step 485, the users may be ranked. The ranking process may be performed based on the determination result. The ranking process may be performed by the ranking module 450. The ranking process may be performed based on the system default, or may be set by the user totally or partially. The ranking process may be performed based on the matching degrees between the order information and the features of the users, or the different degrees between the features of the user and the preset condition. In some embodiments, the users may be scored during the ranking process (see details in FIG. 4-A).

In step 486, orders to be allocated may be generated. The process for generating the orders to be allocated may be performed by the order generation module 460. The order to be allocated may be real time orders or appointment orders. The characteristics of an order to be allocated may include a location where the order is sent, a distance between the location where the order is sent and the diver, a destination of the order, a region where the destination is located in, traffic status around the location where the order is sent, a dynamic price adjustment of the order, a number of passengers, with luggage or not, whether the passenger agrees to share a vehicle with others, etc. In step 486, the orders may be processed, for example, format processing (including but not limited to text, audio, video), content processing (e.g. adding or deleting a part of the contents), etc. The processing above may be performed by the order generation module 460. In step 487, the orders may be allocated to the users based on the ranking result. The allocation process may be performed by the order allocation module 470.

The description of the order processing process is provided for illustration purposes, and should not be considered as the only practical embodiment. For persons having ordinary skills in the art, after understanding the principle of various algorithms, without departing the principle, may make any modification or variation to the forms and details of the order processing process. However, these modifications are still within the scope of the present disclosure. For example, in some embodiments, the determination step 484 and the ranking step 485 may be integrated into a single step, the determination process and the ranking process may be performed alternatively or simultaneously. In some embodiments, other optional conditions may added between any two steps, for example, storing a result of any step.

Figure 5:
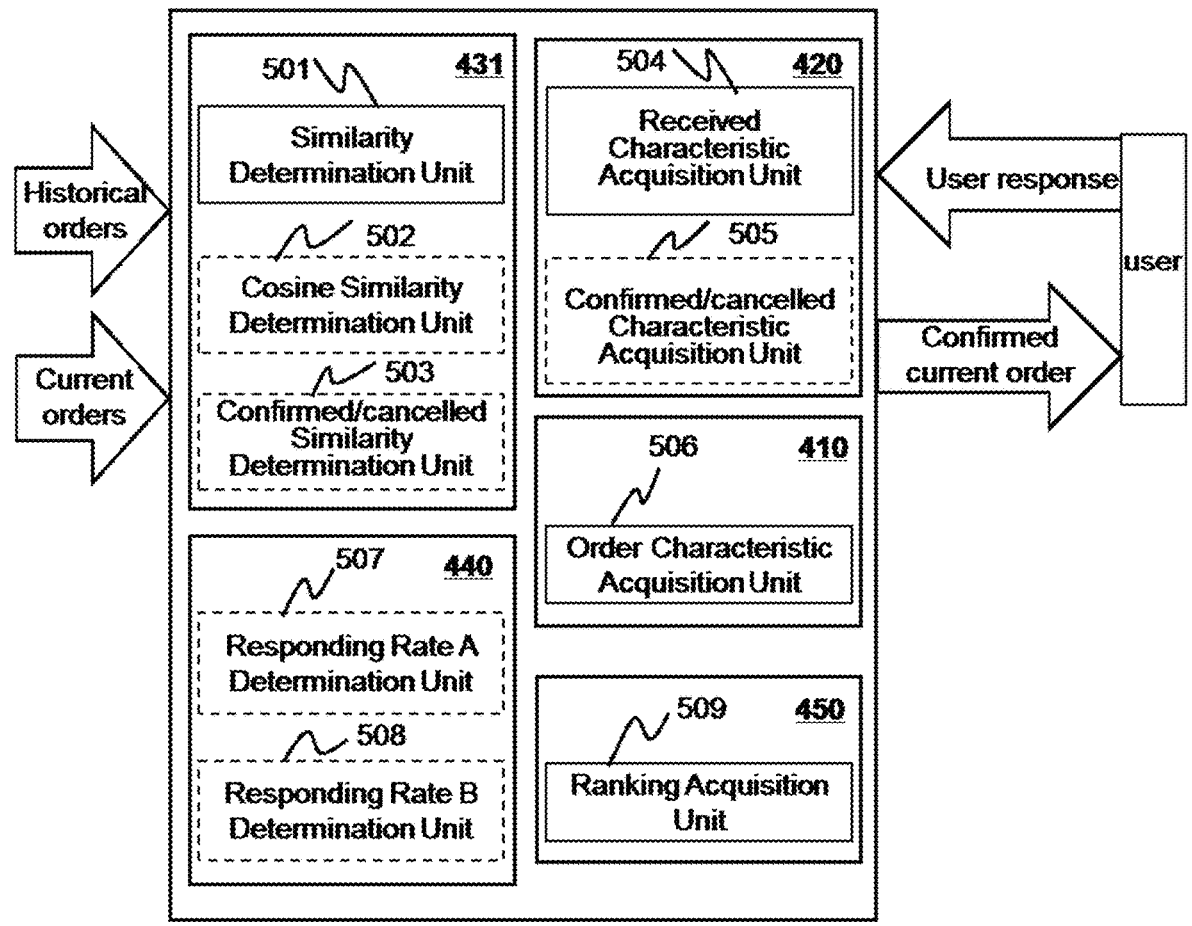
FIG. 5 is a schematic diagram illustrating a process for allocating orders based on order similarities according to some embodiments of the present disclosure.

FIG. 5 is an exemplary system diagram illustrating a process for allocating orders based on order similarities by the processing module 210 according to some embodiments in the present disclosure. As shown in FIG. 5, in some embodiments, the similarity calculation unit 431 may include a similarity determination unit 501, and/or a cosine similarity determination unit 502 and a confirmed/cancelled similarity determination unit 503. The order information extraction module 410 may include an order characteristic acquisition unit 506 and other units (not shown). The user information extraction module 420 may include a received characteristic acquisition unit 504, and/or a confirmed/cancelled characteristic acquisition unit 505. The determination module 440 may include a responding rate A determination unit 507, and/or a responding rate B determination unit 508. The ranking module 450 may include a ranking acquisition unit 509 and other units (not shown). The units shown in FIG. 5 may be connected to or communicate with each other via a wired or wireless connection.

As illustrated in FIG. 5, the processing module 210 may read historical orders and current orders. In some embodiments, as used herein, the historical orders may refer to historical orders within a certain time interval from the current time (e.g., 5 minutes, 10 minutes, 1 hour, 5 hours, 10 hours, 20 hours, 1 day, 2 days, 5 days, 10 days, 1 month). The time interval herein may be system default, or be adjusted in real time depending on different situations. For example, in some embodiments, if there is no historical order for a driver in the last 5 days, the time interval may be set as 10 days or longer. As another example, in some embodiments, if there are relatively large amount of historical orders within a certain time interval (e.g., a time interval prior to the current time) for a driver, the time interval may be set as a relatively small time interval (e.g., 2 days prior to the current time) in the premise that the statistical result is accurate. In some embodiments, the historical order herein may refer to a certain amount (e.g., 5, 10, 20, 50, 100) of historical orders recently. When the historical orders are used in subsequent process, the historical information during different time intervals may have the same or different effects. For example, the historical information during the time interval that is close to the current order may have the same effect to the processing result compared with that is far from the current order. As another example, the historical information during the time interval that is close to the current order may have more effect to the processing result, while the historical information during the time interval that is far from the current order may have less or no effect to the processing result.

As used herein, the current order may refer to an order sent by a passenger in the current time or an order sent by a passenger prior to the current time but has not been allocated. As used herein, the current order may refer to a real time order or an appointment order. In some embodiments, the current order may refer to an order that is prepared to be presented to users or is being presented to the users. For example, the current order may refer to an order that has not been presented to the users, or that is being presented to some of the users but not presented to the others. The current order may be sent by a passenger directly, or may be forwarded by other organizations (e.g., a website).

The order characteristic acquisition unit 506 may be used to acquire characteristics of current orders. The characteristics of a current order may include but not limited to a location where the order is sent, a region where the order is sent, a distance between the location where the order is sent and the user, a time point when the order is sent, a time interval during which the order is sent, a start time and a start time interval of an appointment order, a start location and a start region of an appointment order, a destination of the order, a destination region of the order, a destination type of the order (e.g., an airport, a train station, a hospital, a school, a market), a real time location of the passenger, a distance between the real time location of the passenger and the user, a traffic status around the start location or the destination of the order, an increasing price of the order (e.g., a tip that the passenger is willing to pay), etc. In some embodiments, characteristics of a historical order may include an acceptable waiting time of the passenger, a number of passengers, with luggage or not, whether agrees to share a vehicle with other passengers, etc.

The received characteristic acquisition unit 504 may be used to acquire characteristics of historical orders received by the user. In some embodiments, a "user" described in FIG. 5 may refer to a "driver". The characteristics of the historical orders received by the user may also include but not limited to the characteristics of a current order described above. The confirmed/cancelled characteristic acquisition unit 505 may be used to acquire characteristics of historical orders confirmed or canceled by the user. As used herein, the historical order confirmed by the user may refer to an order responded to by the user (responding to an order successfully or unsuccessfully may both be referred to as responding to an order) or an order allocated to the user by the system. The historical order cancelled by the user may refer to an order that is not responded to by the user or an order that is cancelled by the user for some reasons. When the information above and various kinds of other historical information are used in other processing, the historical information during different time intervals may have the same or different effects. For example, the historical information during the time interval that is close to the current order may have the same effect to the processing result compared with that is far from the current order. As another example, the historical information during the time interval that is close to the current order may have more effect to the processing result, while the historical information during the time interval that is far from the current order may have less or no effect to the processing result.

The similarity determination unit 501 may be used to determine similarities between the current orders and the received historical orders based on the characteristics of the received historical orders and the characteristics of the current orders. The cosine similarity determination unit 502 may determine cosine similarities between the current orders and the received historical orders. The confirmed/cancelled similarity determination unit 503 may be used to determine similarities between the current orders and the historical orders that are confirmed by the user, and similarities between the current orders and the historical orders that are cancelled by the user. In some embodiments, the cosine similarity determination unit 502 and the confirmed/cancelled similarity determination unit 503 may be integrated in the similarity determination unit 501. In some embodiments, the similarity determination unit 501 may include one or more other similarity determination units (not shown) that may be used to determine other similarities between the current orders and the historical orders received by the user. The historical information during the time interval that is close to the current order may have the same effect to the processing result compared with that is far from the current order. As another example, the historical information during the time interval that is close to the current order may have more effect to the processing result, while the historical information during the time interval that is far from the current order may have less or no effect to the processing result. In some embodiments, the similarities may be determined by comparing the current orders with historical orders that are confirmed by the user within a time interval which is less than or equal to a threshold from the time of the current order.

The responding rate A determination unit 507 may be used to determine a probability that a user confirms a current order based on the determined similarities and the characteristics of the current order. The responding rate B determination unit 508 may be used to determine a probability that the user confirms the current order based on a machine learning model. The machine model may include the similarities between the current order and the historical orders confirmed by the user, the similarities between the current order and the historical orders cancelled by the user, the characteristics of the current order, etc. The machine model may be undated in real time, or in a certain time interval (e.g., per day, every 2 days, every 10 days, every month), or may be updated at a defined time of a day (e.g., 0:00, 9:00, 12:00, 20:00). In some embodiments, the responding rate A determination unit 507 and the responding rate B determination unit 508 may be integrated in an independent unit used to determine the probability that the user confirms the current order based on the machine model or other models simultaneously or not. The ranking acquisition unit 509 may be used to rank the users based on the determined similarities, the characteristics of the current order, etc. In some embodiments, the ranking acquisition unit 509 may score the users (see details in FIG. 4-A).

The description above about the processing module is provided for illustration purposes, and should not be considered as the only practical embodiment. Any module or unit above may be implemented by one or more components, and the functions of the modules or units are not limited within the scope of the present disclosure. For persons having ordinary skills in the art, after understanding the principle of order processing, without departing the principle, may make any modification and variation to the forms and details of the specific embodiments and process and may make any simple derivation and substitution, and without further efforts, the persons may make any modification or combination to the modules or units. However, these modifications and variations are still within the scope of the descriptions above. For example, a storage unit used to store intermediate data or processing result generated during the process of the modules or units. In addition, one or more units may be integrated in an independent unit that may implement the functions of the one or more units. The units expressed with dash line may be unnecessary, and may be added or deleted according to particular application scenarios.

Figure 6:
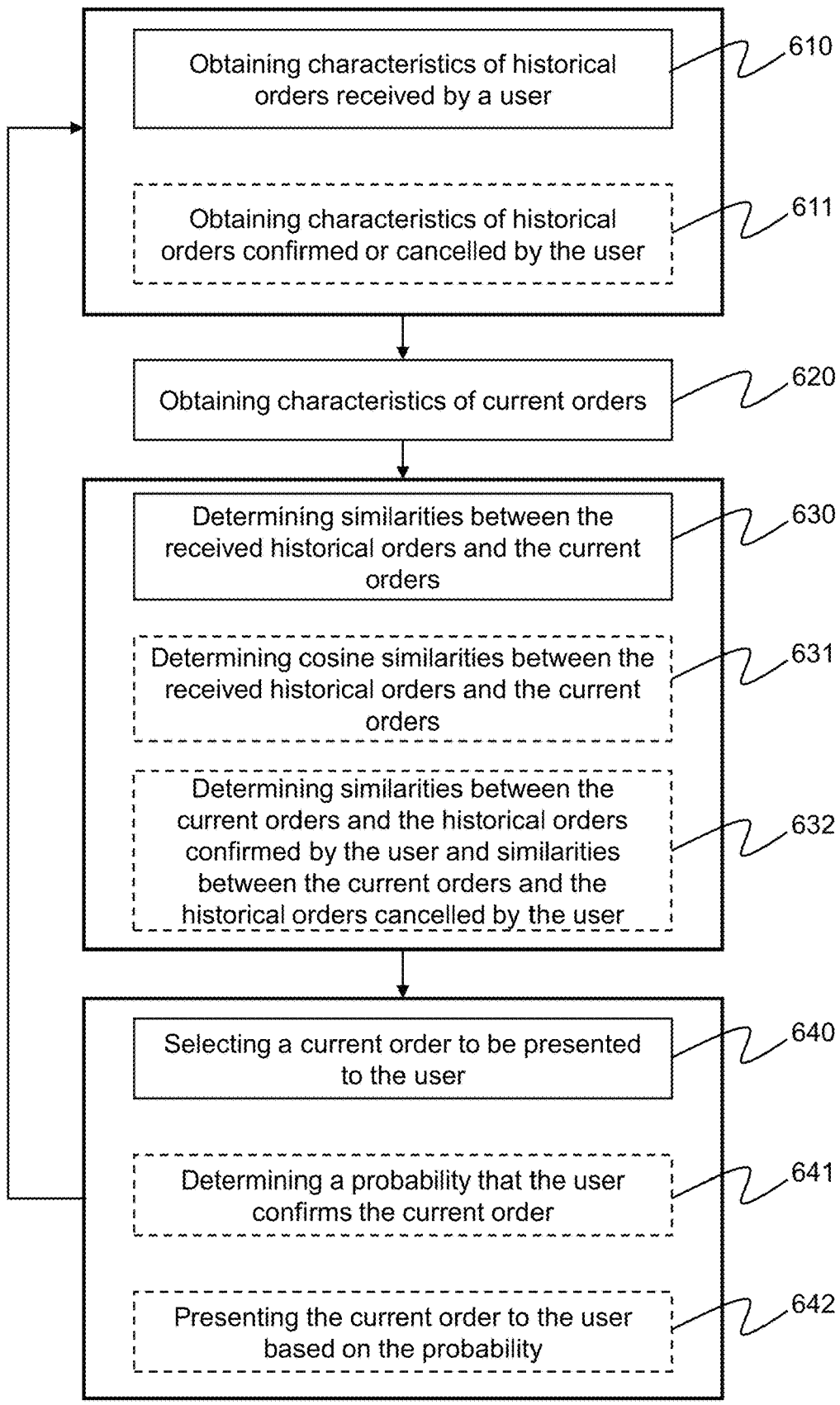
FIG. 6 is an exemplary flowchart for allocating orders based on order similarities according to some embodiments of the present disclosure.

FIG. 6 is an exemplary flowchart illustrating a process for allocating orders based on order similarities according to some embodiments of the present disclosure. In some embodiments, a "user" described in FIG. 6 may refer to a "driver". In step 610, characteristics of historical orders received by a user may be obtained. The received characteristic acquisition unit 504 may obtain the characteristics of the historical orders. Step 610 may include step 611 in which characteristics of historical orders confirmed or canceled by the user may be obtained. Step 611 may be performed by the confirmed/cancelled characteristic acquisition unit 505. As shown in FIG. 5, the historical orders may refer to historical orders within a certain time interval from the current time, or a certain amount of historical orders prior to the current order, or both. During a time period in which the historical orders were presented, the user may respond to the historical orders in real time or not, for example, the user may confirm a historical order, cancel a historical order, build a setting related to a preference for the confirmed orders, etc. As used herein, "the user confirmed a historical order" may refer to that the user responded to the order (responding to the order successfully or unsuccessfully may both refer to responding to the order), or that the system allocated an order to the user.

"The user canceled a historical order" may refer to that the user didn't respond to the order, or that the user cancelled the order for some reasons. In some embodiments, no response by the user to the historical order may be considered that the user cancelled the historical order. After the user responded to the historical order, the response may be transmitted to the order processing engine 110.

In some embodiments, the historical orders confirmed by the user, the historical orders cancelled by the user, or the preference of the user may be stored in a log for responding to orders. The log for responding to orders may be stored in the user terminal 140 or the server 105. In some embodiments, the log for responding to orders may be stored in a caching of the server 105, for example, a log for responding to orders including recent 20 responses may be stored in the caching as a historical log for responding to orders. The log for responding to orders may be updated according to a preset setting, for example, may be updated synchronously according to a preset period (e.g., add the newest logs for responding to orders and delete the old logs for responding to orders every 15 minutes). In some embodiments, the log for responding to orders may be pre-processed. The pre-processing may include a format processing, a text processing, etc.

In some embodiments, the characteristics of the historical orders may include a location where the order is sent, a region where the order is sent, a distance between the location where the order is sent and the user, a time point when the order is sent, a time interval during which the order is sent, a start time and a start time interval of an appointment order, a start location and a start region of an appointment order, a destination of the order, a destination region of the order, a destination type of the order (e.g., an airport, a train station, a hospital, a school, a market), a real time location of the passenger, a distance between the real time location of the passenger and the user, a traffic status around the start location or the destination of the order, an increasing price of the order (e.g., a tip that the passenger is willing to pay), etc. In some embodiments, characteristics of a historical order may include an acceptable waiting time of the passenger, a number of passengers, with luggage or not, whether agrees to share a vehicle with other passengers, etc.

In some embodiments, the characteristics of the historical orders may be extracted from the log for responding to orders directly or indirectly. For example, destination information of a historical order may be determined from text information of the historical order directly. As another example, the distance between the location where the order is sent and the user may be determined based on location information of the order and location information of the user. As another example, the text information in the order may be analyzed and processed in order to determine the destination type of the order.

In step 620, the characteristics of current orders may be obtained. The order characteristic acquisition unit 506 may obtain characteristics of the orders. As shown in FIG. 5, the current order may be an order that is sent by the passenger, or is forwarded by other organizations (e.g., a website). The current order may be a real time order or an appointment order. The characteristics of the current order may include but not limited to a location where the order is sent, a region where the order is sent, a distance between the location where the order is sent and the user, a time point when the order is sent, a time interval during which the order is sent, a start time and a start time interval of an appointment order, a start location and a start region of an appointment order, a destination of the order, a destination region of the order, a destination type of the order (e.g., an airport, a train station, a hospital, a school, a market), a real time location of the passenger, a distance between the real time location of the passenger and the user, a traffic status around the start location or the destination of the order, an increasing price of the order (e.g., a tip that the passenger is willing to pay), etc. In some embodiments, the characteristics of the current order may include an acceptable waiting time of the passenger, a number of passengers, with luggage or not, whether agrees to share a vehicle with other passengers, etc.

In step 630, similarities between the current orders and the received historical orders may be determined. Step 630 may be performed by the similarity determination unit 501. Step 630 may include step 631 and step 632 in which similarities between the current orders and the received historical orders and similarities between the current orders and the historical orders confirmed/cancelled by the user may be determined respectively. Step 631 and step 632 may be respectively performed by the cosine similarity determination unit 502 and the confirmed/cancelled similarity determination unit 503. In some embodiments, the characteristics of the current orders and the characteristics of the received historical orders may be expressed by vectors. Therefore, in step 630, the similarities between the current orders and the received historical orders may be calculated based on the vectors. Particularly, in step 631, a cosine similarity between two vectors may be calculated based on a cosine similarity formula to obtain a cosine similarity between a current order and a received historical order. In some embodiments, each current order may be expressed by a vector, and therefore the similarities between each current order and the received historical orders may be determined respectively. In some embodiments, in step 632, after the similarities between the current orders and the historical orders confirmed/cancelled by the user are determined, a normalization processing may be performed on the determined similarities. For example, the similarities may be integrated as a value within 0-1 as a similarity eigenvalue according to a time-decaying coefficient. As another example, the similarities between the current orders and the historical orders confirmed/cancelled by the user may be integrated into a similarity eigenvalue.

In step 640, a current order to be presented to the user may be selected based on the determined similarities. Step 640 may be performed by the determination module 440 and/or the ranking module 450. Step 640 may include step 641 (determining a probability that the user confirms the current order) and step 642 (presenting the current order to the user based on the probability). In step 641, the probability that the user confirms the current order may be determined based on a machine learning model. The process for determining the probability that the user confirms the current order may be performed by the responding rate A determination unit 507 and/or the responding rate B determination unit 508. In some embodiments, features of the machine leaning model may include training features and target features. The training features may include characteristics of a plurality of orders received by the system, and the target features may include responses of the users to the orders. In some embodiments, the training features and the target features may be analyzed, assessed, or predicted based on a local server or a cloud server (e.g. a big data server), and the probability that the user confirms the current order may be determined based on a statistic analysis. In some embodiments, the machine learning model may be a logistic regression model, a support vector machine model, etc. In some embodiments, the probability that the user confirms the current order may be determined based on a statistics analysis.

In step 642, after the probabilities that the users confirm the current order are determined, the users may be ranked based on the probabilities. The ranking process may be performed by the ranking acquisition unit 509. In some embodiments, the ranking may be performed based on the values of the probabilities. After the users are ranked, the current order may be presented to the users based on the ranking result. In some embodiments, a user with a highest ranking may be selected and the current order may be presented to the user. In some embodiments, the users with the top rankings (e.g. the top 3 rankings) may be selected and the current order may be presented to the users. The process for presenting the current order to the user(s) may be performed by the driver port 240, and the current order may be presented by a format of voice broadcast or text display. After step 640 ends, the process may return to step 610 to start a new process.

The description of the order processing process is provided for illustration purposes, and should not be considered as the only practical embodiment. For persons having ordinary skills in the art, after understanding the principle of various algorithms, without departing the principle, may make any modification or variation to the forms and details of the order processing process. However, these modifications are still within the scope of the present disclosure. For example, step 611 and step 620 may be performed in any order, in sequence, or at the same time. Step 611 may be omitted. Similarly, any one or more steps of step 631 and step 632 may be omitted, the two steps may be integrated into an independent step, or may be divided into multiple steps. Similarly, step 641 and step 642 may be processed in the same way.

Figure 7:
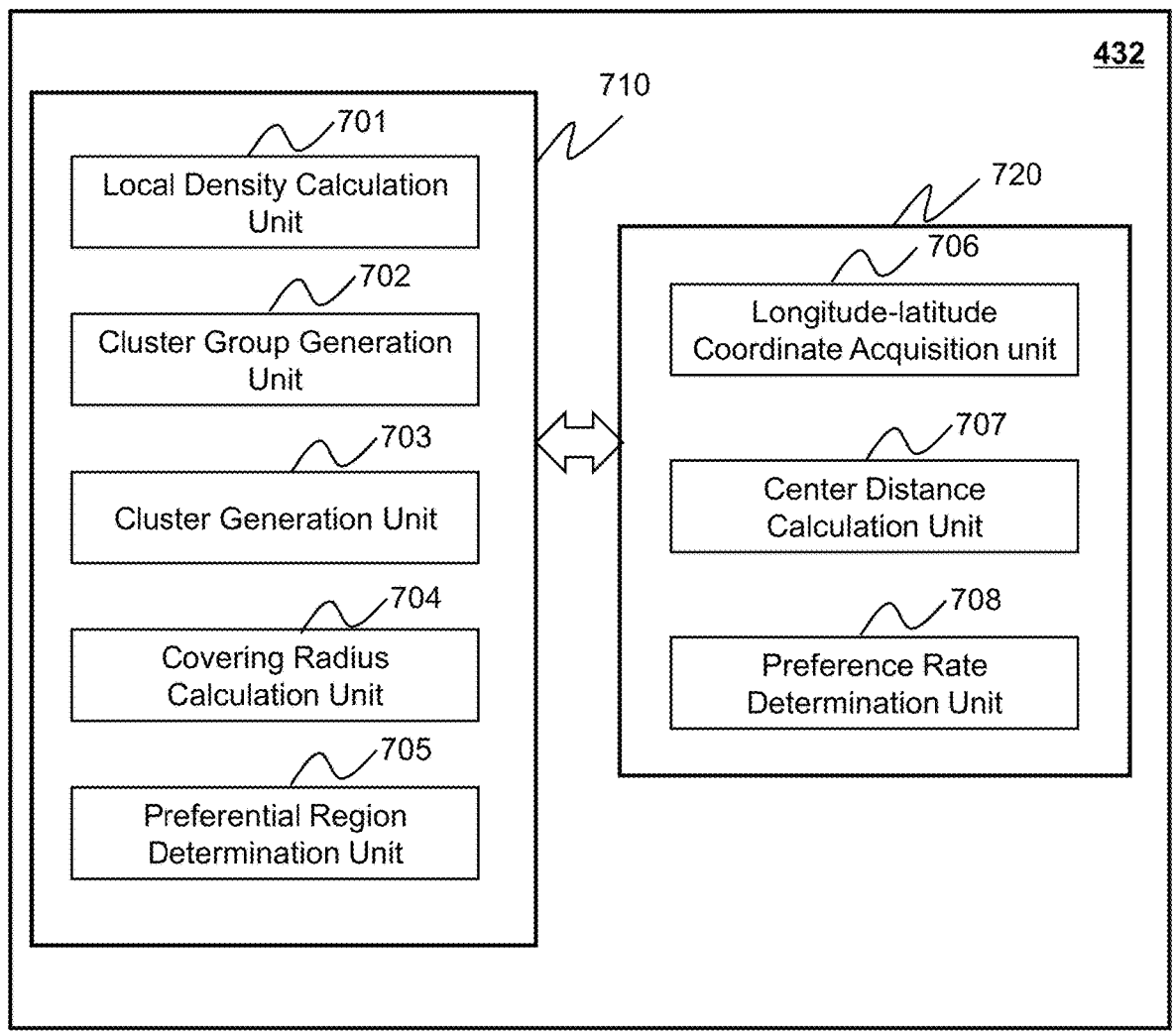
FIG. 7 is a schematic diagram illustrating a process for allocating orders based on preference rates according to some embodiments of the present disclosure.

FIG. 7 is an exemplary system diagram of the preference rate calculation unit 432 in the processing module 210 according to some embodiments of the present disclosure. In some embodiments, a "user" described in FIG. 7 may refer to a "driver". As shown in FIG. 4-A and FIG. 4-B, in some embodiments, the system may allocate orders based on user preference rates. The user preference rate may be manually input by the user, or may be obtained by the system. In some embodiments, the system may extract the user information and/or the order information, and obtain the user preference rate via the preference rate calculation unit 432. As shown in FIG. 7, the preference rate calculation unit 432 may include a preferential region determination part 710 and a preference rate determination part 720. The preferential region determination part 710 may include a local density calculation unit 701, a cluster group generation unit 702, a cluster generation unit 703, a covering radius calculation unit 704, and a preferential region determination unit 705. The preference rate determination part 720 may include a longitude-latitude coordinate acquisition unit 706, a center distance calculation unit 707, and a preference rate determination unit 708.

In some embodiments, the local density calculation unit 701 may be used to calculate a local density $\rho_i$ of a longitude-latitude coordinate point based on a preset cutoff distance $d_c$. The preset cutoff distance $d_c$ may be system default, or may be calculated by the system based on destination information of historical orders of a user. In some embodiments, historical order information within a certain time interval (e.g., 5 minutes, 10 minutes, 1 hour, 5 hours, 10 hours, 20 hours, 1 day, 2 days, 5 days, 10 days, 1 month) may be extracted. In some embodiments, historical order information of a certain amount of historical orders (e.g., 5, 10, 20, 50, 100) may be extracted. In some embodiments, historical orders that satisfy both of the conditions above may be extracted. As used herein, the longitude-latitude coordinate point may refer to a longitude-latitude coordinate of a specific location, for example, a longitude-latitude coordinate of a specific location may be expressed as (a, b), where, a represents longitude coordinate and b represents latitude coordinate.

The local density of the coordinate point may be calculated according to equation (1) below:

$$\rho_i = \Sigma X(d_{ij} - d_c), \quad (1)$$

where $\rho_i$ may represent a number of the coordinate points with distances to the coordinate point i less than the cutoff distance $d_c$, and, $$\text{where } (x) = \begin{cases} 1, & \text{if } x < 0 \\ 0 & \text{if } x \gg 0 \end{cases}. \quad (2)$$

The cluster group generation unit 702 may be used to generate one or more cluster groups. In some embodiments, a center clustering may be performed on each longitude-latitude coordinate point based on the local density $\rho_i$ of the longitude-latitude coordinate i and a preset density threshold rho to generate a plurality of cluster groups. The preset density threshold rho may be set based on a number of the historical orders within a preset time interval, or be system default. In some embodiments, if the number of the historical orders within the preset time interval is relatively large, the preset density threshold rho may be set as a relatively large value; otherwise, the preset density threshold rho may be set as a relatively small value.

The cluster generation unit 703 may be used to generate one or more clusters. In some embodiments, distances between centers of any two cluster groups may be calculated, cluster groups with distances less than a preset distance may be screened out, and the two cluster groups may be merged to generate a plurality of clusters. The preset distance may be system default, or may be different under different situations. When calculating the distance between centers of any two cluster groups, if the distance between the centers of the two cluster groups is less than the preset distance, a center of the cluster group with a lower local density may be integrated into that with a higher local density.

The covering radius calculation unit 704 may be used to calculate a covering radius of the cluster. In some embodiments, an average distance of distances between the longitude-latitude coordinate points in the cluster and the center of the cluster may be calculated, and the average distance may be defined as the covering radius of the cluster. In some embodiments, the covering radius calculation unit 704 may include one or more model units (not shown), the model units (not shown) may include one or more mathematic models, one or more simulation models, etc. When calculating the covering radius, different models may be read for calculation.

The preferential region determination unit 705 may be used to determine a preferential region of the user. In some embodiments, a center and a covering radius of the preferential region may be determined based on the center and the covering radius of each cluster.

In some embodiments, the same user may have different preferential regions in different situations. For example, at morning peak period or evening peak period, the preferential region of the user may be a remote region where the traffic status is relatively good. As another example, the preferential regions of the user on workdays or at weekends may be different. Therefore, in some embodiments, the time factor or other related factors may be taken into consideration during determining the preferential region of the user.

The longitude-latitude coordinate acquisition unit 706 may be used to obtain a longitude-latitude coordinate of a destination of an order to be allocated. The longitude-latitude coordinate acquisition unit 706 may include one or more address resolution units (not shown), the address resolution unit (not shown) may be used to extract address information of the destination and subsequently resolve longitude-latitude coordinate information of the destination.

The center distance calculation unit 707 may be used to calculate a distance between the longitude-latitude coordinate of the destination of the order to be allocated and the center of the preferential region of the user. In some embodiments, the center distance calculation unit 707 may include an order destination information buffer (not shown) and a user preferential region buffer (not shown).

The preference rate determination unit 708 may be used to determine a preference rate of a user. In some embodiments, a preference rate L corresponding to the destination of the order to be allocated may be calculated based on the distance and the covering radius of the user preferential region according to equation (3) below:

$$L = \Sigma 1/(1+e^{A_z-d}), \quad (3)$$

where $A_z$ represents the distance between the longitude-latitude coordinate of the destination of the order to be allocated and the center of the destination preferential region of the user, d represents the covering radius of the preferential region of the user.

The description above about the preference rate calculation unit is provided for illustration purposes, and should not be considered as the only practical embodiment. Any module or unit above may be implemented by one or more components, and the functions of the modules or units are not limited within the scope of the present disclosure. For persons having ordinary skills in the art, after understanding the principle of the calculation of the preference rate, without departing the principle, may make any modification and variation to the forms and details of the specific embodiments and process of the preference rate calculation unit and may make any simple derivation and substitution, and without further efforts, the persons may make any modification or combination to the modules or units. However, these modifications and variations are still within the scope of the descriptions above. For example, the preference rate calculation unit 432 may include one or more user interfaces (not shown), a user may manually input the preferential region of the user, the user preference rate, or other related information via the user interfaces. One or more storage units (not shown) may be integrated in the preference rate calculation unit 432 used to store intermediate data or a final result generated during the calculations or processes performed by the units.

Figure 8:
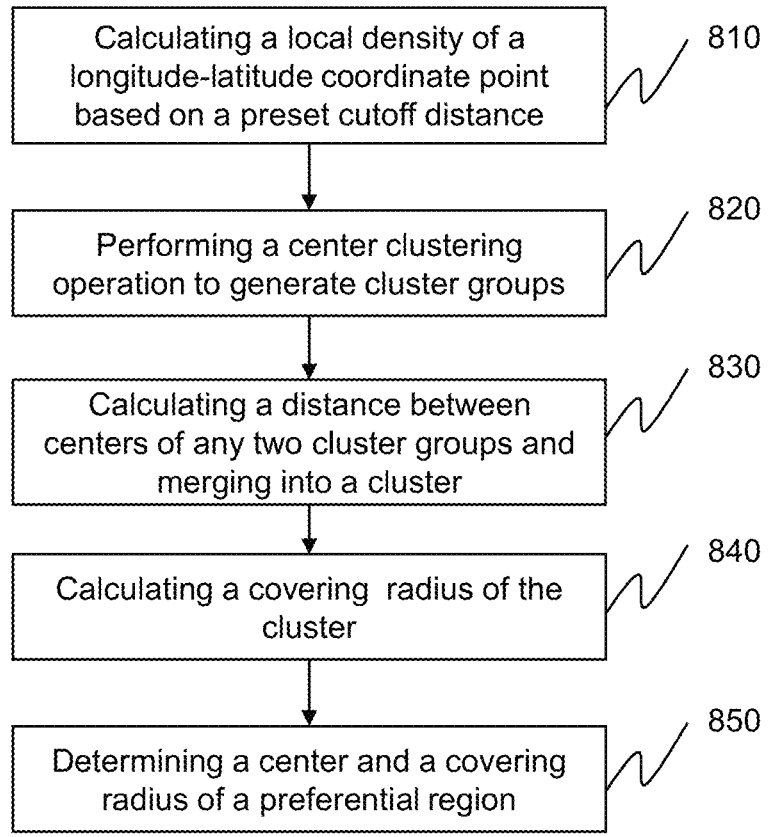
FIG. 8 is an exemplary flowchart for calculating a preferential region according to some embodiments of the present disclosure.

FIG. 8 is an exemplary flowchart for calculating a preferential region of a user according to some embodiments of the present disclosure. A "user" described in FIG. 8 may refer to a "driver". In step 810, a local density $\rho_i$ of each longitude-latitude coordinate point i may be calculated based on a preset cutoff distance $d_c$. Step 810 may be performed by the local density calculation unit 701. As shown in FIG. 7, the preset cutoff distance $d_c$ may be system default, or may be calculated by the system based on destination information of historical orders of the user. For example, the preset cutoff distance $d_c$ may be set based on an average of longitude-latitude coordinates of historical destinations within a preset time interval (e.g., 20 hours) and a number of the historical orders within the preset time interval. Particularly for example, assuming that the number of historical orders within a preset time interval (e.g., 20 hours) is 5, and longitude-latitude coordinates of destinations of the 5 historical orders may be expressed as a set [(110, 80), (112.5, 85), (115, 90), (117.5, 95), (120, 100)]. An average of the longitude-latitude coordinates of the destinations of the 5 historical orders may be determined as (115, 90), therefore, a start point of the preset cutoff distance $d_c$ may be set as (115, 90) and a length may be set as $\sqrt{125}$. The local density $\rho_i$ of the longitude-latitude coordinate point may be calculated based on equation (1) above.

In step 820, a center clustering operation may be performed on the longitude-latitude coordinate points based on the local density $\rho_i$ of the longitude-latitude coordinate i and the preset density threshold rho to generate a plurality of cluster groups. Step 820 may be performed by the cluster group generation unit 702. In some embodiments, according to a relative relationship between the local density $\rho_i$ and the preset density threshold rho, the longitude-latitude coordinate points may be classified into three types: if the local density of a longitude-latitude coordinate point is larger than the preset density threshold, the longitude-latitude coordinate point may be determined as the center of the cluster; if the local density of a longitude-latitude coordinate point is smaller than the preset density threshold, and if a center occurs within the scope of the preset cutoff distance of the longitude-latitude coordinate point, the longitude-latitude coordinate point may be determined as a center of a non-cluster; if the local density of a longitude-latitude coordinate point is smaller than the preset density threshold, and if no center occurs within the scope of the preset cutoff distance of the longitude-latitude coordinate point, the longitude-latitude coordinate point may be determined as a noise point.

In step 830, a distance between centers of any two cluster groups may be calculated, cluster groups with distances less than a preset distance may be screened out, and the two cluster groups may be merged, and then a plurality of clusters may be generated. Step 830 may be performed by the cluster generation unit 703. In some embodiments, the preset distance may be adjustable, for example, different users may correspond to different preset distances; similarly, different time intervals may correspond to different preset distances.

In step 840, an average distance of distances between the longitude-latitude coordinate points in the cluster and the center of the cluster may be calculated, and the average distance may be defined as the covering radius of the cluster. Step 840 may be performed by the covering radius calculation unit 704. In some embodiments, if only one cluster corresponds to the longitude-latitude coordinate points of the destinations of the historical orders within a preset time interval, the average distance of the distances between the longitude-latitude coordinate points in the cluster and the center of the cluster may be defined as the covering radius of the cluster; if a plurality of clusters correspond to the longitude-latitude coordinate points of the destinations of the historical orders within the preset time interval, the average distance of the distances between the longitude-latitude coordinate points in the cluster and the center of the cluster may be calculated respectively and the calculated average distances may be defined as the covering radiuses of the clusters respectively.

In step 850, a center and a covering radius of a destination preferential region of the user may be determined based on the center and the covering radius of each cluster. Step 850 may be performed by the preferential region determination unit 705.

The description of the process for determining the preferential region is provided for illustration purposes, and should not be considered as the only practical embodiment. For persons having ordinary skills in the art, after understanding the principle of the calculation of the preferential region, without departing the principle, may make any modification or variation to the forms and details of the process for determining the preferential region. However, these modifications are still within the scope of the present disclosure. For example, step 820 and step 830 may be combined as an independent step, that is, the process for generating a cluster group and the process for generating a cluster may be performed alternatively. As another example, in some embodiments, one or more caching steps used for caching intermediate data during the calculation may be added to the flowchart shown in FIG. 8; and/or one or more pre-processing steps used for pre-processing the data during the process. As a further example, one or more preset steps may be added used for presetting any preset value during the process, for example, the preset cutoff distance, the preset distance between the cluster groups, etc.

Figure 9:
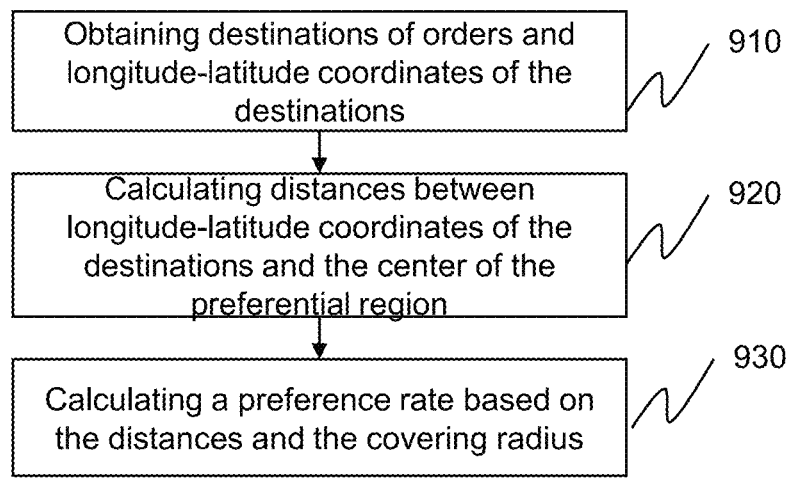
FIG. 9 is an exemplary flowchart for calculating a preference rate according to some embodiments of the present disclosure.

FIG. 9 is an exemplary flowchart for calculating a user preference rate according to some embodiments of the present disclosure. In some embodiments, a "user" described in FIG. 9 may refer to a "driver". As shown in FIG. 9, in step 910, a destination of an order and a longitude-latitude coordinate of the destination may be acquired. The longitude-latitude coordinate acquisition unit 706 may acquire the longitude-latitude coordinate of the destination. In step 920, a distance $A_z$ between the longitude-latitude coordinate of the destination of the order to be allocated and the center of the preferential region of each user may be calculated. Step 920 may be performed by the center distance calculation unit 707. In step 930, a user preference rate L of each user corresponding to the destination of the order to be allocated may be calculated based on equation (3) above based on the distance $A_z$ and the covering radius d of the preferential region of each user. Step 930 may be performed by the preference rate determination unit 708.

In some embodiments, before calculating the preference rate L corresponding to the destination of the order to be allocated, one or more steps not shown in FIG. 9 may be added. In some embodiments, a step in which a start location of the order to be allocated and a start region including the start location may be acquired may be added, and a step in which users within the start region may be acquired may be added. While determining the start region, a preset scope may be set. The preset scope may be system default, or may be adjusted dynamically under different situations. In some embodiments, the value of the preset scope may be set and adjusted according to a traffic flow of the city, a location of a region, a traffic status, etc. For example, if the start region of the order is within a region in which the traffic status is good, the value of the preset scope may be set as a relatively large value; otherwise the value of the preset scope may be set as a relatively small value.

In some embodiments, a step in which the destination preferential region of each user within a preset scope of the start location may be acquired may be added. In some embodiments, a step in which historical order information of each user (e.g., destination information, longitude-latitude coordinates of the destinations) within a preset time interval may be acquired may be added. The historical orders may include orders with different modes, for example, taxi, special car, fast car, free car, bus, etc. The historical order information may include a start location, a destination, a start time, a number of orders, etc.

In some embodiments, a user preference may be acquired based on the destination information. For example, the user preference may be acquired based on the destination information input by the user via a terminal. The destination information may be a geographic name (e.g., Shangdi), a coordinate on a map (e.g., a longitude-latitude coordinate), a range (e.g., 2 kilometer nearby Huilongguan), etc. For example, some usually used destination information may be set for quick selection. In some embodiments, if the destination information is consistent with the destination of the order, a user may be determined for the order. For example, if the destination information acquired from some users is Shangdi, and the destination of the order is Shangdi, the users may be determined for the order. In some embodiments, the destination information may be not consistent with the destination of the order. For example, if the destination of the order is A, the destination information of a user is B, A is not consistent with B, but the number of orders starting from A to B is relatively large and intensive, the user whose destination information is B may be determined for the order. Then, after the user completes the order, it may be easy for him/her to respond to orders of which destinations are B. For example, path(s) with intensive orders may be determined by big data processing. For example, data within a time interval (e.g., a month) may be analyzed, calculated, classified to obtain a statistical analysis result. As another example, one or more alternative conditions (e.g., weather factor, traffic factor, preferential parameters of passengers/drivers) may be added during the statistical process.

In some embodiments, the user preference rate may be acquired by analyzing the historical order information of the user. Weighting coefficients may be assigned to information elements in the historical orders and the user preference rate may be calculated based on the weighting coefficients. For example, while the order amount is taken into consideration, if the order amounts of the historical orders of user A are similar with that of the order to be allocated, the user A may be given a high-level priority, otherwise, if far away, the user A may be given a low-level priority. After the weighting coefficients are assigned to the information elements in the historical orders, a weighted sum of the information elements may be calculated to obtain a user score. For example, the user score may be calculated based on equation (4) below:

$$S = w_1 * v_1 + w_2 * v_2 + \ldots + w_m * v_m, \quad (4)$$

where vi may represent a normalization score of an information element i, wi may represent a weighting coefficient of the information element i. After the user score of each user is calculated, the users may be ranked based on a preset score threshold, and orders may be allocated to the users based on the ranking result.

Figure 10:
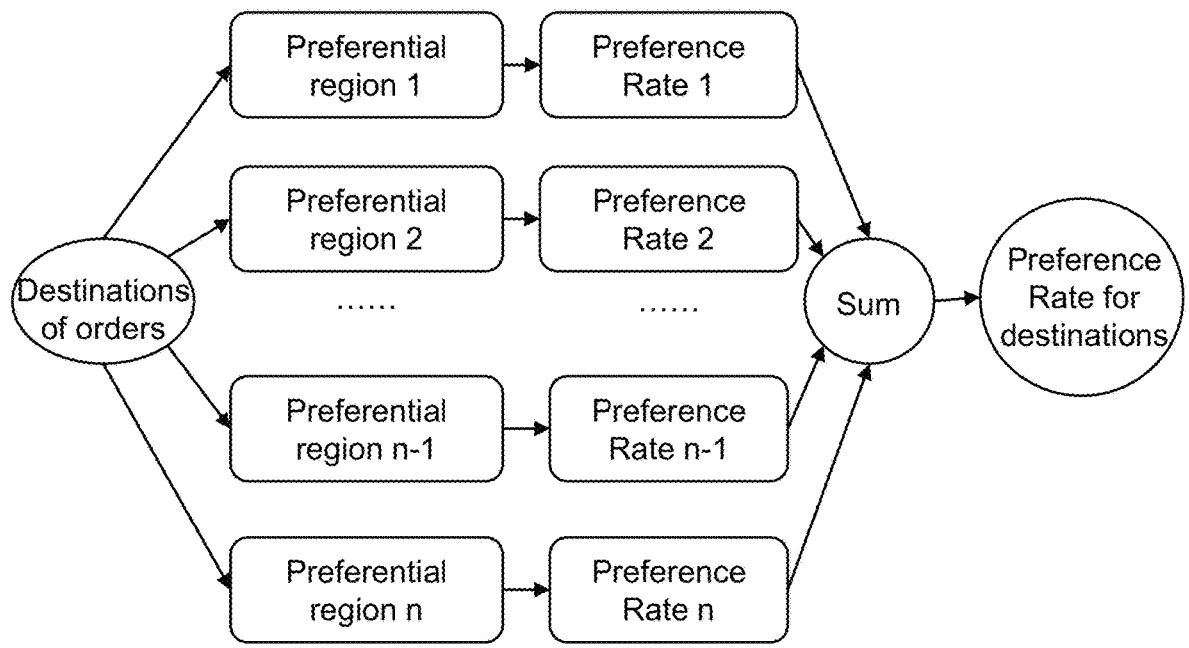
FIG. 10 is a schematic diagram illustrating the principle for calculating a preference rate according to some embodiments of the present disclosure.

FIG. 10 is a schematic diagram illustrating the principle for calculating a user preference rate according to some embodiments of the present disclosure. In some embodiments, a "user" described in FIG. 10 may refer to a "driver". As shown in FIG. 10, if a user has multiple preferential regions, corresponding preference rates may be calculated respectively based on the preferential regions. The preference rates corresponding to the multiple preferential regions may be summed to obtain the preference rate for the destination of the order. The preference rate may be calculated based on equation (5) below:

$$L = 1/(1 + e^{+A_{1z} - d_1}) + 1/(1 + e^{+A_{2z} - d_2}) + \ldots + 1/(1 + e^{+A_{nz} - d_n}) \quad (5)$$

Figure 11:
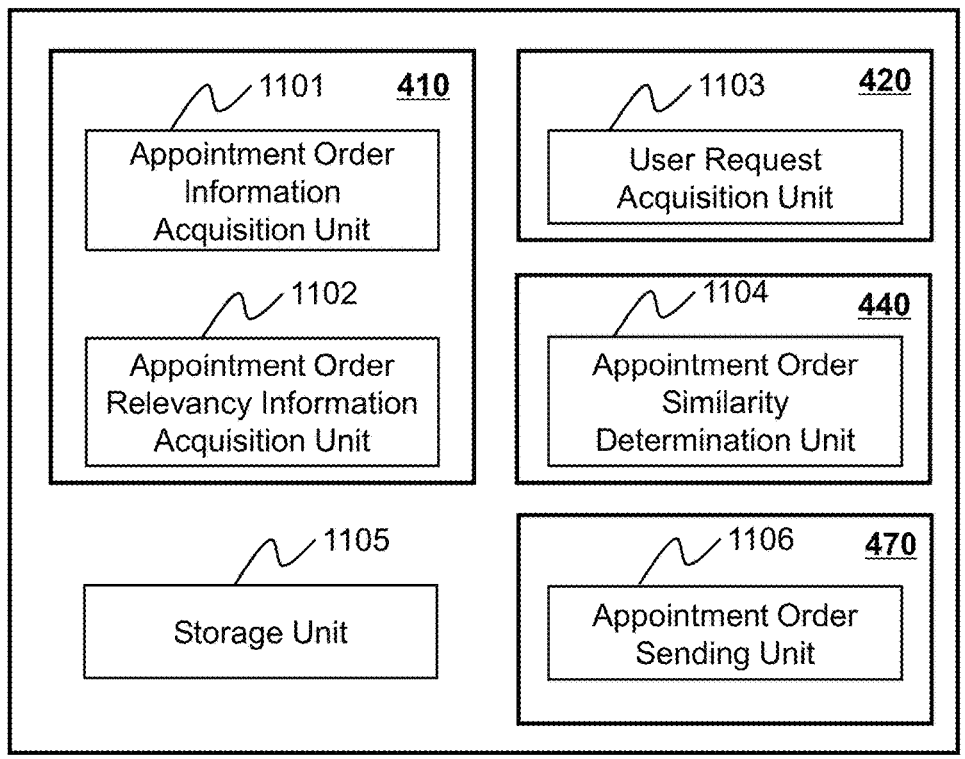
FIG. 11 is a schematic diagram illustrating a process for allocating orders based on a start time interval and a start region requested by a user according to some embodiments of the present disclosure.

FIG. 11 is an exemplary system diagram illustrating a process for allocating orders based on a start time interval and a start region requested by a user according to some embodiments of the present disclosure. In some embodiments, a "user" described in FIG. 11 may refer to a "driver". As shown in FIG. 11, the processing module 210 may include an appointment order information acquisition unit 1101, an appointment order relevancy information acquisition unit 1102, a user request acquisition unit 1103, an appointment order similarity determination unit 1104, an appointment order sending unit 1106, and/or a storage unit 1105.

The user request acquisition unit 1103 may be used to acquire a start time interval and a start region of an appointment order requested by a user; the appointment order information acquisition unit 1101 may be used to acquire appointment orders related to the start time interval and the start region; the appointment order relevancy information acquisition unit 1102 may be used to acquire a start time and a start location of an appointment order; the appointment order similarity determination unit 1104 may be used to determine a similarity between the start time and the start location of the appointment order and the start time interval and the start region requested by the user. In some embodiments, whether the start time of the appointment order is within the start time interval requested by the user may be determined, and whether the start location of the appointment order is within the start region requested by the user may be determined. The appointment order sending unit 1106 may be used to send the start time, the start location, and other related information to the user; the storage unit 1105 may be used to store order information, user request information, intermedia data, etc.

The units and combination thereof are only a particular embodiment of the processing module 210, and should not be defined as the only embodiment. Any two or more units above may be integrated into one or more modules or units to implement the functions of more than one units. The units above may communicate with each other, and the connection may be wired or wireless.

Figure 12:
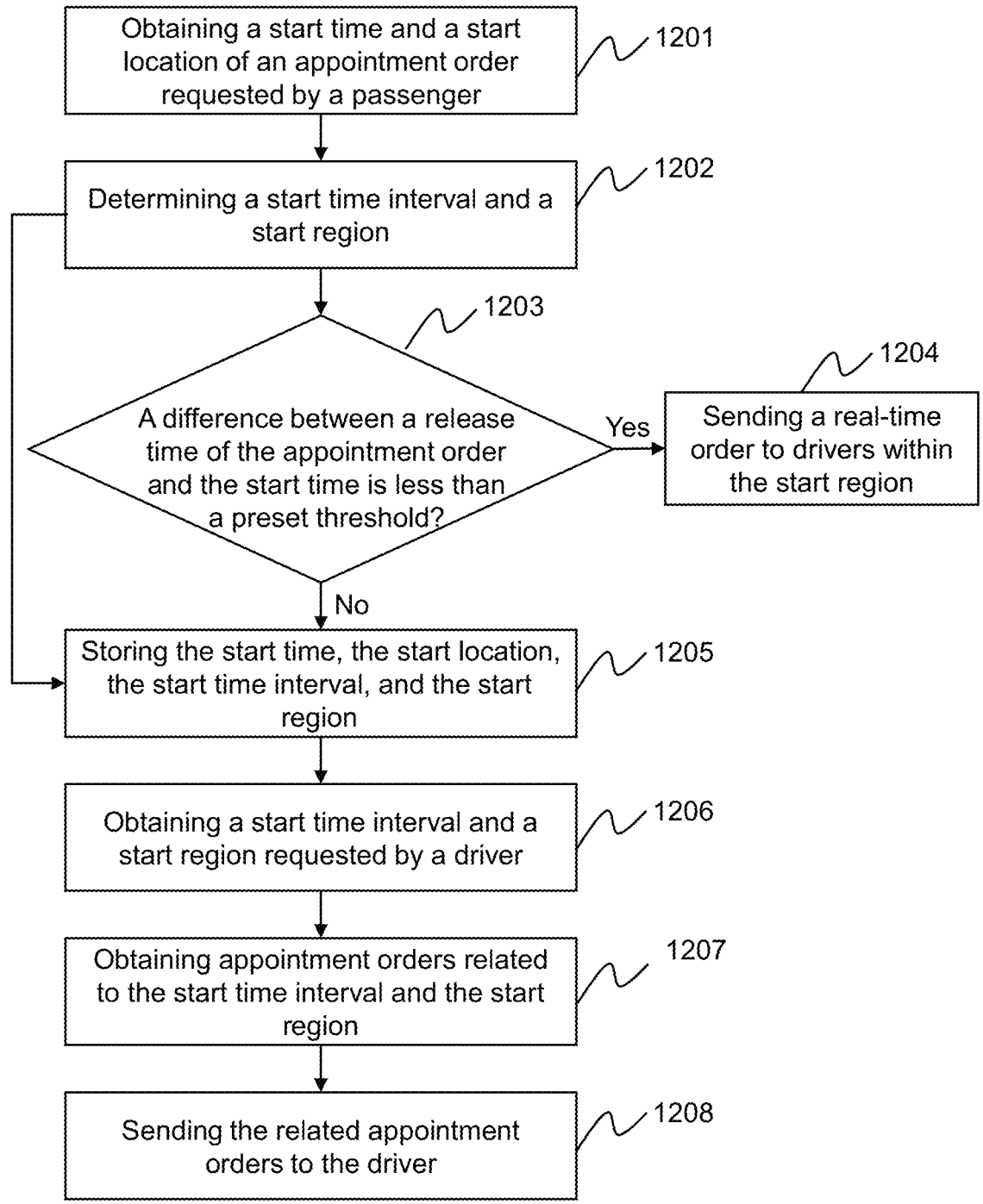
FIG. 12 is an exemplary flowchart for allocating orders based on a start time interval and a start region requested by a user according to some embodiments of the present disclosure.

FIG. 12 is an exemplary flowchart for allocating orders based on a start time interval and a start region requested by a user according to some embodiments of the present disclosure. In some embodiments, a "user" described in FIG. 12 may refer to a "driver". It should be noted that FIG. 12 only provides an exemplary flowchart and not intended to indicate that the present disclosure must be performed according to the flowchart below. In some embodiments, one or more steps may be deleted or adjusted. In step 1211, a start time and a start location of an appointment order requested by a passenger may be acquired. The acquired start time and the start location may be stored in the appointment order list. The start time and the start location may be acquired by the appointment order information acquisition unit 1101. In step 1202, a start time interval that the start time is within and a start region that the start location is within may be determined respectively. The start time interval and the start region may be determined by the appointment order relevancy information acquisition unit 1102. In some embodiments, the start time interval may refer to a time interval, for example, from 9:00 am to 10:00 am. In some embodiments, the start time interval may refer to a time range, for example, 2016.01.28. In some embodiments, the start time interval may refer to a combination of a time interval and a time range, for example, 9:00 am to 10:00 am on 2016.01.28. In some embodiments, the start region may be divided according to a characteristic location, for example, a station, a road, a street, a residential area, a market, a train station, an airport, etc. In some embodiments, the start region may refer to a region range, for example, a region range of a circle with a radius of 5 km from the start location.

In step 1203, whether a difference between a release time of the appointment order and the start time is less than a preset threshold may be determined. In the step, the preset threshold may be system default (e.g., 15 minutes), or may be set by a user. If the difference is less than the preset threshold, the appointment order may be defined as a real time order, and the order may be allocated to drivers within the start region in step 1204. If the difference is larger than the preset threshold, the start time, the start location, the start time interval, and the start region may be stored in step 1205. In some embodiments, step 1203 may be unnecessary, the start time, the start location, the start time interval, and the start region may be stored directly.

In step 1206, a start time interval and a start region requested by a driver may be acquired. The user request acquisition unit 1103 may acquire the start time interval and the start region requested by the driver. In some embodiments, the driver may select a start time interval from a preset start time interval list and/or select a start region from a preset start region list. The start time interval in the start time interval list may be divided according to a certain time interval (e.g., 15 minutes, particularly may be displayed as "10:00-10:15 am"), the start region in the start region list may be divided according to a certain geographic location (e.g., a station, a road, or a street). In some embodiments, the start region and/or the start time interval may be preset by the driver, for example, a time interval and a region of driving every day. In some embodiments, the driver may adjust the start time interval and the start region in real time, that is, the driver may send a request in real time.

In step 1207, appointment orders related to the start time interval and the start region may be acquired. Step 1207 may be performed by the appointment order similarity determination unit 1104. In some embodiments, the appointment orders related to the start time interval and the start region may refer to that start times of the appointment orders are within the start time interval and start locations of the appointment orders are within the start region. In some embodiments, similarities between start time intervals and the start regions of appointment orders and the start time interval and the start region requested by the user may be calculated, and the appointment orders related to the start time interval and the start region may be determined based on the similarities. In some embodiments, the appointment orders related to the start time interval and the start region may be searched in the preset appointment order list. As described in any embodiment of the present disclosure, the appointment order list may be stored in a storage device that integrated in or independent of the system. The appointment order list may include a plurality of appointment orders requested by a plurality of passengers, and may further include start times, start time intervals, start locations, start regions of the plurality of appointment orders. Additionally or alternatively, the appointment order list may pre-store destinations, numbers of passengers, with the old/young or not, increasing price or not, with large luggage or not, etc. of the plurality of appointment orders.

In step 1208, the appointment orders may be sent to the driver. The appointment order sending unit 1106 may send the appointment order to the driver. In some embodiments, the start times and the start locations of the appointment orders may be sent to the driver. Then the driver's confirmation related to an appointment order may be received, and contact information of the appointment order may be sent to the driver based on the confirmation.

In some embodiments, one or more monitoring steps may be added in which whether the appointment orders are confirmed may be determined. In some embodiments, one or more time differences may be calculated, for example, a time difference between a time point when an appointment order is stored in the appointment order list and the start time of the appointment order, a time difference between the current time and the start time of the appointment order, etc. In some embodiments, in the monitoring step, one or more time thresholds may be set. Whether the appointment orders are confirmed may be monitored by determining whether the one or more time differences satisfy the one or more time thresholds. For example, if a start time of an appointment order is a time point after 24 hours, whether the appointment order is confirmed may be monitored according to a certain time interval (e.g., per hour). If a time difference between the current time and a start time of an appointment order is relatively small (e.g., 6 hours), the appointment order may be given a high-level priority, for example, a priority to be responded to may be given to the order, a reward may be provided to the driver, etc.

For example, an appointment order may be released by a passenger. The appointment order may include a start time and a start location. For example, at the current time 12:00, four passengers and the released appointment orders may be expressed as below:

Table 1 an Appointment Order List Released by Passengers

| Passenger | Start time | Start location | Destination |
|---|---|---|---|
| A | 12:10 | Fengtai Road | Xierqi |
| B | 14:00 | Beijing Xianhao Market | Tiananmen |
| C | 15:00 | Xizhimen | Dongzhimen |
| D | 15:05 | Beijing north railway station | Tiananmen |

When the system receives the appointment order list, it may first determine whether a difference between a release time of an appointment order and a start time is less than a preset time threshold (e.g., 15 minutes). If the difference is less than the preset threshold, the appointment order may be defined as a real time order, and the order may be allocated to drivers within the start region. As shown in Table 1, for the passenger A, the difference between the release time of the appointment order and the start time is 10 minutes which is less than the preset time threshold 15 minutes, the appointment order sent by the passenger A may be defined as a real time order and may be allocated to the drivers around Fengtai Road.

If the difference is not less than the preset time threshold, the system may determine a start time interval that the start time is within and a start region that the start location is within. As shown in Table 1, the time differences of the appointment orders sent by the passengers B, C, and D are not less than the preset time threshold 15 minutes, the system may determine the start time intervals and the start regions of the appointment orders sent by the passengers B, C, and D. The determined start time intervals and the start regions may be shown in Table 2 below.

Table 2 an Example of Determining Start Time Intervals and Start Regions

| Passenger | Start time | Start location | Start time interval | Start region |
|---|---|---|---|---|
| A | 12:10 | Fengtai Road | Real time | Fengtai Road |
| B | 14:00 | Beijing Xianhao Market | 14:00-14:15 | Fengtai Road |
| C | 15:00 | Xizhimen | 15:00-15:15 | Xizhimen |
| D | 15:05 | Beijing north railway station | 15:00-15:15 | Xizhimen |

The start time intervals and the start regions of the appointment orders may be determined based on system default (e.g., the time interval of the start time interval may be set as 15 minutes, the scope of the start region may be set as a circle with a radius of 5 kilometers from the start location), or based on a dynamic rule, and different dynamic rules may be used under different situations. For example, if the start location is relatively remote, the scope of the start region may be set as a circle with a radius of 10 kilometers from the start location. As another example, if the start time is late at night or early in the morning, the time interval of the start time interval may be set as 1 hours or longer. After the start time intervals and the start regions of the appointment orders are determined, the system may store the start times, the start time intervals, the start locations, and the start regions in a storage device in or related to the system. In some embodiments, an appointment order list including the start time intervals and the start regions may be generated. In some embodiments, the appointment order list may include contents shown in Table 3 below.

Table 3 an Illustrated Appointment Order List

| Passenger | Start time | Start location | Start time interval | Start region | Destination |
|---|---|---|---|---|---|
| A | 12:10 | Fengtai Road | Real time | Fengtai Road | Xierqi |
| B | 14:00 | Beijing Xianhao Market | 14:00-14:15 | Fengtai Road | Tiananmen |
| C | 15:00 | Xizhimen | 15:00-15:15 | Xizhimen | Dongzhmen |
| D | 15:05 | Beijing north railway station | 15:00-15:15 | Xizhimen | Tiananmen |

The driver may request a start time interval and a start region of an appointment order. For example, the driver may select a start time interval "15:00-15:15" in a preset start time interval list, and select a start region "Xizhimen" in a preset start region. After receiving the start time interval and the start region requested by the driver, the system may search and obtain appointment orders related to the start time interval and the start region. For example, the system may search and obtain the appointment orders sent by passenger C and passenger D in the appointment order list. After obtaining the appointment orders that satisfy the conditions, the system may send the appointment orders and the start times and the start locations of the appointment orders to the driver. The system may also send other information related to the appointment orders to the driver, for example, destination information. The appointment orders sent to the driver may be shown in table 4 below.

Table 4 an Example of the Appointment Orders Sent to the Driver

| Passenger | Start time | Start location | Destination |
|---|---|---|---|
| C | 15:00 | Xizhimen | Dongzhmen |
| D | 15:05 | Beijing north railway station | Tiananmen |

The example above only describes the process for allocating orders based on the start time interval and the start region requested by the driver, but it is not intended to indicate that the embodiment of allocating orders based on the start time interval and the start region requested by the driver is limited to the scope.

Figure 13:
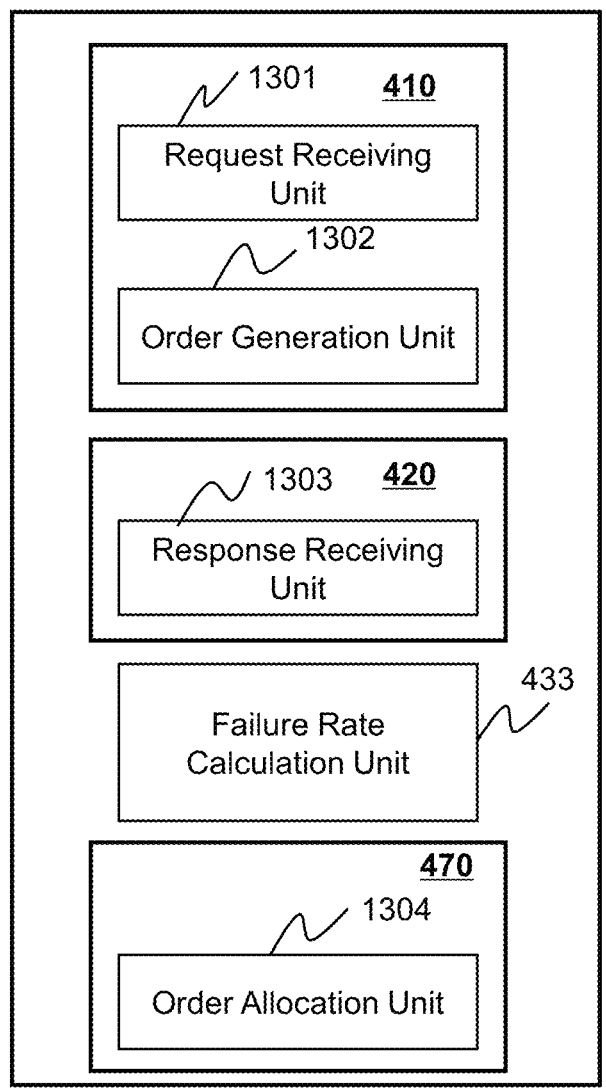
FIG. 13 is a schematic diagram illustrating a process for allocating orders based on failure rates of users according to some embodiments of the present disclosure.

FIG. 13 is an exemplary system diagram illustrating a process for allocating orders by the processing module 210 based on failure rates of users according to some embodiments of the present disclosure. In some embodiments, a "user" described in FIG. 13 may refer to a "driver". In this embodiment, the processing module 210 may include a request receiving unit 1301, an order generation unit 1302, a response receiving unit 1303, a failure rate calculation unit 433, and an order allocation unit 1304.

The request receiving unit 1301 may be used to receive requests from passengers. The order generation unit 1302 may be used to generate order information based on the requests. The order information may include a start time, a start location, a destination, a number of passengers, etc. In some embodiments, the order generation unit 1302 may further include one or more order pushing units (not shown). The one or more order pushing units may be used to push the order information to one or more user terminals (e.g., the driver terminals), for example, the order information may be pushed to n terminals, n may be an integer not less than 1. The response receiving unit 1303 may be used to receive requests for responding to orders from the terminals. In some embodiments, the terminals that sent requests for responding to the order may be marked as response terminals. The failure rate calculation unit 433 may be used to calculate and obtain failure rates of the response terminals (see details in FIG. 4-A). The order allocation unit 1304 may be used to select one or more target terminals and allocate the order information to the target terminals based on the calculated failure rates.

In some embodiments, the failure rate calculation unit 433 may include a mapping table storage unit (not shown), or the mapping table storage unit (not shown) may be integrated in any unit or module. In some embodiments, the mapping table storage unit (not shown) may store a correspondence relation between the failure rates and the users. In some embodiments, the order allocation unit 1304 may read the failure rates of the user terminals from the mapping table storage unit (not shown), and allocate orders based on the failure rates of the user terminals.

Figure 14:
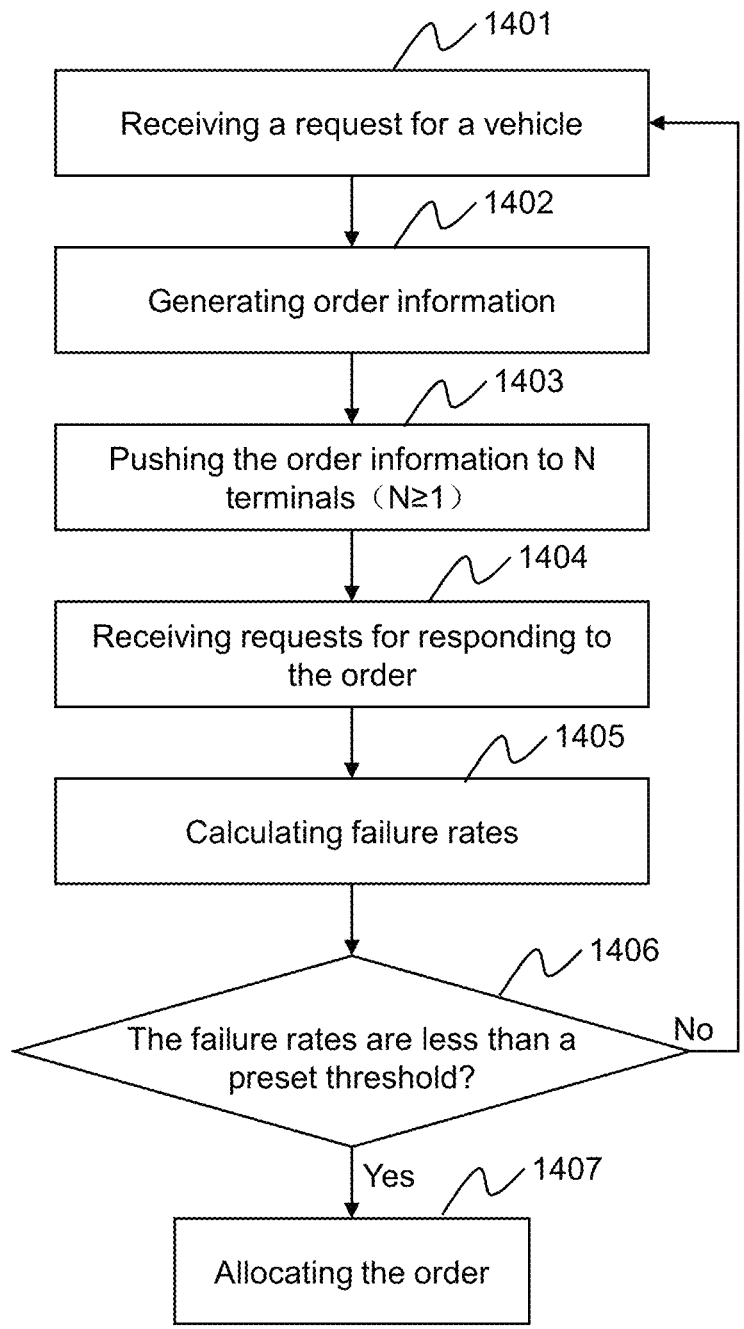
FIG. 14 is an exemplary flowchart for allocating orders based on failure rates of users according to some embodiments of the present disclosure.

FIG. 14 is an exemplary flowchart for allocating orders based on failure rates of users according to some embodiments of the present disclosure. In some embodiments, a "user" described in FIG. 14 may refer to a "driver". In step 1401, a request sent by a passenger may be received. The request receiving unit 1301 may receive the request of the passenger. The request may be sent by the passenger terminal. The passenger terminal may include a mobile phone, a tablet personal computer, a laptop computer, a desktop computer or any other terminal device that may perform the similar functions. The request may include a start time, a start location, a destination, a current location of the passenger, a number of passengers, etc. The current location of the passenger may be determined by a positioning device (e.g., a GPS device) in the passenger terminal, or may be input by the passenger.

In step 1402, order information may be generated based on the received request from the passenger. The order generation process may be performed by the order generation unit 1302. The request may be integrated into order information in this step. The format of the order information may be text, picture, audio, or video. The order information may be generated by the order generation unit 1302. The generated order information may be stored in any storage device disclosed anywhere in the present disclosure.

In step 1403, the order information may be pushed to n terminals, where and the terminal may refer to a driver terminal. The pushing process may be performed by the order generation unit 1302. In some embodiments, the driver terminal may indicate a location information of the driver. Before pushing the order information, a terminal list may be determined based on the start location of the order and the location information of the driver. In some embodiments, a distance threshold may be set. The start location of the order may be set as a start point, drivers within the scope of the distance threshold may be added into the terminal list. The distance threshold may be system default (e.g., 3 kilometers), or may be adjusted dynamically if necessary. For example, when the traffic is relatively bad, the distance threshold may be set as a relatively small value (e.g., 1 kilometer). As another example, if the start location is relatively remote, the distance threshold may be set as a relatively large value (e.g., 8 kilometers).

In step 1404, requests for responding to the order sent by driver terminals may be received, and the terminals that sent requests for responding to the order may be marked as response terminals. Step 1404 may be performed by the response receiving unit 1303. In step 1405, failure rates of the drivers may be calculated. The failure rate may be obtained by a calculation, or may be obtained by searching a mapping table. In some embodiments, the failure rate may be calculated based on equation (6) below:

$$T_x = \Sigma_{i=0}^{k} C_n^{k} * p^{k} * (1-p)^{n-k}, \quad (6)$$

where $T_x$ may represent the failure rate, k may represent a number of orders that the driver has failed to complete through n orders allocated to the response terminal x, $C_n^{k}$ may represent a number of combinations of selecting k from n, and p may represent an average failure rate.

The average of the rates of breaking orders may be calculated by equation (7) below:

$$p = V/S, \quad (7)$$

where V may represent a total number of orders that all the drivers terminals have failed to complete, and S may represent a total number of orders of all the driver terminals. The calculated failure rates may be stored in a mapping table storage unit (not shown). In some embodiments, the failure rates may be obtained by searching the mapping table.

In some embodiments, the reasons for failing to complete orders may be divided into two categories, the first category may be a failure the driver failed to complete an order due to a specific force majeure cause; the second category may be an intentional failure to complete the order (e.g., a driver may cancel an order when he/she receives and confirms a better order or an order of interest, or just when a passenger at road side requests a vehicle). In order to eliminate the failures of the first category due to a specific force majeure, when calculating the failure rates, a filtering step (not shown) may be added. In some embodiments, the filtering process may be completed by analyzing some information related to the drivers or orders. For example, a location of a driver when the driver sends a request for responding to an order and a location when the passenger sends the order may be acquired, if the traffic between the location of the driver and the location of the passenger is relatively bad, a failure to complete the order by the driver may be defined as a failure due to a specific force majeure, and orders of this category may be filtered and not to be taken into consideration while calculating the failure rate of the driver. As another example, orders with complaints by passengers may be defined as intentional failures. As a further example, when a passenger or a driver cancels an order, he/she may submit a reason for cancellation, the system may read the reason for cancellation to determine whether the failure to complete the order is intentional.

In step 1406, whether the failure rates of drivers are less than a preset threshold may be determined. The preset threshold may be system default, or may be adjusted in real time if necessary. For example, assuming that a driver terminal a and a driver terminal and b send requests for responding to the order, if a failure rate of the terminal a is 0.2, a failure rate of the terminal b is 0.99, the preset threshold is 0.98, then the terminal b may be excluded directly and the terminal a may be selected as the target terminal. Assuming that a driver terminal a, a driver terminal b, and a driver terminal c send requests for responding to the order, if a failure rate of the terminal a is 0.2, a failure rate of the terminal b is 0.99, a failure rate of the terminal c is 0.3, the preset threshold is 0.98, then the terminal b may be excluded directly, and a terminal may be selected from the terminal a and the terminal c as the target terminal. In some embodiments, the selection may be performed via various ways, for example, the terminal a with the lowest failure rate may be selected as the target terminal. As another example, a terminal closer to the start location may be selected as the target terminal from the terminal a and the terminal c. As another example, a terminal may be randomly selected from the terminal a and the terminal c as the target terminal. In some embodiments, other filtering conditions may be added and the selection may be performed via some other ways, this embodiment is not intended to be limiting. In step 1407, the order may be allocated to the selected user terminals according to the selection. The order allocation process may be performed by the order allocation unit 1304.

Figure 15:
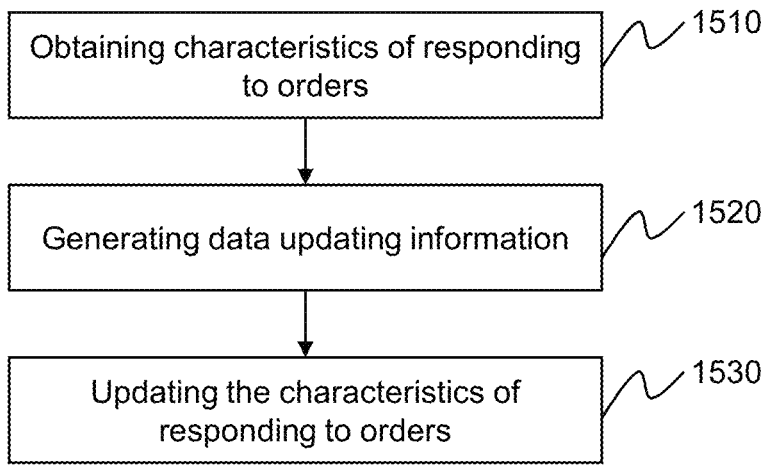
FIG. 15 is an exemplary flowchart for updating characteristics of responding to orders automatically according to some embodiments of the present disclosure.

FIG. 15 is an exemplary flowchart for updating characteristics of responding to orders automatically according to some embodiments of the present disclosure. In some embodiments, a "user" described in FIG. 15 may refer to a "driver". In step 1510, characteristics of responding to orders of users may be acquired. The acquisition process of the characteristics of responding to orders of the users may be performed by the characteristic calculation unit 434. In some embodiments, the characteristics of responding to orders may be characteristics that the probabilities of responding to orders of the users change with time. In some embodiments, the characteristics of responding to orders of the users may be acquired periodically or non-periodically. The acquiring the characteristics of responding to orders of the users periodically may refer to acquiring the characteristics of responding to orders of the terminals at a certain time interval, for example, per week, per day, per hour, etc.

A number of the users acquired in an acquisition process may be one or more. The numbers of the users acquired in multiple acquisition processes may be the same or different.

In step 1520, data updating information may be generated. The process for generating the data updating information may be performed by the characteristic calculation unit 434. It should be understood that the data updating information may include other information, the present disclosure is not intended to be limiting. In some embodiments, after the characteristics of responding to orders are acquired, an updating table of the characteristics of responding to orders may be generated based on the characteristics of responding to orders of the users within a preset time interval. As used herein, the updating table of the characteristics of responding to orders may include but not limited to user identities to be updated. It should be understood that the updating table of the characteristics of responding to orders may include other information, the present disclosure is not intended to be limiting.

In step 1530, the characteristics of responding to orders may be updated. The process for updating the characteristics of responding to orders may be performed by the characteristic calculation unit 434. In some embodiments, the characteristics of responding to orders may be updated based on the updating table of the characteristics of responding to orders in the data updating information. In some embodiments, characteristics of responding to orders of users corresponding to downloading identities in the updating table may be updated based on the characteristics of responding to orders. Further, order information may be allocated to the users based on the updated characteristics of responding to orders. The order allocation process may be performed by the order allocation module 470.

The description of the process for updating the characteristics of responding to orders is provided for illustration purposes, and should not be considered as the only practical embodiment. For persons having ordinary skills in the art, after understanding the principle of the characteristics of responding to orders, without departing the principle, may make any modification or variation to the forms and details of the process for updating the characteristics of responding to orders. However, these modifications are still within the scope of the present disclosure. For example, in some embodiments, a determination step may be added after step 1510 to determine whether the characteristics of responding to orders of the users need to be updated. If "yes", the process may proceed to step 1520 to generate data updating information; if "no", the process may end. In some embodiments, a statistical step may be added after step 1520 to analyze users whose characteristics of responding to orders change frequently. For the users whose characteristics of responding to orders change frequently, the users may be looked for, investigated, or monitored if necessary. These modifications are still within the scope of the present disclosure.

It should be understood that the descriptions regarding the process for updating the characteristics of responding to orders are not only applicable for updating the characteristics of responding to orders, but also applicable for updating other information. For example, the updating may be updating a status of a vehicle (e.g., residual fuel oil, depletion rate of fuel) of the user, updating the user habit/preference, or the like, or a combination thereof. As used herein, the user habit/preference may include but not limited a preference of the passenger for the start time, the start location, or the destination, a preference of the passenger for drivers, an acceptable waiting time, a preference of the passenger for sharing a vehicle with other passengers, a preference of the passenger for a vehicle type (e.g., aircraft, train, ship, subway, taxi, bus, motorcycle, bicycle, on foot), a preference of the passenger for a business type (e.g., taxi, fast car, special car, free car, bus, renting a car, driving), a preference of the passenger for a vehicle model, a preference of the service provider for the start location, the destination, or the start time, a preference of the service provider for a driving route, a working time of the service provider, a failure rate of the service provider, a number of orders that the service provider has responded to, a number of orders that the service provider has responded to successfully, a number of completed orders, a success rate for responding to orders, a completion rate, or the like, or a combination thereof. These modifications are still within the scope of the present disclosure.

Figure 16:
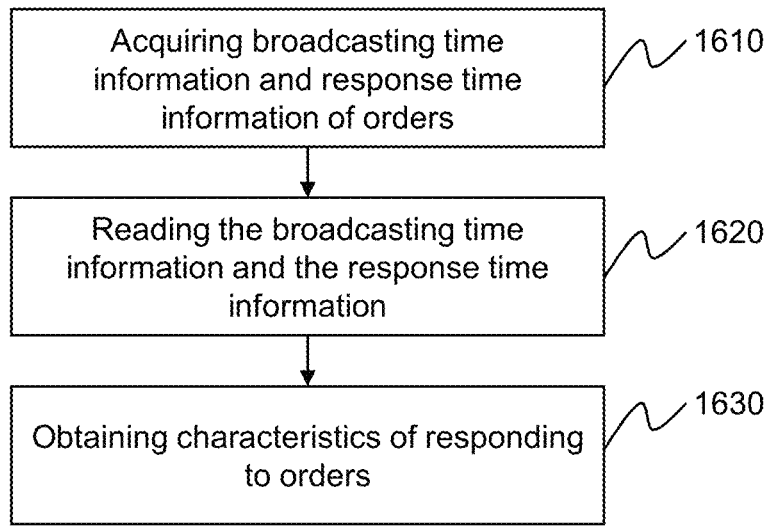
FIG. 16 is an exemplary flowchart for obtaining characteristics of responding to orders according to some embodiments of the present disclosure.

FIG. 16 is an exemplary flowchart for acquiring characteristics of responding to orders according to some embodiments of the present disclosure. In some embodiments, a "user" described in FIG. 16 may refer to a "driver". In step 1610, broadcasting time information and response time information of orders may be acquired. The process for acquiring the broadcasting time information and the response time information of the orders may be performed by the user information extraction module 420. In some embodiments, the broadcasting time information and the response time information may be acquired and stored, then a log may be generated. As used herein, the broadcasting time information of an order may refer to a time point when the order information is broadcasted to users. The response time information may refer to a time point when the users subscribe the order information. In some embodiments, the acquiring mode may be that the broadcasting time information and response time information are automatically acquired by the processing module 210, or that the broadcasting time information and the response time information may be uploaded by the users after receiving acquisition requests from the processing module 210, or that the broadcasting time information and the response time information may be uploaded by the users forwardly, the present disclosure is not intended to be limiting. In some embodiments, the broadcasting time information and the response time information may be periodic or non-periodic. Acquiring the broadcasting time information and the response time information periodically may refer to acquiring the characteristics of responding to orders of the users at a certain time interval, for example, acquiring the broadcasting time information and the response time information per week, per day, per hour, etc. A number of the users acquired in an acquisition process may be one or more. The numbers of the users acquired in multiple acquisition processes may be the same or different.

In step 1620, the broadcasting time information and the response time information of the users within a preset time interval may be read. The process for reading the broadcasting time information and the response time information may be performed by the characteristic calculation unit 434. Particularly, in step 1620, a plurality of logs may be gathered and the broadcasting time information and the response time information of a plurality of users may be obtained. In some embodiments, the broadcasting time information and the response time information may be read and gathered immediately or after a time delay, the present disclosure is not intended to be limiting.

In step 1630, the characteristics of responding to orders of the users within the preset time interval may be obtained based on the broadcasting time information and the response time information within the preset time interval. The process for obtaining the characteristics of responding to orders of the users may be performed by the characteristic calculation unit 434. Particularly, for each user, a time difference between the broadcasting time information and the response time information of each order may be analyzed, characteristics of probabilities of responding to orders with time within a preset time interval may be determined, and the characteristics of responding to orders of the user may be obtained. In some embodiments, for the same user, the preset time interval may be fixed, or may be adjusted if necessary. For different users, the preset time intervals may be the same or different.

The description of the process for obtaining the characteristics of responding to orders is provided for illustration purposes, and should not be considered as the only practical embodiment. For persons having ordinary skills in the art, after understanding the principle of the characteristics of responding to orders, without departing the principle, may make any modification or variation to the forms and details of the process for obtaining the characteristics of responding to orders. However, these modifications are still within the scope of the present disclosure. For example, the characteristics of responding to orders of one user or multiple users may be processed every time. These modifications are still within the scope of the present disclosure.

FIG. 17-A and FIG. 17-B are schematic diagrams illustrating characteristics of responding to orders of two different users according to some embodiments of the present disclosure. In some embodiments, a "user" described in FIG. 17-A and FIG. 17-B may refer to a "driver". The characteristics of responding to orders shown may be obtained by a statistical analysis of the data of responding to orders of the two users from 2014.11.30 to 2014.12.29. As shown, the zero-coordinate represents the time point when the order information is broadcasted to the users. The characteristics of responding to orders of user 1 is shown in FIG. 17-A. It may be seen that the probability of responding to orders within 0-5 s is relatively high, while the probability of responding to orders after 5 s approximates 0. The characteristics of responding to orders of user 2 is shown in FIG. 17-B. It may be seen that the probability of responding to orders within 5-20 s is relatively high, while the probability of responding to orders within 0-5 s approximates 0. According to a comparison, it may be seen that the speed of responding to orders of user 1 is faster than that of user 2. The probabilities of responding to orders of the two users may decrease with time. There is almost no possibility of responding to orders after a long time from the zero-coordinate.

FIGS. 15-17 above describe exemplary processes for obtaining and updating the characteristics of responding to orders. In some embodiments, the characteristics of responding to orders of the users and related information may be stored in the order allocation engine 110, or any storage device disclosed anywhere in the present disclosure. In some embodiments, the processing module 210 may allocate orders based on the characteristics of responding to orders of the users according to a specific preset condition. The preset condition may be system default, or may be adjusted if necessary. For example, the characteristics of responding to orders may be time-varying information of the requests for responding to orders of the users. The system may allocate orders to the users based on the characteristics of responding to orders of the users within different time intervals. Particularly for example, if the characteristics of responding to orders of a user indicate that the user responds to orders frequently at 10:00 am per day, the system may allocate orders to the user at a certain time interval before or after 10:00 am per day.

Figure 18:
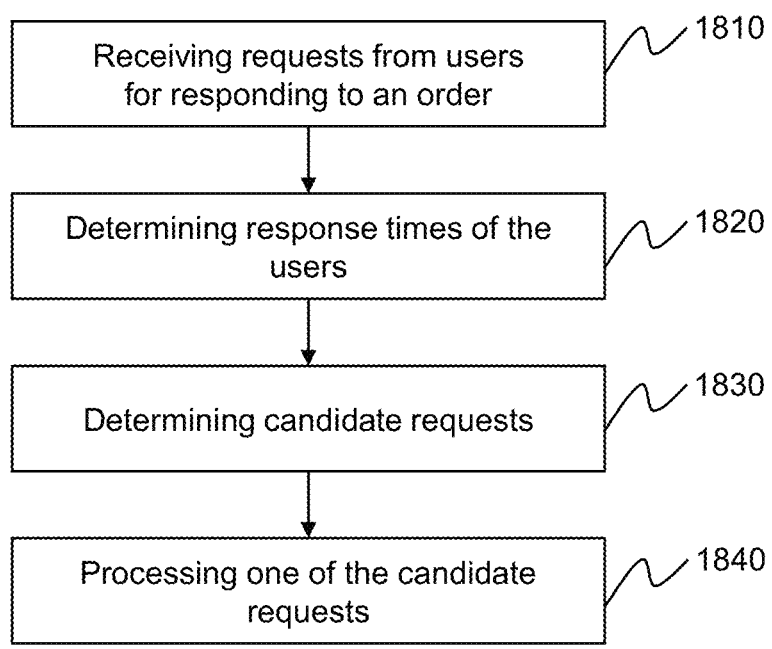
FIG. 18 is an exemplary flowchart for allocating orders based on response times of users according to some embodiments of the present disclosure.

FIG. 18 is an exemplary flowchart for processing requests from users based on response times of the users according to some embodiments of the present disclosure. In step 1810, requests for responding to orders may be received from users. The receiving the requests for responding to orders from users may be performed by the order information extraction module 410. In some embodiments, after an order is allocated, the requests for responding to the order may be received from users. In some embodiments, the order may be a real time order, an appointment order, or an order of other forms, the present disclosure is not intended to be limiting.

In step 1820, response times of the users may be determined. The determining the response times of the users may be performed by the response time calculation unit 435. In some embodiments, after a request sent by a user is received, a corresponding response time of the user may be determined. In some embodiments, the response time may be a time interval between a time point when the order is allocated and a time point when the request for responding to the order from the user is received.

In step 1830, candidate requests may be determined. The determining the candidate requests may be performed by the response time calculation unit 435. In some embodiments, the candidate requests may be determined based on the response times determined in step 1820. In some embodiments, the way to determine the candidate requests may be determining the candidate requests based on a comparison between the response times of the users and a preset threshold (e.g., a preset response time), based on historical response time data of the users, based on a ranking of the response times of the users among all the requests for responding to the order, or the like, or any combination thereof.

In step 1840, one of the candidate requests may be processed. The processing the one of the candidate requests may be performed by the ranking module 450. In some embodiments, one request for processing may be selected from the candidate requests determined in step 1830. In some embodiments, a request for processing may be selected randomly from the candidate requests, or a request for processing may be selected from the candidate requests according to a specific index. The index may include but not limited to a response time of a user, a distance between the user and the start location of the order, a travel time from the user to the start location of the order, an expected income of the order, whether the direction of the destination of the order is consistent with an expected direction of the user, a traffic status, a vehicle status (e.g., a residual amount of fuel oil, a consumption rate of oil), a user habit/preference, other factors that may influence the selection of the candidate requests, or the like, or a combination thereof. As used herein, the user habit/preference may include but not limited a preference of the passenger for the start time, the start location, or the destination, a preference of the passenger for drivers, an acceptable waiting time, a preference of the passenger for sharing a vehicle with other passengers, a preference of the passenger for a vehicle type (e.g., aircraft, train, ship, subway, taxi, bus, motorcycle, bicycle, on foot), a preference of the passenger for a business type (e.g., taxi, fast car, special car, free car, bus, renting a car, driving), a preference of the passenger for a vehicle model, a preference of the service provider for the start location, the destination, or the start time, a preference of the service provider for a driving route, a working time of the service provider, a failure rate of the service provider, a number of orders that the service provider has responded to, a number of orders that the service provider has responded to successfully, a number of completed orders, a success rate for responding to orders, a completion rate, or the like, or a combination thereof.

In some embodiments, one of the candidate requests may be selected based on one index. For example, the selection may be performed based on the response times of the users, and a user with the shortest response time may be selected and the order may be allocated to the user. For example, the selection may be performed based on the distances between the users and the start location of the order, and a user with the shortest distance may be selected and the order may be allocated to the user. In some embodiments, one of the candidate requests may be selected based on multiple indexes. For example, the selection may be performed based on the response times of the users and the distances between the users and the start location of the order, and different weighting coefficients may be assigned to the two indexes. A score may be calculated for each candidate user based on the response times, the distances between the users and the start location of the order, and the weighting coefficients, and the order may be allocated to a user with highest score.

It should be noted that the description above about the process for processing requests from users is provided for illustration purposes, and not intended to limit the present disclosure within the scope of the disclosed embodiments. For persons having ordinary skills in the art, after understanding the principle of the present disclosure, without departing the principle, may make any modification to the process for processing the requests from users. For example, in some embodiments, a statistical step may be added after step 1820 to count users whose response times are often within an unreasonable range. The users may be looked for, investigated, monitored, set permissions, added to the blacklist, etc. These modifications are still within the scope of the present disclosure.

Figure 19:
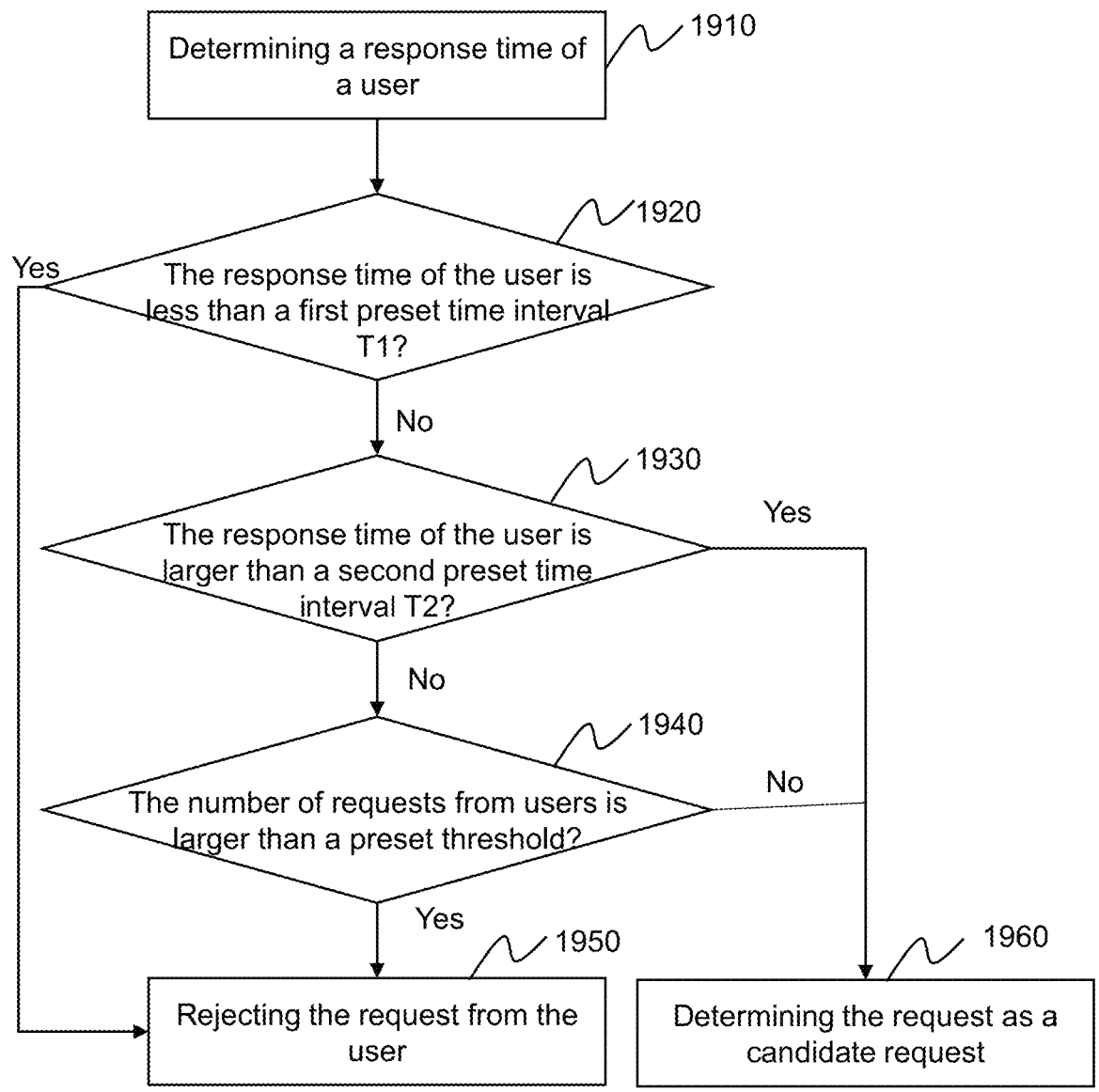
FIG. 19 is an exemplary flowchart illustrating a particular mode for allocating orders based on response times according to some embodiments of the present disclosure.

FIG. 19 is an exemplary flowchart for determining candidate requests according to some embodiments of the present disclosure. In step 1910, a response time of a user may be determined (see details in step 1820). In step 1920, whether the response time of the user is less than a first preset time interval T1 may be determined. If the response time of the user is less than the first preset time interval T1, the process may proceed to step 1950 to reject the request from the user; if the response time of the user is larger than or equal to the first preset time interval T1, the process may proceed to step 1930. In step 1930, whether the response time of the user is larger than a second preset time interval T2 may be determined. If the response time of the user is larger than the second preset time interval T2, the process may proceed to step 1960 to determine the request as a candidate request; if the response time of the user is less than or equal to the second preset time interval T2, the process may be proceed to step 1940 to determine whether the number of the requests from users is larger than a preset threshold. The determination may be performed by the determination module 440. In some embodiments, the second preset time interval T2 may be larger than the first preset time interval T1. In some embodiments, the first preset time interval T1 may be set as a time difference that is obviously not within a reasonable range, the second preset time interval T2 may be set a time difference that is obviously within a reasonable range. In some embodiments, the first preset time interval T1 and the second preset time interval T2 may be set based on a reaction time of a user, a required time to send an order, a required time to receive requests from users. As used herein, the reaction time of the user may include but not limited to a required time to understand order information, a required time to make a decision, or the like, or a combination thereof. The required time to understand the order information may include but not limited to a required time to glance over the order, a required time to broadcast the order by audio, a required time to broadcast the order by video, or the like, or a combination thereof. The required time to send order and the required time to receive requests from users may be set according to a transmission speed of a mobile network operator. In some embodiments, if a fastest reaction time of an ordinary user to an order may be t1 and a slowest one may be t2, where t2>t1; if the required time to send the order is t3 and the required time to receive the requests from users is t4. Then the first preset time interval may be set as T1=t1+t3+t4, the second preset time interval may be set as T2=t2+t3+t4. For example, in some embodiments, the required time to understand the order information may be set as 1.0-2.0 s, the required time to make a decision may be set as 0.5-1.0 s. Therefore, the reaction time of an ordinary user to the order may be 1.5-3.0 s. And therefore t1=1.5 s, t2=3.0 s. The required time to send the order t3 and the required time to receive requests from users t4 may be set as 1.0 s respectively. Therefore, the first preset time interval T1 and the second preset time interval T2 may be set as 1.7 s and 3.2 s respectively based on the data above. In some embodiments, if a response time T of a specific user is less than T1 (1.7 s), for example, only 0.5 s, the request from the user may be rejected. If the response time of the specific user is larger than T2 (3.2 s), for example, 4 s, the request from the user may be determined as a candidate request. If the response time of the specific user is equal to or larger than T1 (e.g., 1.7 s) and less than or equal to T2 (3.2 s), for example, 2 s, the process may proceed to step 1940 to determine whether the number of the requests from the users is larger than the preset threshold.

In step 1940, whether the number of the requests from the users is larger than the preset threshold may be determined. The determination may be performed by the determination module 440. If the number of the requests from the users is larger than the preset threshold, the process may proceed to step 1950 to reject the request of the user; if the number of the requests from the users is less than or equal to the preset threshold, the process may proceed to step 1960 to determine the request of the user as a candidate request. In some embodiments, the requests for responding to the order may be counted in real time and the number N of the requests from users for responding to the order may be determined.

The description of the process for determining candidate requests is provided for illustration purposes, and should not be considered as the only practical embodiment. For persons having ordinary skills in the art, after understanding the principle of the process for determining candidate requests, without departing the principle, may make any modification or variation to the forms and details of the process for determining candidate requests. However, these modifications are still within the scope of the present disclosure. For example, in some embodiments, after step 1910, step 1930 may be performed first to determine whether the response time of the user is larger than the second preset time interval T2. If the response time of user is larger than the second preset time interval T2, the process may proceed to step 1960; if the response time of the user is less than or equal to the second preset time interval T2, the process may proceed to step 1920 to determine whether the response time of the user is less than the first preset time interval T1. If the response time of the user is less than the first preset time interval T1, the process may proceed to step 1950; if the response time of the user is larger than the first preset time interval T1, the process may proceed to step 1940. In some embodiments, after step 1910, whether the response time of the user is within a preset threshold range [T1, T2] may be determined. If the response time of the user is within the preset threshold range, the process may proceed to step 1940; if the response time of the user is not within the preset threshold range, whether the response time of the user is less than the first preset time interval T1 may be determined first, and whether the response time of the user is larger than the second preset time interval T2 may be determined subsequently, or whether the response time of the user is larger than the second preset time interval T2 may be determined first, and whether the response time of the user is less than the first preset time interval T1 may be determined subsequently. These modifications are still within the scope of the present disclosure.

Figure 20:
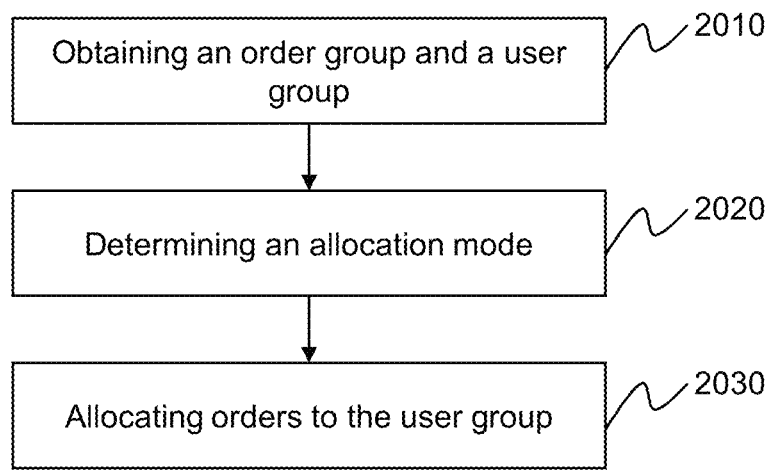
FIG. 20 is an exemplary flowchart for allocating an order group to a user group according to some embodiments of the present disclosure.

FIG. 20 is an exemplary flowchart for allocating orders according to some embodiments of the present disclosure. In some embodiments, a "user" described in FIG. 20 may refer to a "driver". In step 2010, an order group including a plurality of orders to be allocated and a user group including a plurality of users to receive orders may be obtained. The obtaining the order group and the user group may be performed by the order information extraction module 410 or the user information extraction module 420. In some embodiments, the orders to be allocated may be real-time orders or appointment orders. The orders to be allocated may be orders which have been generated but have not been pushed to service providers, orders which have been pushed to service providers but have not been responded to after a period of time, orders which have been responded to successfully but have been cancelled by service providers or consumers, or the like, or a combination thereof. In some embodiments, statuses of the users to receive orders may be available statuses, ready statuses to complete orders, sharable statuses, etc. According to some embodiments of the present disclosure, in step 2010, the order group and the user group may be obtained based on a geographic region. Particularly, the order group may be defined as all current orders in a specific geographic region, and the user group may be defined as all users to receive orders in the specific geographic region. For example, the geographic region may include a geographic region that is divided according to administrative region (e.g., province, city, county), a geographic region that is divided according to longitude-latitude coordinate, a geographic region that is divided according to business district or landmark, etc. It should be noted that the present disclosure it not limited by the division mode for the geographic region.

In step 2020, an allocation mode may be determined based on the order group and the user group. The determining the allocation mode may be performed by the processing module 210. In some embodiments, step 2020 may further include determining the allocation mode based on at least one of the order group, the user group, a completion rate, a success rate for responding to orders, and a receiving-responding rate for orders. As used herein, the completion rate may refer to a ratio of the amount of completed orders and the total amount of the orders in the order group. The success rate for responding to orders may refer to a ratio of the amount of the orders that are successfully responded to by users in the user group and the amount of the orders that the users try to respond to. The receiving-responding rate for orders may refer to a ratio of the amount of the orders that are responded to by users in the user group and the amount of the orders that are pushed to the users. It should be understood that the allocation mode based on at least one of the order group, the user group, the completion rate, the success rate for responding to orders, and the receiving-responding rate for orders is only one embodiment. Those skilled in the art may determine an allocation mode according to other indexes or other forms based on the order group and the user group under different technical environments, application scenarios, or design requirements, where the index may be a competition probability for orders.

According to some embodiments of the present disclosure, the determining the allocation mode based on at least one of the order group, the user group, the completion rate, the success rate for responding to orders, and the receiving-responding rate for orders may include: calculating a weighed sum of the completion rate, the success rate for responding to orders, and the receiving-responding rate for orders; and determining an allocation mode which is to maximize the weighed sum maximum. Particularly, those skilled in the art may set weight coefficients for the three indexes according to actual technical scenarios or environments as shown in equation 8 below:

$$E = \alpha_1 * E_{OrderSuccRate} + \alpha_2 * E_{StriveSuccRate} + \alpha_3 * E_{StriveRate} \quad (8)$$

where $E_{OrdersuccRate}$ may refer to the completion rate, $E_{StriveSuccRate}$ may refer to the success rate for responding to orders, $E_{StriveRate}$ may refer to the receiving-responding rate for orders, E may refer to the weighed sum of the three indexes, and $\alpha1$, $\alpha2$, $\alpha3$ may refer to the weight coefficients of the three indexes respectively. Methods that may be used to set the weight coefficients of the three indexes may include a subjective experience method, a primary and secondary index queuing taxonomy, an expert investigation method, or the like, or a combination thereof. In some embodiments, an order allocation mode which is to maximize the weighed sum E may be selected as the final determined order allocation mode. It should be understood that those skilled in the art may determine the final order allocation mode based on other methods with an overall consideration of the three indexes, the present disclosure is not limited to the linear weighing mode above, and the mode is only an illustration of the present disclosure.

In some embodiments, the order allocation mode which is to maximize the weighed sum E may be determined based on at least one of an exhaustion method, a genetic algorithm, an ant colony algorithm, a tabu search algorithm, a simulated annealing algorithm, a mountain climbing algorithm based on greedy, etc. It should be understood that those skilled in the art may solve the above model based on other intelligence algorithms or non-intelligence algorithms, and the present disclosure is not intended to be limiting.

In step 2030, orders in the order group may be allocated to the users in the user group based on the order allocation mode. The allocation process may be performed by the order generation module 460 or the order allocation module 470. In some embodiments, the order allocation mode may be that one order may be allocated to one user, or a plurality of orders may be allocated to one user; one order may be allocated to only one user at a time point, or may be allocated to a plurality of users at a time point; at least one order may be allocated to each user, or no order may be allocated to some users if there is no suitable order. It should be understood that the amount of the allocated orders or the allocation mode may be determined under different technical environments or requirements, the present disclosure is not intended to be limiting.

The description of the order allocation process is provided for illustration purposes, and should not be considered as the only practical embodiment. For persons having ordinary skills in the art, after understanding the principle of order allocation, without departing the principle, may make any modification or variation to the forms and details of the order allocation process. However, these modifications are still within the scope of the present disclosure. For example, a data cache step may be added to the order allocation process in which the current orders to be allocated or users to receive orders may be stored, new data may be added, stale data may be removed, etc. Particularly, when orders have been generated or have been allocated but have not been responded to after a period of time, or when orders have been responded to successfully but have been cancelled by service providers or consumers, the orders may be added to an order cache region. After the orders are allocated to users, the orders may be deleted from the order cache region. In addition, when a user is under an available status, the user may be added to a user cache region. After the user successfully responds to an order, the user may be deleted from the user cache region. The data cache step may be added before step 2010, step 2020, or step 2030, or after step 2030, or may be performed simultaneously with any step. In some embodiments, during the process to maximize the weighed sum, an initial allocation mode may be generated based on a preset rule, the initial allocation mode may be optimized based on the mountain climbing algorithm based on greedy, and the allocation mode which can maximize the weighted sum may be determined. These modifications are still within the scope of the present disclosure.

Figure 21:
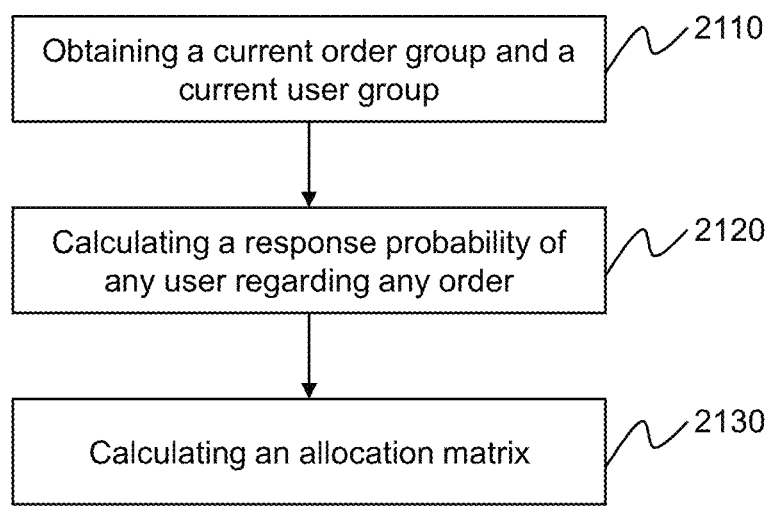
FIG. 21 is an exemplary flowchart illustrating a particular mode for allocating an order group to a user group according to some embodiments of the present disclosure.

FIG. 21 is an exemplary flowchart for determining an order allocation mode according to some embodiments of the present disclosure. In some embodiments, a "user" described in FIG. 21 may refer to a "driver". In step 2110, the order group and the user group may be obtained (see details in step 2010). In step 2120, a response probability of any user regarding any order may be calculated. The calculating the response probability may be performed by the processing module 210. In some embodiments, the completion rate, the success rate for responding to orders, and the receiving-responding rate for orders may be calculated based on the response probability of any user regarding any order. In some embodiments, assuming that there are $N_o$ orders in the order group, there are $N_d$ users in the user group, the response probability of a user j in the user group regarding an order i may be expressed as Pij. The completion rate, the success rate for responding to orders, and the receiving-responding rate for orders may be expressed as equations below:

$$E_{OrderSuccRate} = \frac{\sum_{i=1}^{N_o}\left[1 - \prod_{j=1}^{N_d}(1-P_{ij})^{d_{ij}}\right]}{N_o}, \quad (9)$$

$$E_{StriveSuccRate} = \frac{\sum_{i=1}^{N_o}\left[1 - \prod_{j=1}^{N_d}(1-P_{ij})^{d_{ij}}\right]}{\sum_{i<N_o, j<N_d} P_{ij} * d_{ij}}, \quad (10)$$

$$E_{StriveRate} = \frac{\sum_{i<N_o, j<N_d} P_{ij} * d_{ij}}{\sum_{i<N_o, j<N_d} d_{ij}}, \quad (11)$$

$$\text{where } d_{ij} = \begin{cases} 1, & \text{the order } i \text{ is pushed to user } j \\ 0, & \text{the order } i \text{ is not pushed to the user } j \end{cases} \quad (12)$$

It should be understood that the completion rate, the success rate for responding to orders, and the receiving-responding rate for orders may be derived from the response probability based on other ways. It should be understood that other than the response probability, the completion rate, the success rate for responding to orders, and the receiving-responding rate for orders may be derived based on other information. The present disclosure is not intended to be limiting.

In some embodiments, the response probability Pij may be calculated based on a status feature of users to receive orders and users who sent orders. The status feature may include but not limited to a response time, a distance between a user and a start location of an order, a travel time from the user to the start location of the order, an expected income of the order, whether a direction of a destination of the order is consistent with an expected direction of the user, a traffic status, a vehicle status (e.g., a residual amount of fuel oil, a consumption rate of oil), a user habit/preference, or other factors that may influence the selection of the requests from users, or the like, or a combination thereof. As used herein, the user habit/preference may include but not limited a preference of the passenger for the start time, the start location, or the destination, a preference of the passenger for drivers, an acceptable waiting time, a preference of the passenger for sharing a vehicle with other passengers, a preference of the passenger for a vehicle type (e.g., aircraft, train, ship, subway, taxi, bus, motorcycle, bicycle, on foot), a preference of the passenger for a business type (e.g., taxi, fast car, special car, free car, bus, renting a car, driving), a preference of the passenger for a vehicle model, a preference of the service provider for the start location, the destination, or the start time, a preference of the service provider for a driving route, a working time of the service provider, a failure rate of the service provider, a number of orders that the service provider has responded to, a number of orders that the service provider has responded to successfully, a number of completed orders, a success rate for responding to orders, a completion rate, or the like, or a combination thereof. In this situation, the response probability Pij may be expressed as:

$$P_{ij} = \frac{1}{1 + e^{W*X_{ij}}} \quad (13)$$

where Xij may refer to an eigenvector constituted by the status features, W may refer to a weighting coefficient corresponding to a status feature in Xij, and W may be set according to different technical scenarios and requirements. Methods that may be used to set the weighting coefficients may include but not limited to a subjective experience method, a primary and secondary index queuing taxonomy, an expert investigation method, or the like, or a combination thereof.

In step 2130, a model may be built and solved to obtain an allocation matrix. The solving the model and obtaining the allocation matrix may be performed by the processing module 210. In some embodiments, an analysis and a resolution may be performed by building a model based on the order allocation method of the order group and the user group. First, assuming that one service provider can only receive one order simultaneously, but one order can be allocated to a plurality of service providers. When a plurality of service providers send a request to respond to a same order, only one service provider can respond to the order successfully, and other service providers will fail to respond to the order successfully. In this business scenario, an order allocation model may be built below:

$$\begin{cases} \text{MAX}(E) \\ E = \alpha_1 * E_{OrderSuccRate} + \alpha_2 * E_{StriveSuccRate} + \alpha_3 * E_{StriveRate} \\ E_{OrderSuccRate} = \frac{\sum_{i=1}^{N_o}\left[1 - \prod_{j=1}^{N_d}(1 - P_{ij})^{d_{ij}}\right]}{N_o} \\ E_{StriveSuccRate} = \frac{\sum_{i=1}^{N_o}\left[1 - \prod_{j=1}^{N_d}(1 - P_{ij})^{d_{ij}}\right]}{\sum_{i<N_o,j<N_d} P_{ij} * d_{ij}} \\ E_{StriveRate} = \frac{\sum_{i<N_o,j<N_d} P_{ij} * d_{ij}}{\sum_{i<N_o,j<N_d} d_{ij}} \\ \forall i, j, P_{ij} = 1 + e^{W*X_{ij}} \\ d_{ij} = \begin{cases} 1, & \text{order } i \text{ is pushed to driver } j \\ 0, & \text{order } i \text{ is not pushed to driver } j \end{cases} \\ \forall j, \sum_{i=1}^{N_o} d_{ij} \le 1 \end{cases} \quad (14)$$

In the model above, $E_{OrderSuccRate}$, $E_{StriveSuccRate}$, $E_{StriveRate}$ may refer to core business indicators, and E may refer to a weighed sum of the indicators. An optimization objective of the model may be to maximize the weighed sum. The solution of the model may be a matrix $\{d_{ij}, i \in [0, N_0], j \in [0, N_d]\}$. That, is for the $N_0$ orders to be allocated and $N_d$ users to receive orders, an allocation mode $D=\{d_{ij}\}$ which can maximize the overall goal E may be solved according to the constraints above and a corresponding response probability Pij.

The description of the order allocation process is provided for illustration purposes, and should not be considered as the only practical embodiment. For persons having ordinary skills in the art, after understanding the principle of order allocation, without departing the principle, may make any modification or variation to the forms and details of the order allocation process. However, these modifications are still within the scope of the present disclosure. For example, the data generated during the calculation process may be stored as historical data, and during solving the allocation matrix by building a model, the historical data may be referred to. These modifications are still within the scope of the present disclosure.

Description below takes a taxi hailing system as an example and an order allocation method and system according to some embodiments of the present disclosure may be described. Before describing how to allocate orders, some assumptions are made below.

Assumption 1: there is a positive correlation between whether a driver decides to send a request for responding to an order and a distance between the driver and the order, the nearer the distance between the driver and the order is, the more the driver will be willing to respond to the order, the farther the distance between the driver and the order is, the more the driver will be reluctant to respond to the order. Assumption 2: if the distance between the driver and the order is quite far away, the driver may hardly respond to the order due to a long time of empty-run which may result in a low income. Assumption 3: after the passenger sends an order, the passenger may have a certain endurance, if there is no response after a long time, the passenger may cancel the order.

For example, a distance between order 1 and driver 1 is 500 meters, a distance between order 1 and driver 2 is 400 meters; a distance between order 2 and driver 1 is 2000 meters, a distance between order 2 and driver 2 is 500 meters. First, all current passengers (orders) may be taken as a whole and expressed as an order group, all current users (drivers) may be taken as a whole and expressed as a user group. During the allocation process, the order group and the user group may be defined as allocating units, therefore, the model is an order allocation system of order to driver (multiple to multiple). Secondly, a global expected target and an individual expected target may be determined, and a relation between the global expected target and the individual expected target may be built. For the individual target, the system wishes that each driver will actively respond to the orders allocated to him/her. Assuming that the aspirations for responding to orders of all the drivers satisfy a same conditional probability distribution P(STRIVE=1|X). As used herein, STRIVE=1 may indicate that the drivers respond to orders, and STRIVE=0 may indicate that the drivers don't respond to orders, and X may represent the current driver and status feature information of the driver. The current driver and the status feature information of the driver may include but not limited to a distance between a user to receive orders and a start location of an order, a travel time from the user to the start location of the order, an expected income of the order, an increasing price by the passenger, whether a direction of a destination of the order is consistent with an expected direction of the user, easy or difficult to respond to orders at the destination of the order, a traffic status, a weather status, a vehicle status (e.g., a residual amount of fuel oil, a consumption rate of oil), user habit/preference, other factors that may influence the aspirations for responding to orders of the users, or the like, or a combination thereof. The global target may be determined as the completion rate E of all orders, and the completion rate E is a function of the aspirations for responding to orders of all the drivers E=F(P).

The response probability P(STRIVE=1|X) may be estimated by a machine learning. The training sample may be historical data of broadcasting orders or responding to orders {Yij|Xij}, a record may represent a pushing record (i.e., pushing an order to a driver), where Xij may represent eigenvectors at the pushing moment, including but not limited to a distance between a user to receive orders and a start location of an order, a travel time from the user to the start location of the order, an expected income of the order, an increasing price by the passenger, whether a direction of a destination of the order is consistent with an expected direction of the user, easy or difficult to respond to orders at the destination of the order, a traffic status, a weather status, a vehicle status (e.g., a residual amount of fuel oil, a consumption rate of oil), user habit/preference, other factors that may influence the aspirations for responding to orders of the users, or the like, or a combination thereof. Yij may represent that whether the driver responds to the order after receiving the order, where 1 may represent responding to the order, 2 may represent not responding to the order. A prediction model may be a LR model that is widely used in industry (similar models may include linear regression, svm, gbdt). The LR model may be expressed as equation (15) below:

$$P(Y_{ij} = 1 \mid X_{ij}) = \frac{1}{1 + e^{W * X_{ij}}}, \quad (15)$$

where Xij may represent eigenvectors at the pushing moment, W may represent the weighting coefficients of the eigenvectors respectively. The eigenvectors may include but not limited to a distance between a user to receive orders and a start location of an order, a travel time from the user to the start location of the order, an expected income of the order, an increasing price by the passenger, whether a direction of a destination of the order is consistent with an expected direction of the user, easy or difficult to respond to orders at the destination of the order, a traffic status, a weather status, a vehicle status (e.g., a residual amount of fuel oil, a consumption rate of oil), user habit/preference, other factors that may influence the aspirations for responding to orders of the users, or the like, or a combination thereof.

The historical data of broadcasting orders or responding to orders may be used to train the model based on an off-line method, and the response probability of each pair (order, driver) may be estimated in real time (a STR (strive through rate) estimation). After the response probability Pij of each pair (order, driver) is obtained, a model may be built according to the method described in FIG. 21. First the response probability Pij may be calculated, only one feature "distance" is used for brevity. By the off-line machine training, a weighting coefficient of the "distance" may be set as 0.001. Therefore, the equation for the response probability Pij may be defined as:

$$P_{ij} = \frac{1}{1 + e^{0.001 * X_1}} \quad (16)$$

The calculation result for the response probability Pij may be shown in Table 5 below according to the calculation based on equation (16).

Table 5 an Illustration for a Calculation Result for the Response Probability Pij

|  | Order 1 | Order 2 |
| --- | --- | --- |
| Driver 1 | 0.38 | 0.12 |
| Driver 2 | 0.4 | 0.38 |

Secondly, the model may be solved and the solution for allocating orders may be obtained. In this embodiment, for brevity, only one core target "completion rate" may be taken into consideration. Therefore, the completion rate of each allocation mode may be expressed as below:

$$\begin{cases} E_{(order\ 1, driver\ 1)(order\ 1, driver\ 2)} = 0.31 \\ E_{(order\ 1, driver\ 1)(order\ 2, driver\ 2)} = 0.38 \\ E_{(order\ 1, driver\ 2)(order\ 2, driver\ 1)} = 0.23 \\ E_{(order\ 2, driver\ 1)(order\ 2, driver\ 2)} = 0.22 \end{cases} \quad (17)$$

According to the completion rate of each allocation mode, it may be seen that (order 1, driver 1) (order 2, driver 2) is a solution which can maximize the completion rate, therefore, the allocation mode may be selected and the orders may be allocated to the drivers based on the allocation mode. The description above is for illustration purposes, and not intended to limit the scope of the present disclosure.

Figure 22:
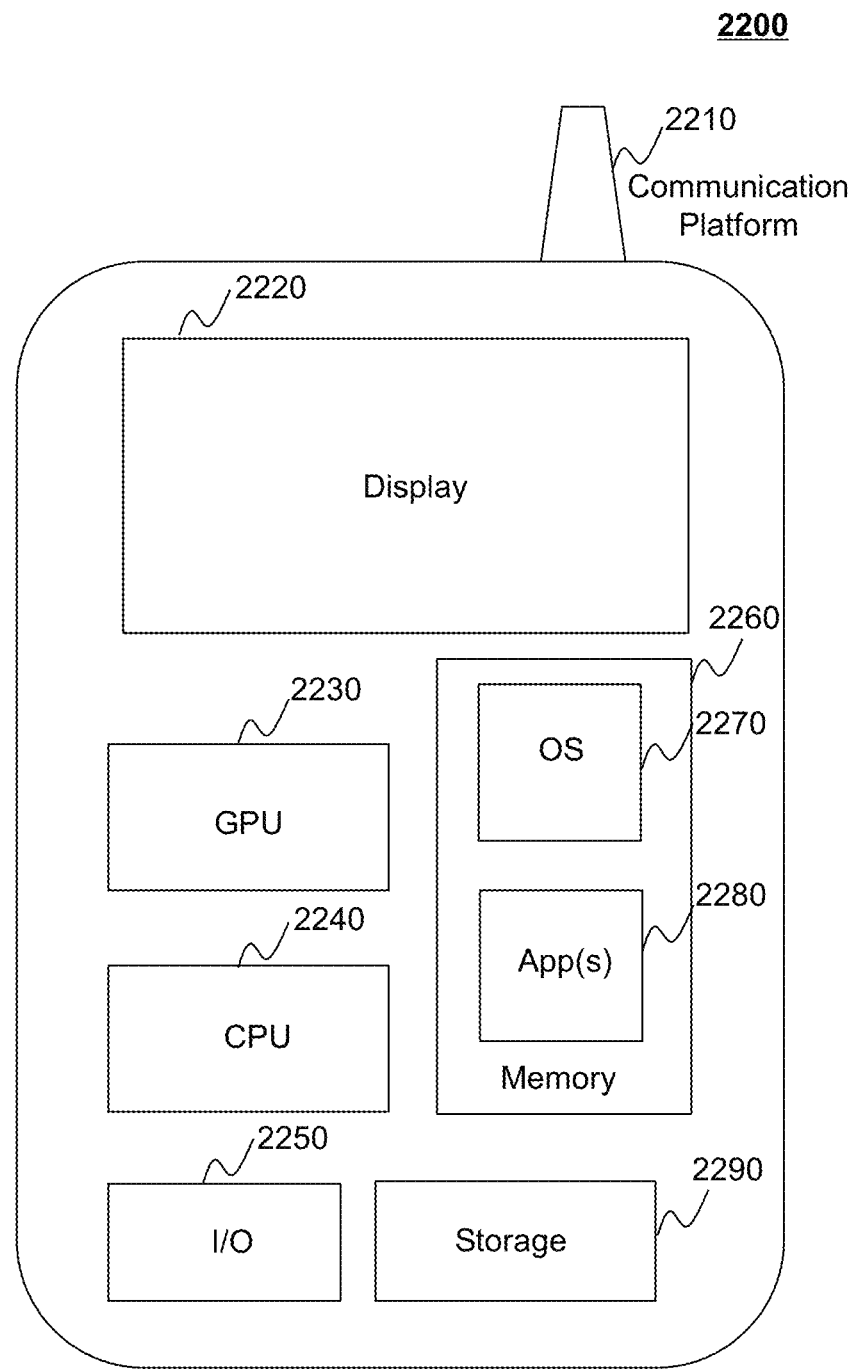
FIG. 22 depicts an architecture of a mobile device that may be used to realize a specialized system implementing the present disclosure.

FIG. 22 depicts an architecture of a mobile device that may be used to realize a specialized system disclosed in the present disclosure. In this example, the device on which information relating to location is presented and interacted with is a mobile device 2200, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 2200 in this example includes one or more central processing units (CPUs) 2240, one or more graphic processing units (GPUs) 2230, a display 2220, a memory 2260, a communication platform 2210, such as a wireless communication module, storage 2290, and one or more input/output (I/O) devices 2250. Any other suitable component, including but not limited to a system bus or a controller (not shown), may also be included in the mobile device 2200. As shown in FIG. 22, a mobile operating system 2270, e.g., iOS, Android, Windows Phone, etc., and one or more applications 2280 may be loaded into the memory 2260 from the storage 2290 in order to be executed by the CPU 2240. The applications 2280 may include a browser or any other suitable mobile apps for receiving and rendering information relating to location on the mobile device 2200. User interactions with the information stream may be achieved via the I/O devices 2250 and provided to the order processing engine 110 and/or other components of system 100, e.g., via the network 150.

To implement various modules, units, and their functionalities described in the present disclosure, computer hardware platforms may be used as the hardware platform(s) for one or more of the elements described herein (e.g., the order processing engine 110, and/or other components of the system 100 described with respect to FIGS. 1-20). The hardware elements, operating systems and programming languages of such computers are conventional in nature, and it is presumed that those skilled in the art are adequately familiar therewith to adapt those technologies to the blood pressure monitoring as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer device and as a result the drawings should be self-explanatory.

Figure 23:
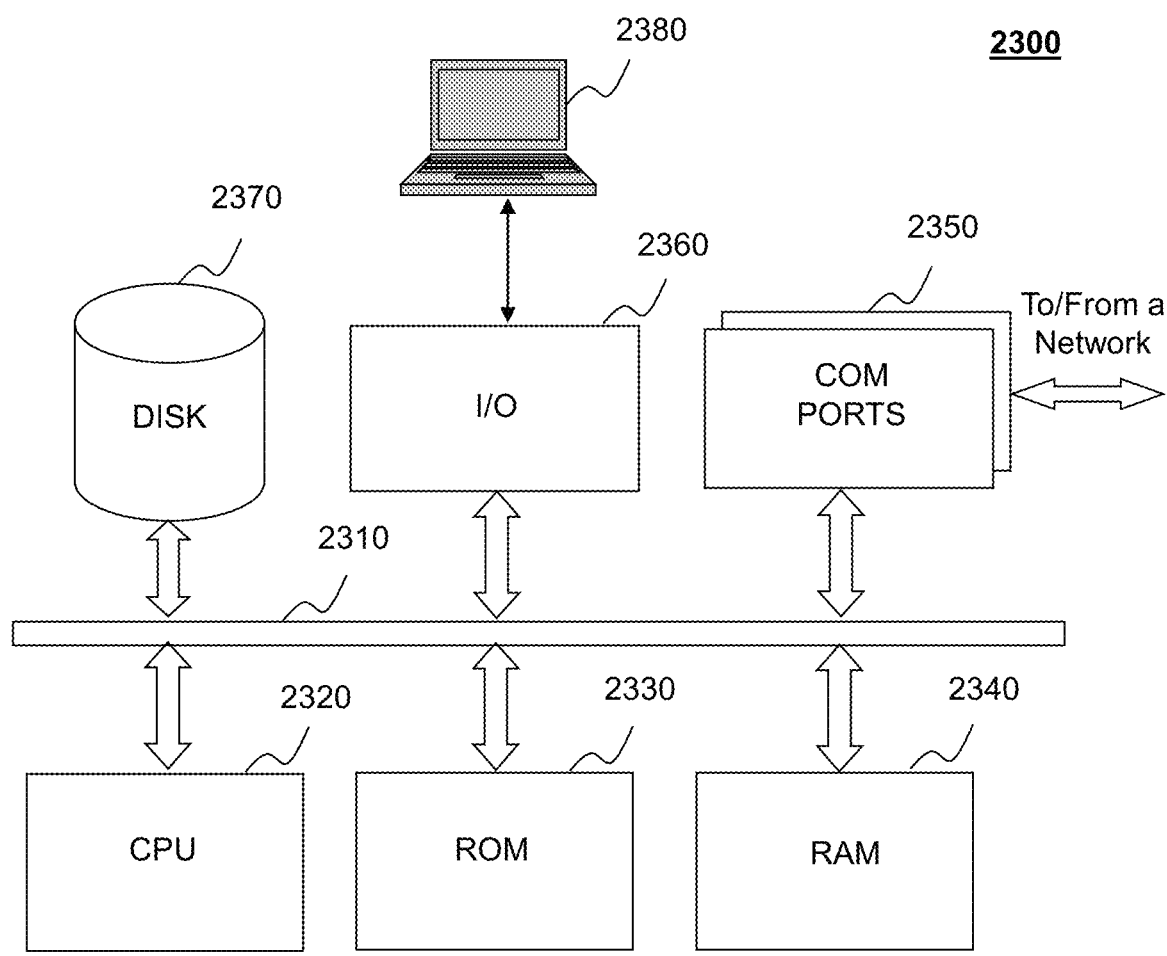
FIG. 23 depicts an architecture of a computing device that may be used to realize a specialized system implementing the present disclosure.

FIG. 23 depicts the architecture of a computing device that may be used to realize a specialized system implementing the present disclosure. Such a specialized system incorporating the present teaching has a functional block diagram illustration of a hardware platform that includes user interface elements. The computer may be a general purpose computer or a special purpose computer. Both may be used to implement a specialized system for the present disclosure. This computer 2300 may be used to implement any component of the blood pressure monitoring as described herein. For example, the order processing engine 110, etc., may be implemented on a computer such as computer 2300, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computer 2300, for example, includes COM ports 2350 connected to and from a network connected thereto to facilitate data communications. The computer 2300 also includes a central processing unit (CPU) 2320, in the form of one or more processors, for executing program instructions. The exemplary computer platform includes an internal communication bus 2310, program storage and data storage of different forms, e.g., disk 2370, read only memory (ROM) 2330, or random access memory (RAM) 2340, for various data files to be processed and/or transmitted by the computer, as well as possibly program instructions to be executed by the CPU. The computer 2300 also includes an I/O component 2360, supporting input/output between the computer and other components therein such as user interface elements 2380. The computer 2300 may also receive programming and data via network communications.

Hence, aspects of the methods of the blood pressure monitoring and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the engine 200 into the hardware platform(s) of a computing environment or other system implementing a computing environment or similar functionalities in connection with the blood pressure monitoring. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present disclosure are amenable to a variety of modifications and/or enhancements. For example, although the implementation of various components described above may be embodied in a hardware device, it may also be implemented as a software only solution—e.g., an installation on an existing server. In addition, the blood pressure monitoring system as disclosed herein may be implemented as a firmware, firmware/software combination, firmware/hardware combination, or a hardware/firmware/software combination.

The contents above describe the present disclosure and/or other illustrations. According to the contents above, the present disclosure may be implemented in different variations. The subject disclosed by the present disclosure may be implemented in different forms and examples, and the present disclosure may be used in various applications. The claimed applications, modifications and variations below are within the scope of the present disclosure.

We claim:

1. A system for operating an online transportation platform to interact with service receivers and service providers through order processing, comprising:
at least one storage device including a set of instructions; and
at least one processor in communication with the at least one storage device, wherein when executing the set of instructions, the at least one processor is configured to cause the system to:
obtain online transportation orders from terminals of the service receivers via a network;
extract order information based on the online transportation orders;
obtain service provider information of the service providers from terminals of the service providers, wherein each of the service providers is associated with a vehicle, the service provider information including real-time positioning information of the terminals of the service providers acquired based on real-time collection of positioning signals via the network;
obtain, based on the service provider information, features of the service providers using one or more trained machine learning models operating in real time on the online transportation platform;
send out, via the network, at least one of the online transportation orders to at least one of the terminals of the service providers based on the order information and the features of the service providers; and
dispatch a vehicle corresponding to a target service provider who accepts at least one of the online transportation orders via a terminal of the target service provider.

2. The system of claim 1, wherein sending out the at least one of the online transportation orders to the at least one of the terminals of the service providers based on the order information and the features of the service providers includes:
determining a result as to whether the order information matches the features of the service providers or whether the features of the service providers satisfy a condition;
ranking the service providers based on the result; and
sending out, via the network, the at least one of the online transportation orders to the at least one of the terminals of the service providers based on the ranking.

3. The system of claim 1, wherein the features of the service providers include at least one of an order similarity, a preference rate, a failure rate, characteristics of responding to orders, or a response time.

4. The system of claim 3, wherein the characteristics of responding to orders of one of the service providers indicate characteristics of change with time of probabilities that the service provider responds to one or more of the orders.

5. The system of claim 3, wherein the order similarity of one of the service providers includes a cosine similarity between at least one of historical order related to the service provider and one or more of the orders.

6. The system of claim 3, wherein the preference rate of one of the service providers includes a preferential region and a preferential time interval of the service provider.

7. The system of claim 6, wherein obtaining the preference rate of the one of the service providers includes:
accessing the at least one storage device to obtain a longitude-latitude coordinate point corresponding to a destination of one of the orders;
determining a distance Az between the longitude-latitude coordinate point of the destination of the order and a center of a preferential destination region of the service provider; and
determining a preference rate L of the service provider for the destination of the order based on the distance Az and a covering radius d of the preferential destination region of the service provider, wherein: $L=\Sigma 1/(1+e^{A_z-d})$.

8. The system of claim 3, wherein obtaining the failure rate of one of the service providers includes:
determining the failure rate of the service provider x with a model as:

$$T_x = \Sigma_{i=0}^{k} C_n^{k} * P^{k} * (1-p)^{n-k},$$

wherein Tx represents the failure rate of the service provider x, k represents a count of orders that the service provider x has failed to complete among n orders that the service provider x has accepted, $C_n^k$ represents a count of combinations of selecting k order from the n order, p represents an average failure rate of the service provider x.

9. The system of claim 3, wherein when executing the set of instructions, the at least one processor is configured to cause the system to:
in response to the at least one of the online transportation orders, receive at least one response from the at least one of the terminals of the service providers;

determine at least one candidate response from the at least one response based on the response time of the at least one response; and select one of the at least one candidate response for processing.

10. The system of claim 1, wherein sending out the at least one of the online transportation orders to the at least one of the terminals of the service providers based on the order information and the features of the service providers includes:

obtaining a geographic region;

determine an order group including the online transportation orders and a service provider group including the service providers based on the geographic region;

determining, based on the order information and the features of the service providers, a completion rate of the orders, a success rate that the service providers respond to the orders, and a responding rate of the service providers by analyzing the order group and the service provider group;

determining a weighted sum of the completion rate, the success rate, and the responding rate; and sending out the at least one of the online transportation orders to the at least one of the terminals of the service providers based on the weighted sum.

11. A method for operating an online transportation platform to interact with service receivers and service providers through order processing, implemented on a device including at least one storage device and at least one processor, the method comprising:

obtaining online transportation orders from terminals of the service receivers via a network;

extracting order information based on the online transportation orders;

obtaining service provider information of the service providers from terminals of the service providers, wherein each of the service providers is associated with a vehicle, the service provider information including real-time positioning information of the terminals of the service providers acquired based on real-time collection of positioning signals via the network;

obtaining, based on the service provider information, features of the service providers using one or more trained machine learning models operating in real time on the online transportation platform;

sending out, via the network, at least one of the online transportation orders to at least one of the terminals of the service providers based on the order information and the features of the service providers; and dispatching a vehicle corresponding to a target service provider who accepts at least one of the online transportation orders via a terminal of the target service provider.

12. The method of claim 11, wherein sending out the at least one of the online transportation orders to the at least one of the terminals of the service providers based on the order information and the features of the service providers includes:

determining a result as to whether the order information matches the features of the service providers or whether the features of the service providers satisfy a condition;

ranking the service providers based on the result; and sending out, via the network, the at least one of the online transportation orders to the at least one of the terminals of the service providers based on the ranking.

13. The method of claim 11, wherein the features of the service providers include at least one of an order similarity, a preference rate, a failure rate, characteristics of responding to orders, or a response time.

14. The method of claim 13, wherein the characteristics of responding to orders of one of the service providers indicate characteristics of change with time of probabilities that the service provider responds to one or more of the orders.

15. The method of claim 13, wherein the order similarity of one of the service providers includes a cosine similarity between at least one of historical order related to the service provider and one or more of the orders.

16. The method of claim 13, wherein the preference rate of one of the service providers includes a preferential region and a preferential time interval of the service provider.

17. The method of claim 16, wherein obtaining the preference rate of the one of the service providers includes:

accessing the at least one storage device to obtain a longitude-latitude coordinate point corresponding to a destination of one of the orders;

determining a distance Az between the longitude-latitude coordinate point of the destination of the order and a center of a preferential destination region of the service provider; and determining a preference rate L of the service provider for the destination of the order based on the distance Az and a covering radius d of the preferential destination region of the service provider, wherein: $L=\Sigma 1//(1+e^{A_z-d})$.

18. The method of claim 13, wherein obtaining the failure rate of one of the service providers includes:

determining the failure rate of the service provider x with a model as:

$$T_x = \Sigma_{i=0}^{k} C_n^{k} * p^{k} * (1-p)^{n-k},$$

wherein Tx represents the failure rate of the service provider x, k represents a count of orders that the service provider x has failed to complete among n orders that the service provider x has accepted, $C_n^k$ represents a count of combinations of selecting k order from the n order, p represents an average failure rate of the service provider x.

19. The method of claim 13, further comprising:

in response to the at least one of the online transportation orders, receive at least one response from the at least one of the terminals of the service providers;

determine at least one candidate response from the at least one response based on the response time of the at least one response; and select one of the at least one candidate response for processing.

20. The method of claim 11, wherein sending out the at least one of the online transportation orders to the at least one of the terminals of the service providers based on the order information and the features of the service providers includes:

obtaining a geographic region;

determine an order group including the online transportation orders and a service provider group including the service providers based on the geographic region;

determining, based on the order information and the features of the service providers, a completion rate of the orders, a success rate that the service providers respond to the orders, and a responding rate of the service providers by analyzing the order group and the service provider group;

determining a weighted sum of the completion rate, the success rate, and the responding rate; and sending out the at least one of the online transportation orders to the at least one of the terminals of the service providers based on the weighted sum.

* * * * *